(12) United States Patent
Sekine et al.

(10) Patent No.: US 6,673,267 B2
(45) Date of Patent: Jan. 6, 2004

(54) PHENYLACETYLENE COMPOUND, LIQUID CRYSTAL COMPOSITION, POLYMER, OPTICALLY ANISOTROPIC PRODUCT, AND LIQUID CRYSTAL OR OPTICAL ELEMENT

(75) Inventors: Chizu Sekine, Tsukuba (JP); Koichi Fujisawa, Tsukuba (JP); Masayoshi Minai, Moriyama (JP); Kazunori Iwakura, Toyonaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 58 days.

(21) Appl. No.: 09/742,407

(22) Filed: Dec. 22, 2000

(65) Prior Publication Data
US 2002/0006479 A1 Jan. 17, 2002

(30) Foreign Application Priority Data

Dec. 24, 1999 (JP) .............................. 11-367041
Apr. 25, 2000 (JP) ......................... 2000-125014
Apr. 25, 2000 (JP) ......................... 2000-125016

(51) Int. Cl.[7] ..................... C09K 19/06; C09K 19/52; C07C 255/00
(52) U.S. Cl. .................. 252/299.6; 252/299.61; 252/299.63; 252/299.01; 558/425
(58) Field of Search .............. 252/299.01, 299.6, 252/299.62, 299.63, 299.64, 299.65, 299.66, 299.67; 558/425

(56) References Cited

FOREIGN PATENT DOCUMENTS

| EP | 0 928 984 | * 7/1999 | ......... G02F/1/1335 |
|---|---|---|---|
| JP | A-283340 | 3/1990 | |
| JP | A-9216841 | 8/1997 | |
| JP | A-1180081 | 3/1999 | |
| JP | 2000-281628 | * 3/1999 | ........... C07C/69/54 |
| JP | A-11116534 | 4/1999 | |
| JP | 2000-204052 | 7/2000 | |
| JP | 2000281628 | 10/2000 | |
| WO | 98/52905 | * 11/1998 | ........... C07C/69/92 |

OTHER PUBLICATIONS including English translation.*

* cited by examiner

Primary Examiner—Mark F. Huff
Assistant Examiner—Jennifer R Sadula
(74) Attorney, Agent, or Firm—Birch, Stewart, Kolasch & Birch, LLP

(57) ABSTRACT

Phenylacetylene compounds are disclosed which are expected to exhibit high refractive index anisotropy, easy to mix with other liquid crystal compounds, has advantageous stability against light, and may be used as a material for producing various films and the like. The compounds are represented by the formula (1):

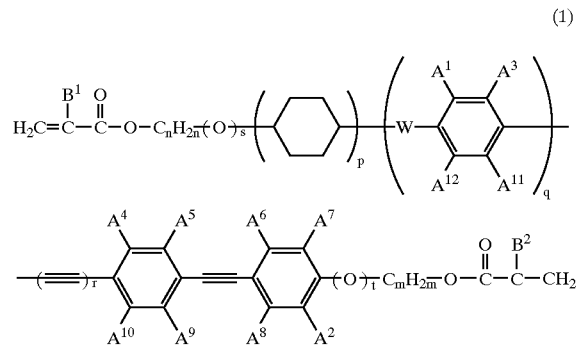

(1)

wherein $A^1$ to $A^{12}$: H, F, etc.; $B^1$, $B^2$: H, $CH_3$; p, q, r, s, t: 0 or 1, provided that when q=0, at least one of $A^2$ and $A^4$ to $A^{10}$ stands for a $C_1$ to $C_{10}$ alkyl or alkoxy group optionally substituted with at least one F; m, n: an integer of 0 to 14, provided that when s=1, n is not 0, and when t=1, m is not 0; W: $-CH_2CH_2-$, $-C{\equiv}C-$.

13 Claims, No Drawings

PHENYLACETYLENE COMPOUND, LIQUID CRYSTAL COMPOSITION, POLYMER, OPTICALLY ANISOTROPIC PRODUCT, AND LIQUID CRYSTAL OR OPTICAL ELEMENT

FIELD OF ART

The present invention relates to phenylacetylene compounds having a phenylacetylene structure and an acryl or methacryl group on both ends of the structure via a spacer, which compounds are useful for preparing optical, display, and recording materials, and also for preparing optical compensators, polarizers, reflector plates, and scattering plates, which are used for liquid crystal devices, or films having coloring effect, or useful as a material for preparing the above products or as a component of liquid crystal materials used for preparing liquid crystal display elements. The present invention also relates to liquid crystal compositions, polymers, optically anisotropic products, all containing such phenylacetylene compounds, and liquid crystal or optical elements utilizing the above.

BACKGROUND ART

There have recently been discussed possible applications of liquid crystalline materials not only to a switching element of a display for switching the display modes such as TN or STN mode, but also to retarder plates, polarizing plates, polarizing prisms, beam splitters, reflectors, holographic elements, color separators, or various optical filters, which make use of the optical anisotropy of the materials such as alignment and refractive index. Improvement in performance of display elements has become essential with the recent development in information-oriented society.

As technique for realizing production of optically anisotropic products from liquid crystalline materials, there are known, for example, methods of photopolymerizing a liquid crystalline compound having a polymerizable functional group or a polymerizable liquid crystal composition containing such a compound, by irradiating the compound or the composition in a liquid crystal state with ultra-violet or visible irradiation. These methods intend to, in other words, to produce a polymer wherein the alignment of liquid crystal molecules in a liquid crystal state is semipermanently fixed for achieving stable optical functions. As such liquid crystalline compounds having a polymerizable functional group, JP-A-11 116 534 and JP-A-11 80 081 propose mainly a compound having a phenylbenzoate core and a compound having a core including phenylbenzoate, cyclohexylphenyl, and tolan. The core structures of these compounds, however, do not give a high refractive index anisotropy (Δn).

On the other hand, as liquid crystalline compounds having a relatively high refractive index anisotropy, JP-A-2 83 340 and JP-A-9 216 841 propose conjugate compounds. However, such conjugate compounds do not have a sufficiently high refractive index anisotropy, have problems such as low solubility in other liquid crystals, and do not have a photopolymerizability.

DISCLOSURE OF THE INVENTION

It is therefore an object of the present invention to provide novel phenylacetylene compounds, liquid crystal compositions containing such a compound, polymers obtained from such a composition, and optically anisotropic products, which are expected to exhibit high refractive index anisotropy, easy to mix with other liquid crystal compounds, and has advantageous stability against light, and which may be used for preparation of optical compensators, polarizer materials, reflectors, scattering plates, or films having coloring effect.

It is another object of the present invention to provide liquid crystal or optical elements useful for producing optical shutters, display elements, or the like devices, which utilizes a novel phenylacetylene compound, a liquid crystal composition containing such a compound, a polymer obtained from such a composition, and an optically anisotropic product, which are expected to exhibit high refractive index anisotropy, easy to mix with other liquid crystal compounds, and has advantageous stability against light, and which may be used for preparation of optical compensators, polarizer materials, reflectors, scattering plates, or films having coloring effect.

According to the present invention, there is provided a phenylacetylene compound represented by the formula (1):

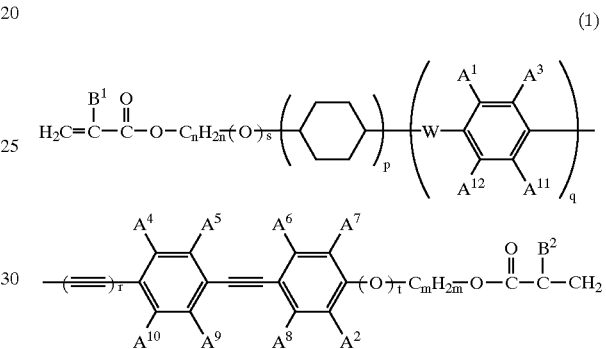

wherein $A^1$ to $A^{12}$ each independently stands for a hydrogen atom, a fluorine atom, or an alkyl or alkoxy group having 1 to 10 carbon atoms optionally substituted with at least one fluorine atom; $B^1$ and $B^2$ each stands for a hydrogen atom or a methyl group; p, q, r, s, and t each denotes 0 or 1, provided that when q is 0, at least one of $A^2$ and $A^4$ to $A^{10}$ stands for an alkyl or alkoxy group having 1 to 10 carbon atoms optionally substituted with at least one fluorine atom; m and n each denotes an integer of 0 to 14, provided that when s is 1, n is not 0, and when t is 1, m is not 0; W stands for a single bond, —$CH_2CH_2$—, or —$C\equiv C$—.

According to the present invention, there is also provided a liquid crystal composition comprising a phenylacetylene compound represented by the above formula (1).

According to the present invention, there is also provided a polymer obtained by polymerization of the above liquid crystal composition.

According to the present invention, there is further provided an optically anisotropic product produced using the above polymer.

According to the present invention, there is further provided a liquid crystal or optical element produced using at least one material selected from the group consisting of the phenylacetylene compound, the liquid crystal composition, the polymer, the optically anisotropic product.

Preferred Embodiments of the Invention

Phenylacetylene compounds of the present invention are represented by the formula (1) In the formula (1) $A^1$ to $A^{12}$ each independently stands for a hydrogen atom, a fluorine atom, or an alkyl or alkoxy group having 1 to 10 carbon atoms optionally substituted with at least one fluorine atom. $B^1$ and $B^2$ each stands for a hydrogen atom or a methyl group. p, q, r, s, and t each denotes 0 or 1, provided that when q is 0, at least one of $A^2$ and $A^4$ to $A^{10}$ stands for an alkyl or alkoxy group having 1 to 10 carbon atoms optionally substituted with at least one fluorine atom. m and n each denotes an integer of 0 to 14, provided that when s is 1, n is not 0, and when t is 1, m is not 0. W stands for a single bond, —$CH_2\ CH_2$—, or —C≡C—.

Examples of the phenylacetylene compounds represented by the formula (1) may include those represented by the formulae below, wherein m and n each denotes an integer of 1 to 14. Particularly preferred are phenylacetylene compounds represented by the formula (1) wherein at least one of $A^4$, $A^5$, $A^9$ and $A^{10}$ stands for an alkyl or alkoxy group having 1 to 10 carbon atoms optionally substituted with at least one fluorine atom, or phenylacetylene compounds represented by the formula (1) wherein s and t both denote 1.

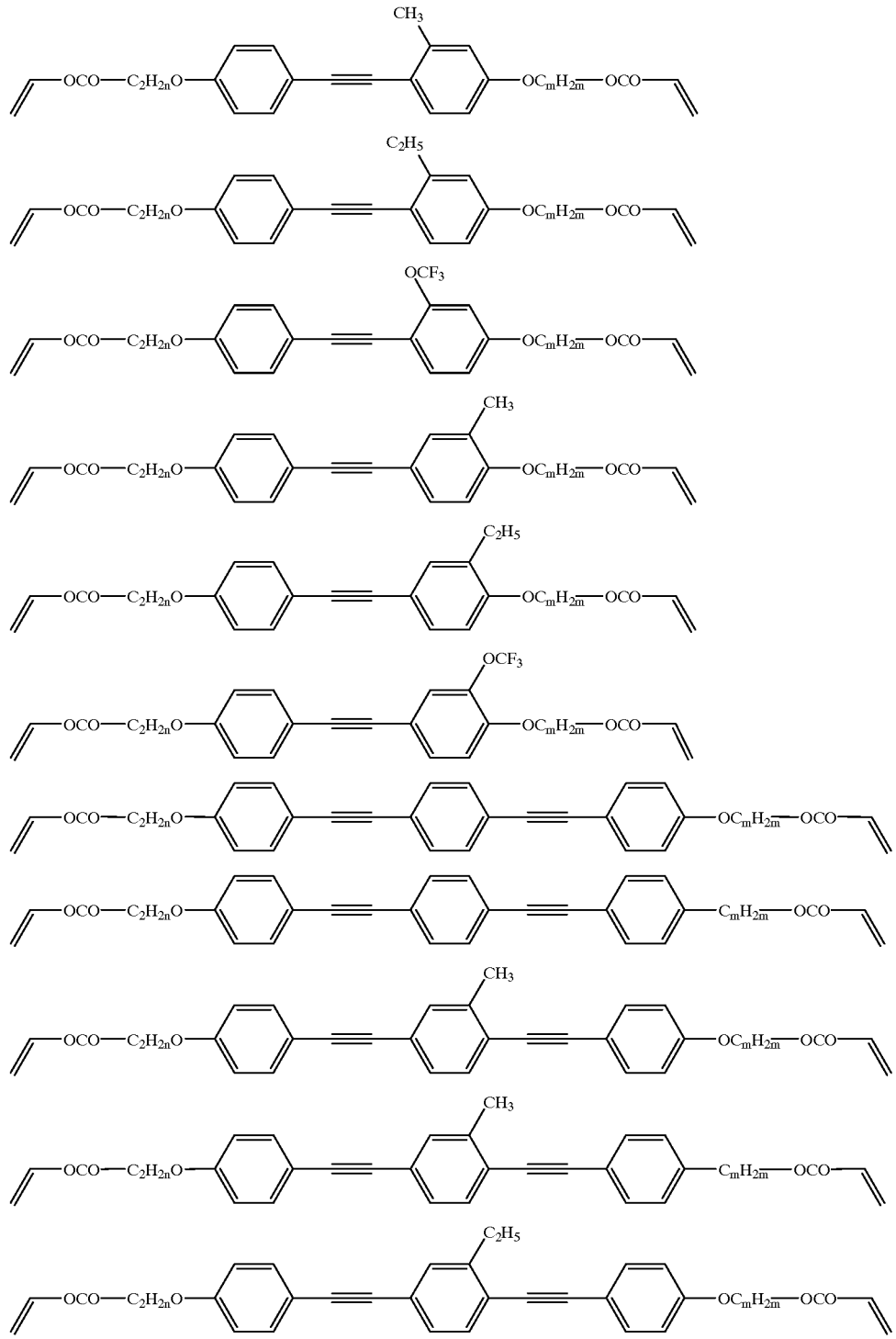

-continued
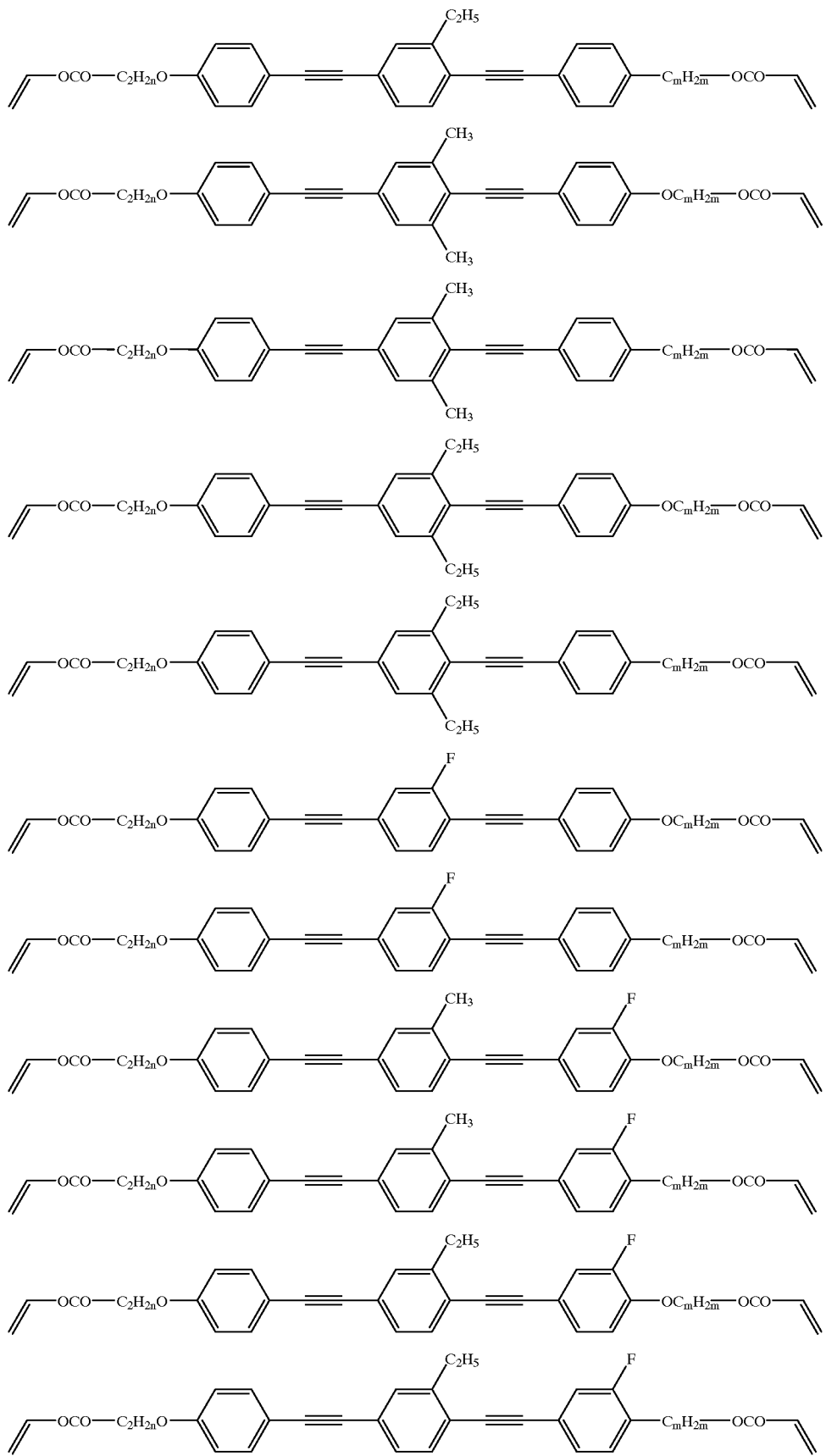

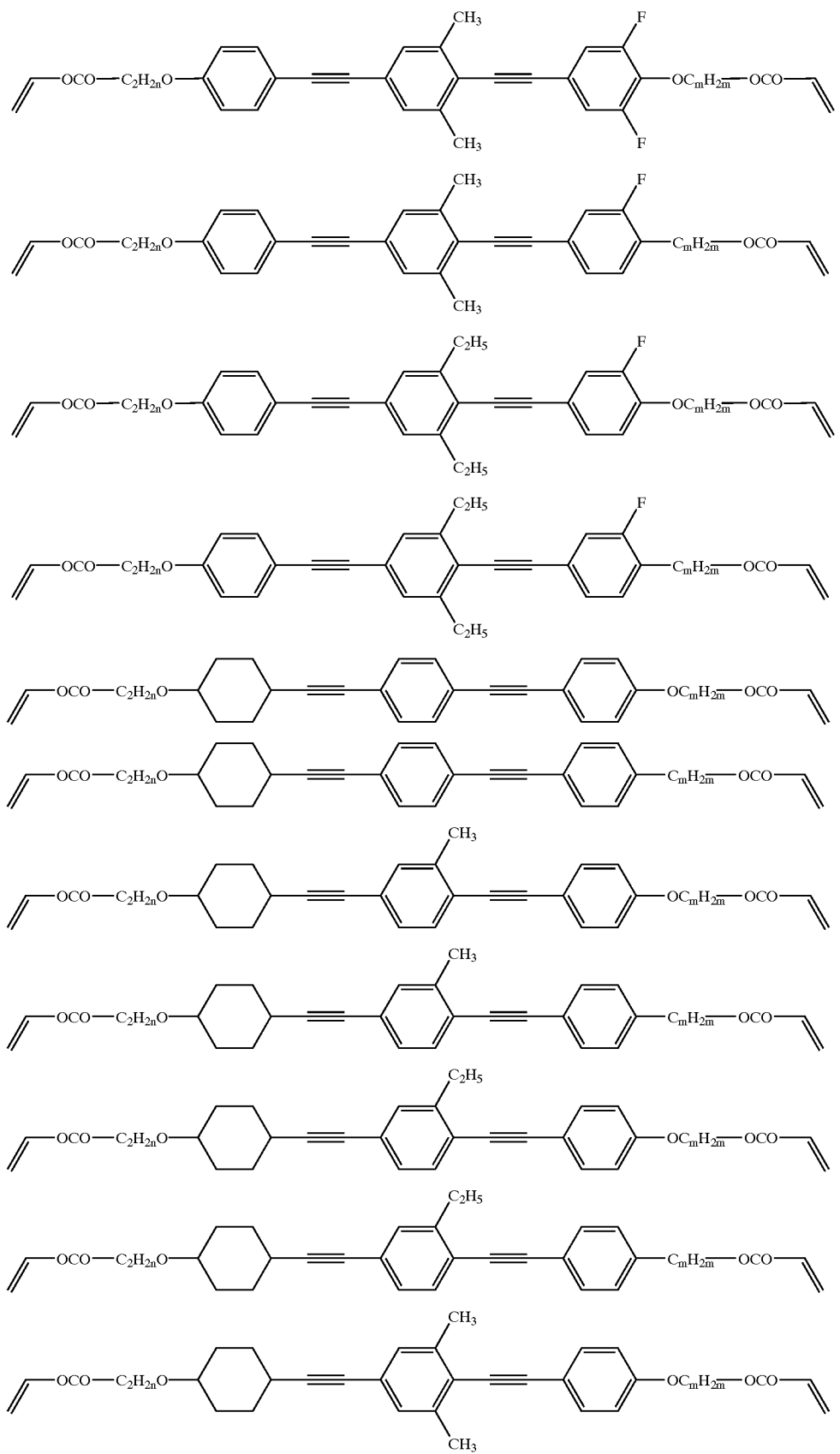

-continued
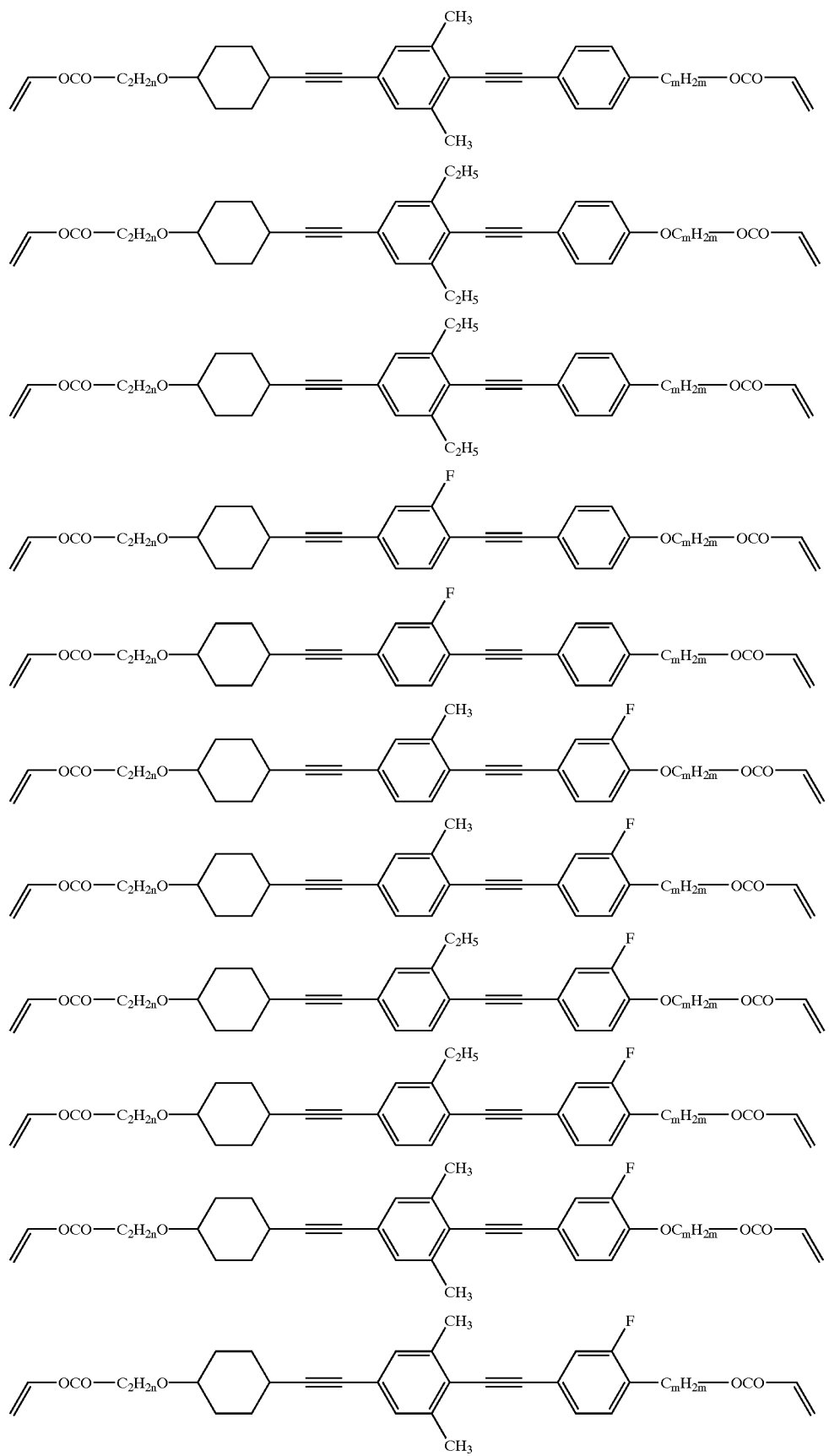

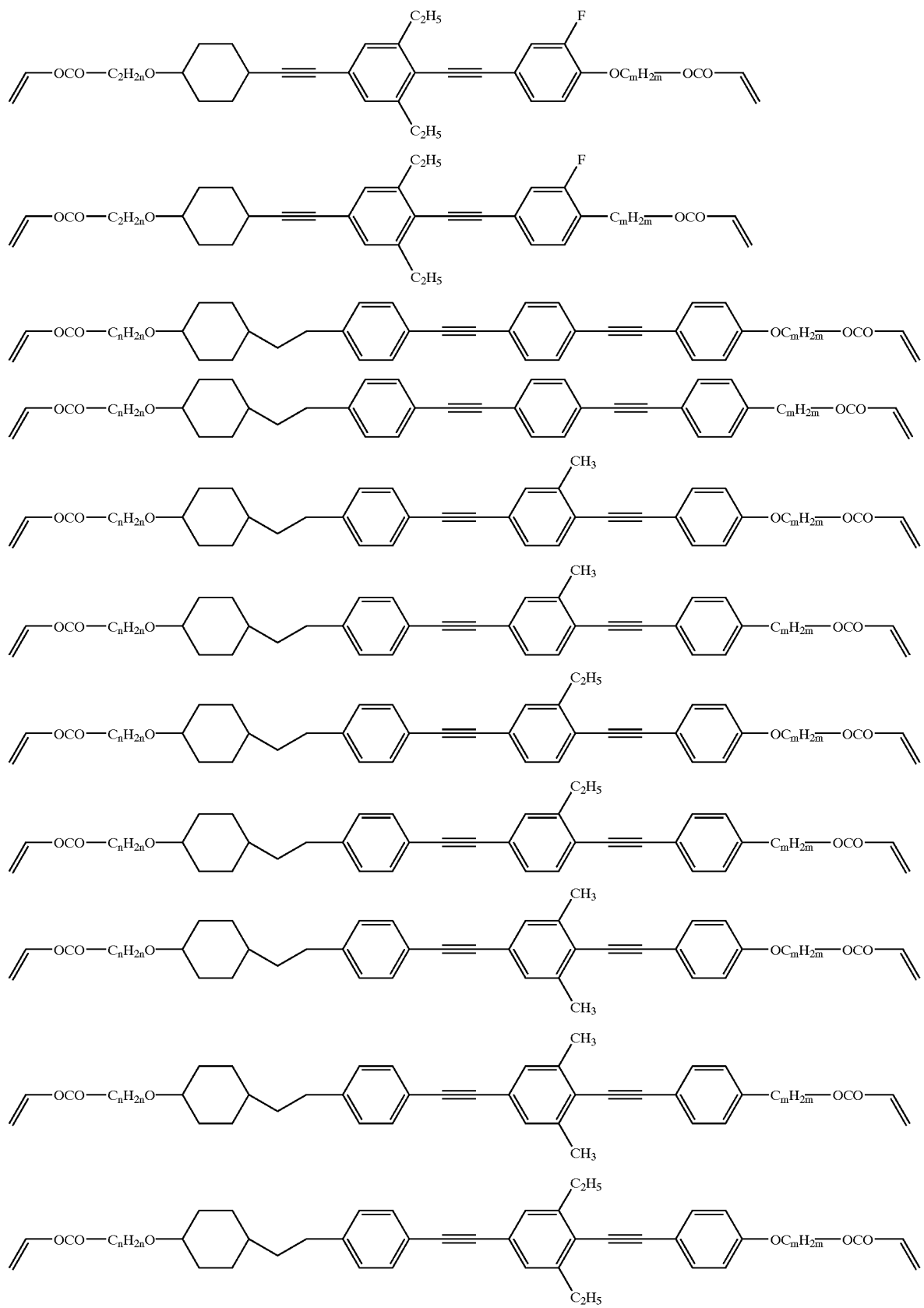

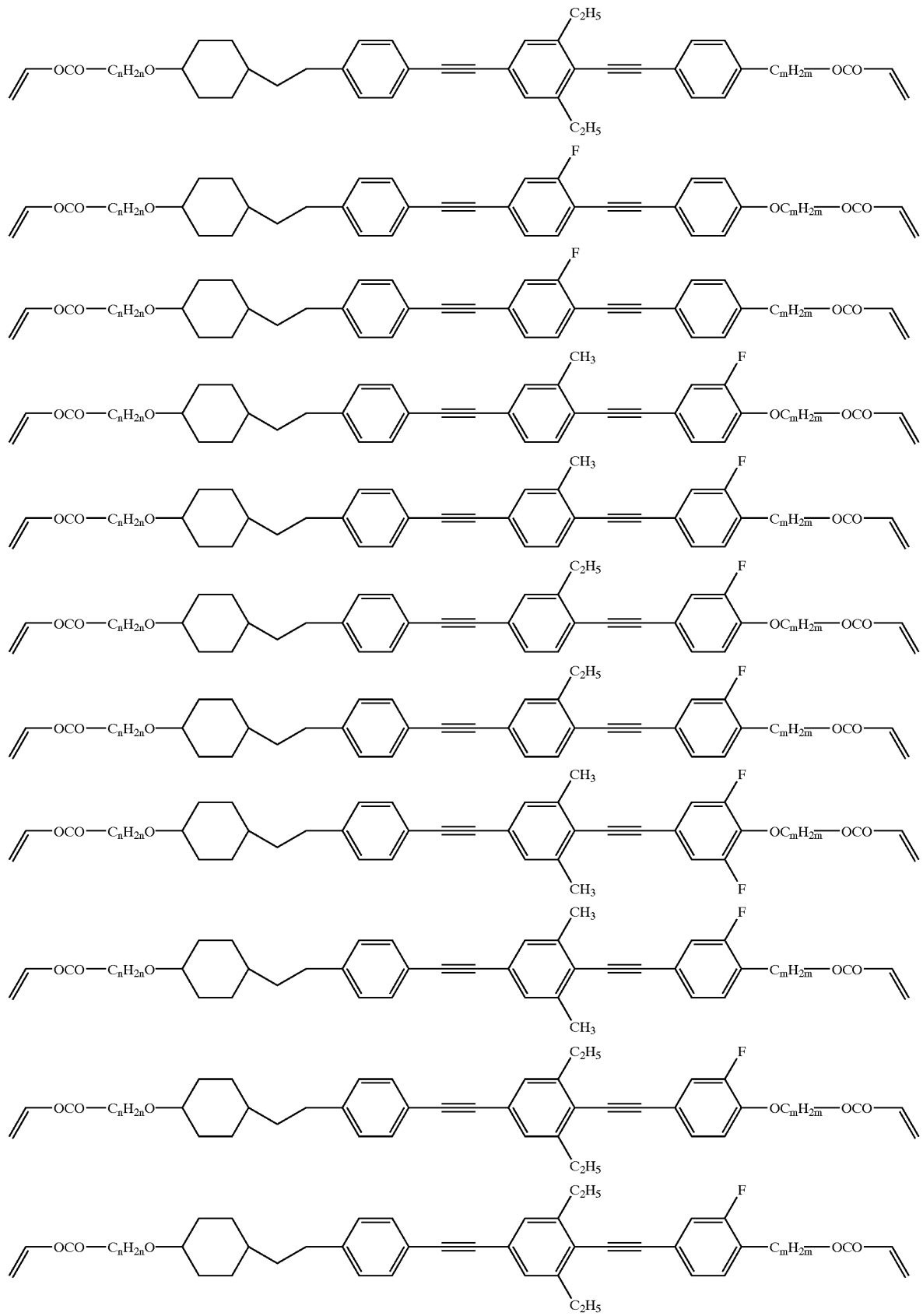

The phenylacetylene compounds of the present invention may be synthesized through ordinary organic synthesizing processes, for example, in accordance with the synthesizing process mentioned below, which is a combination of known unit processes.

Compounds represented by the formula (1) wherein (p, q, r, s, t)=(0, 0, 0, 0, 0), referred to as compound (1aa) hereinbelow, may be produced, for example, according to the following synthesizing process.

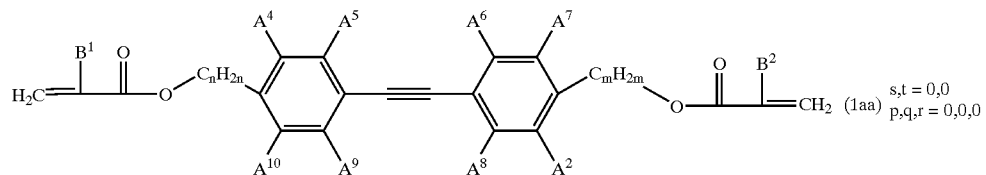

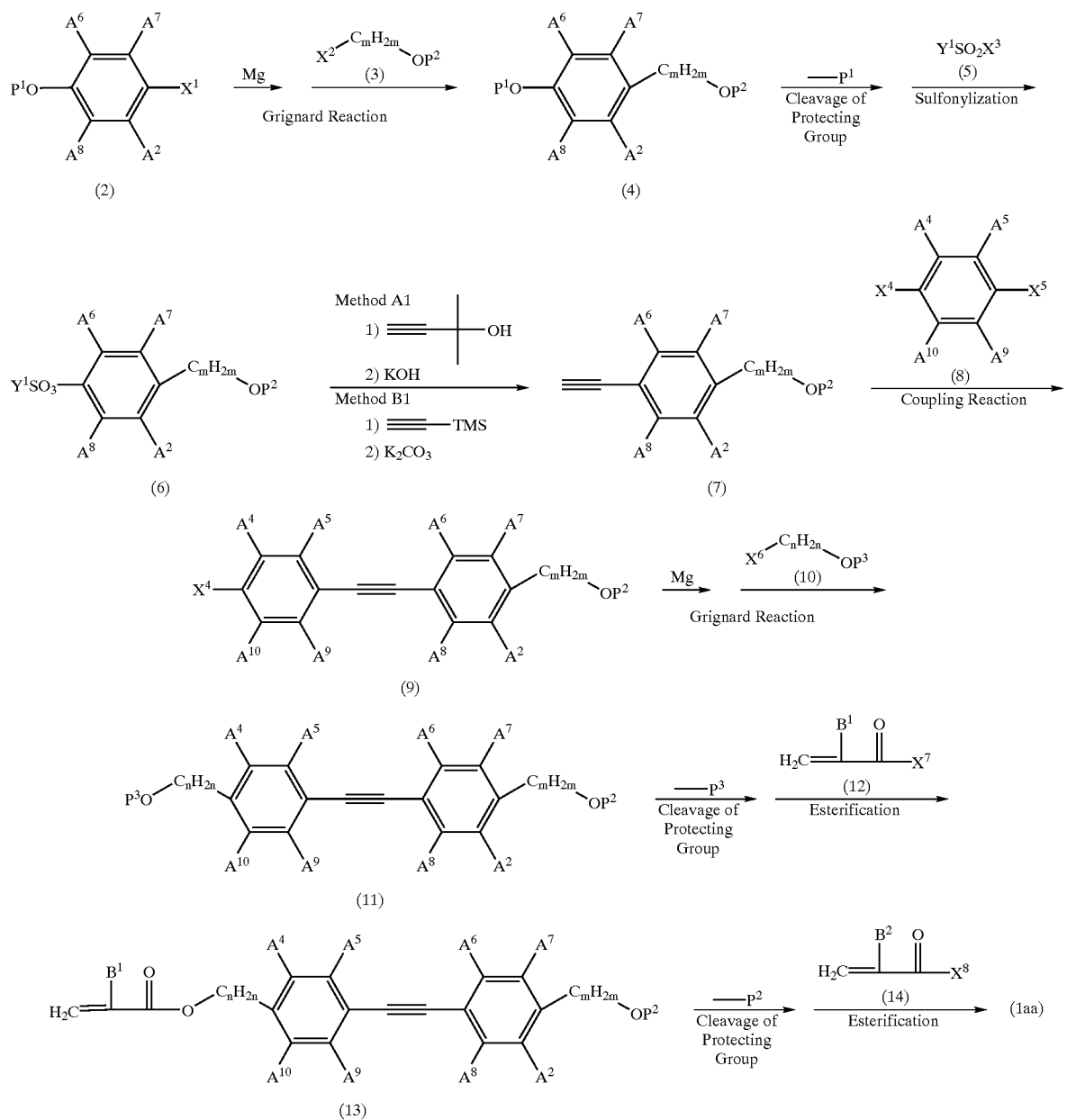

In the formulae above, $A^2$, $A^4$ to $A^{10}$, $B^1$, $B^2$, m, and n mean the same as in the formula (1). $X^1$, $X^2$, and $X^6$ to $X^8$ each independently stands for a halogen atom, and $X^3$ to $X^5$ each independently stands for a halogen atom, $-OSO_2CF_3$, or $-OSO_2C_4F_9$. $Y^1$ stands for $-CF_3$ or $-C_4F_9$, and $P^1$ to $P^3$ each independently stands for a protecting group for a hydroxyl group.

The reaction for preparing the compound represented by the formula (7) from the compound represented by the formula (6) in the above example of synthesis may be effected, for example, through the following Method (A1) or (B1):

Method (A1): Reacting the compound represented by the formula (6) with 1,1-dimethyl-2-propynol in the presence of copper iodide, a palladium catalyst, or a base such as triethylamine, followed by reaction with a base such as an alkali hydroxide;

Method (B1): Reacting the compound represented by the formula (6) with trimethylsilylacetylene in the presence of copper iodide, a palladium catalyst, or a base such as triethylamine, followed by reaction with a base such as an alkali carbonate.

The coupling reaction of the compounds represented by the formulae (7) and (8) in the above example of synthesis may be effected by reaction of the two compounds in the presence of copper iodide, a palladium catalyst, or a base such as triethylamine.

Compounds represented by the formula (1) wherein (p, q, r, s, t)=(0, 0, 1, 0, 0), referred to as compound (1ab) hereinbelow, may be produced, for example, according to the following synthesizing process.

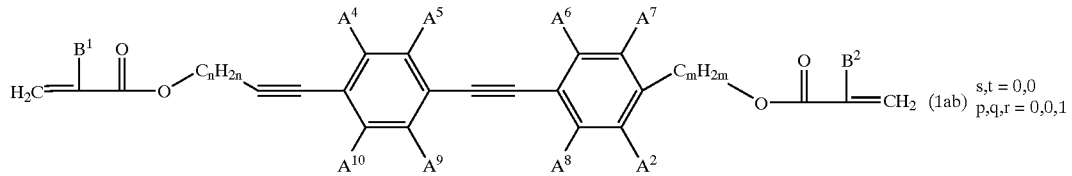

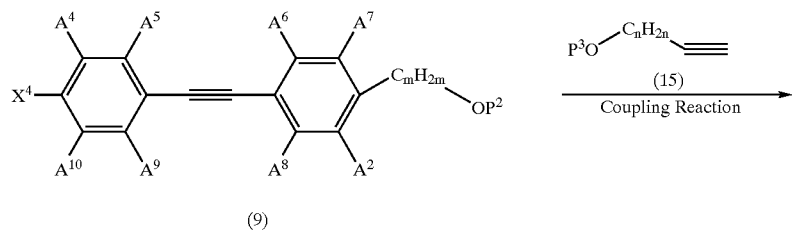

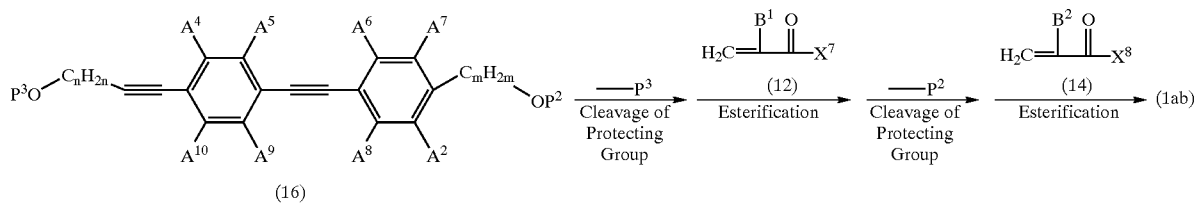

In the formulae above, $A^2$, $A^4$ to $A^{10}$, $B^1$, $B^2$, m, and n mean the same as in the formula (1). $X^7$ and $X^8$ each independently stands for a halogen atom, and $X^4$ stands for a halogen atom, $-OSO_2CF_3$, or $-OSO_2C_4F_9$. $P^2$ and $P^3$ each independently stands for a protecting group for a hydroxyl group.

The coupling reaction of the compounds represented by the formulae (9) and (15) in the above example of synthesis may be effected by reaction of the two compounds in the presence of copper iodide, a palladium catalyst, or a base such as triethylamine.

Compounds represented by the formula (1) wherein (p, q, r, s, t)=(0, 1, 0, 0, 0) referred to as compound (1ac) hereinbelow, may be produced, for example, according to the following synthesizing process.

independently stands for a halogen atom, and $X^4$ stands for a halogen atom, $-OSO_2CF_3$, or $-OSO_2C_4F_9$. $P^2$ and $P^3$ each independently stands for a protecting group for a hydroxyl group. Q stands for $B(OZ^1)_2$ or $SnZ^2{}_3$, wherein $Z^1$ stands for a hydrogen atom or an alkyl group, two $Z^1$'s may be bonded to form a ring, and $Z^2$ stands for an alkyl group or a halogen atom.

The coupling reaction of the compounds represented by the formulae (9) and (19) may be effected by reaction of the two compounds in the presence of a palladium catalyst or a base such as sodium carbonate.

Compounds represented by the formula (1) wherein (p, q, r, s, t)=(0, 1, 1, 0, 0), referred to as compound (1ad) hereinbelow, may be produced, for example, according to the following synthesizing process.

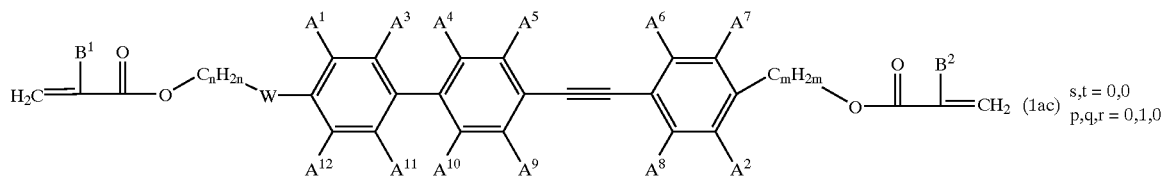

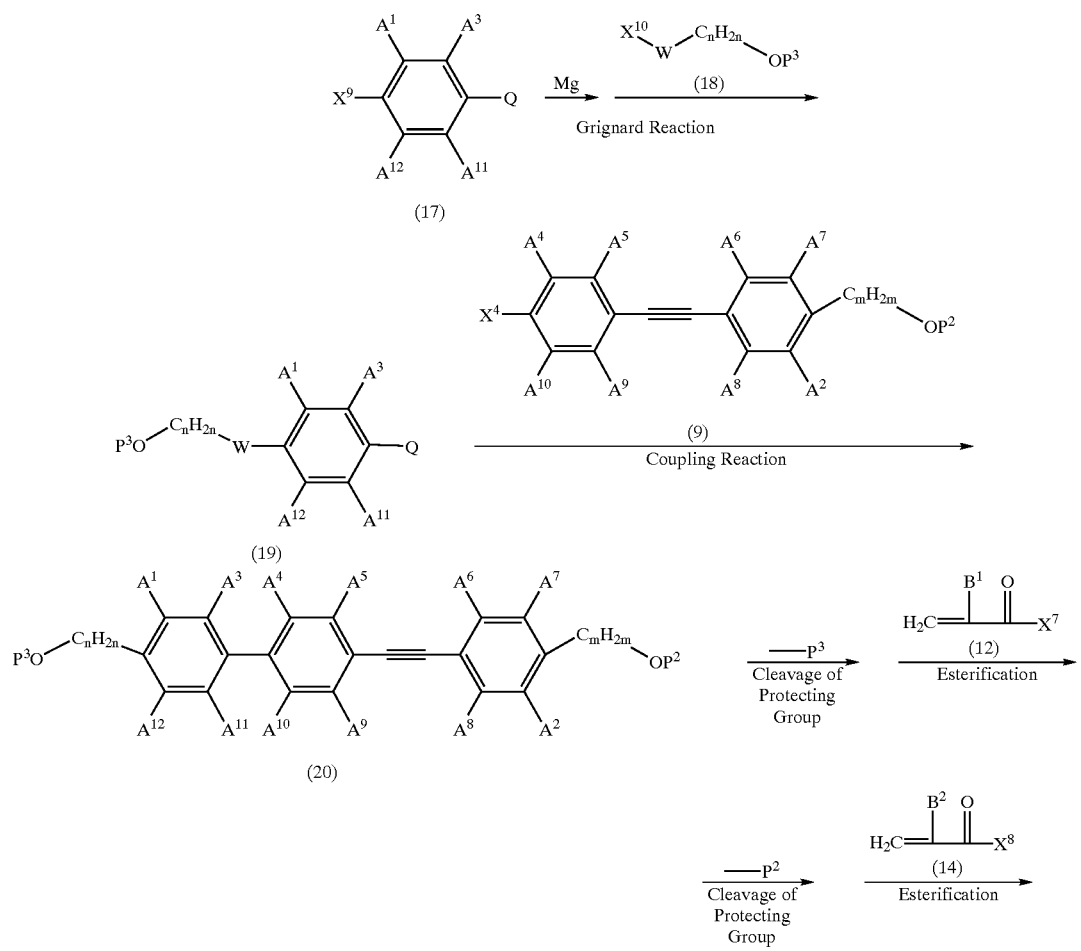

In the formulae above, $A^1$ to $A^{12}$, $B^1$, $B^2$, W, m, and n mean the same as in the formula (1). $X^7$ to $X^{10}$ each

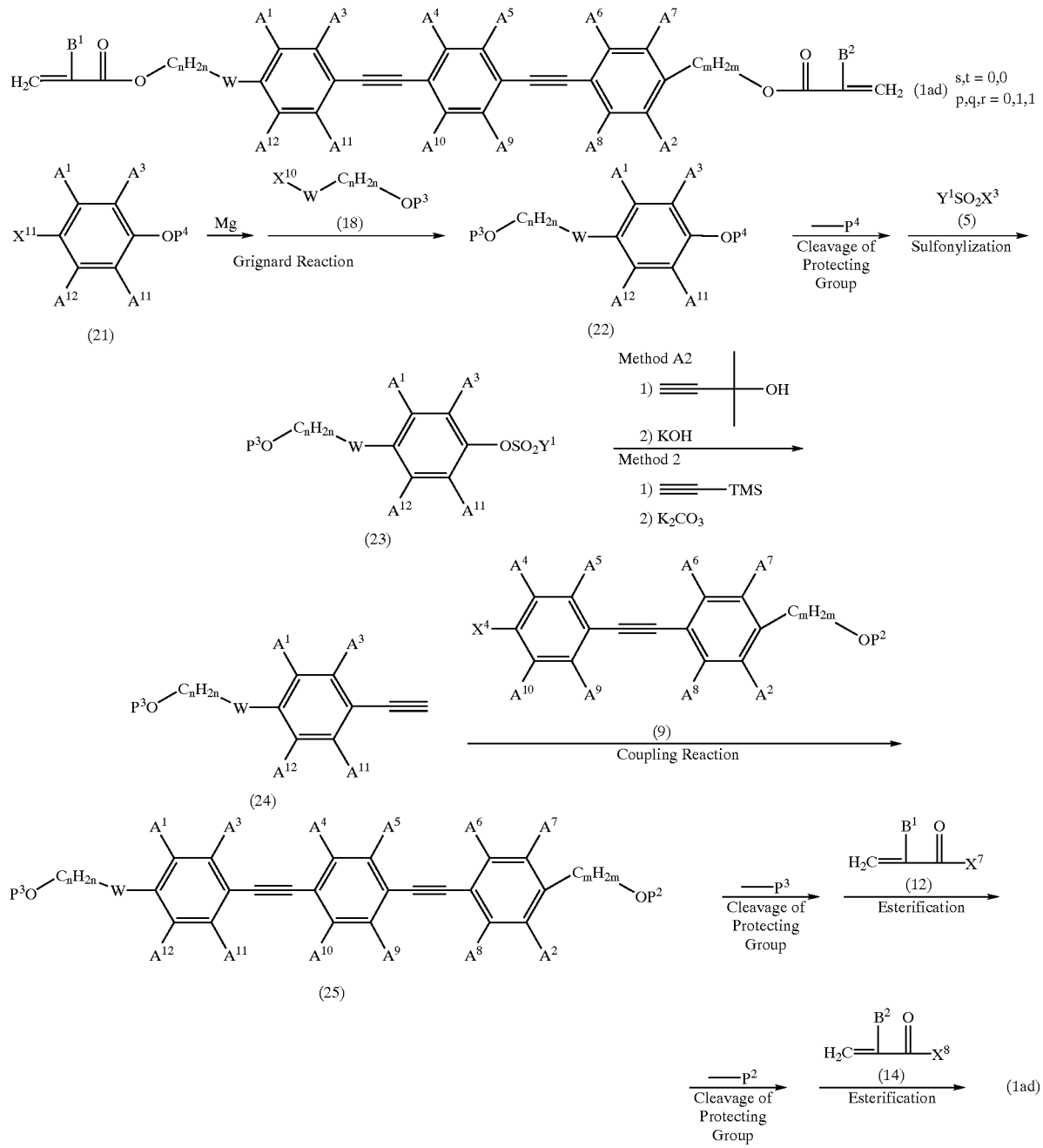

In the formulae above, $A^1$ to $A^2$, $B^1$, $B^2$, W, m, and n mean the same as in the formula (1). $X^7$, $X^8$, $X^{10}$, and $X^{11}$ each independently stands for a halogen atom, and $X^3$ and $X^4$ each independently stands for a halogen atom, $-OSO_2CF_3$, or $-OSO_2C_4F_9$. $Y^1$ stands for $-CF_3$ or $-C_4F_9$, and $P^1$ to $P^4$ each independently stands for a protecting group for a hydroxyl group.

The reaction for preparing the compound represented by the formula (24) from the compound represented by the formula (23) in the above example of synthesis may be effected, for example, through the following Method (A2) or (B2):

Method (A2): Reacting the compound represented by the formula (23) with 1,1-dimethyl-2-propynol in the presence of copper iodide, a palladium catalyst, or a base such as triethylamine, followed by reaction with a base such as an alkali hydroxide;

Method (B2): Reacting the compound represented by the formula (23) with trimethylsilylacetylene in the presence of copper iodide, a palladium catalyst, or a base such as triethylamine, followed by reaction with a base such as an alkali carbonate.

The coupling reaction of the compounds represented by the formulae (9) and (24) in the above example of synthesis may be effected by reaction of the two compounds in the presence of copper iodide, a palladium catalyst, or a base such as triethylamine.

Compounds represented by the formula (1) wherein (p, q, r, s, t)=(1, 0, 0, 0, 0), referred to as compound (1ae) hereinbelow, may be produced, for example, according to the following synthesizing process.

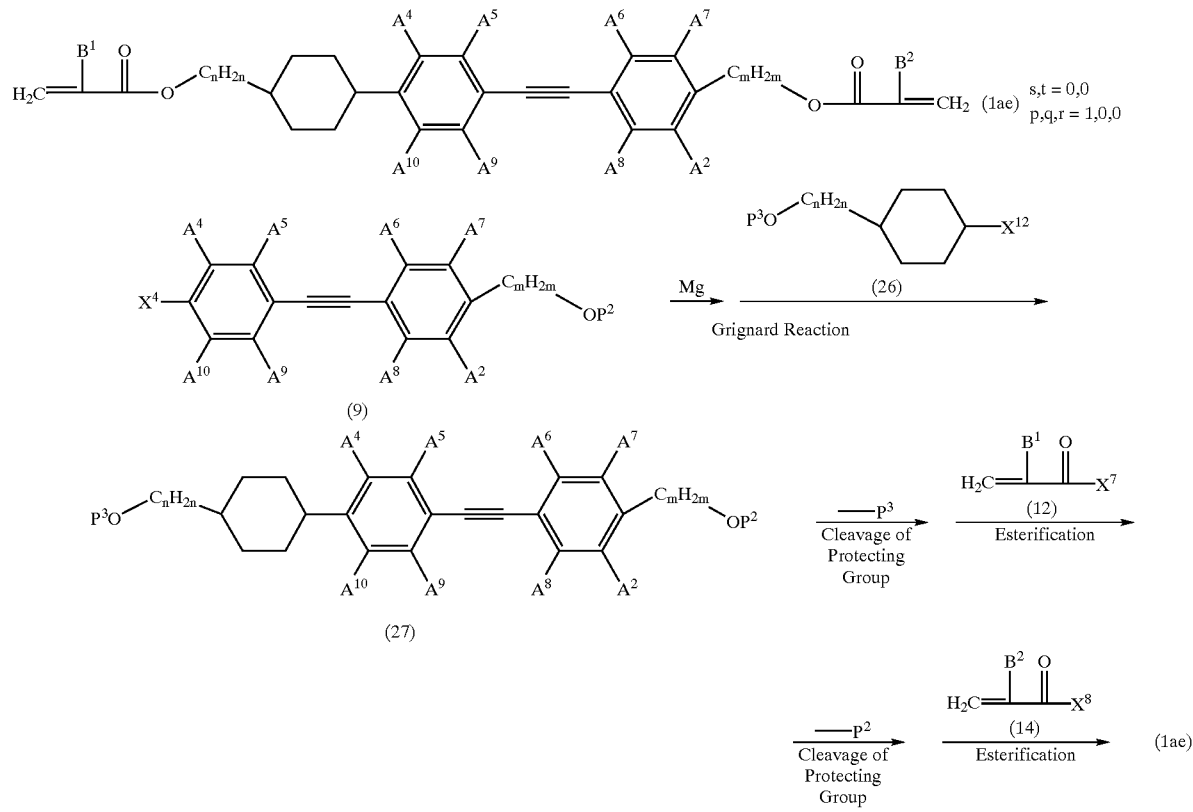

In the formulae above, $A^2$, $A^4$ to $A^{10}$, $B^1$, $B^2$, m, and n mean the same as in the formula (1). $X^7$, $X^8$, and $X^{12}$ each independently stands for a halogen atom, and $X^4$ stands for a halogen atom, $—OSO_2CF_3$, or $—OSO_2C_4F_9$. $P^2$ and $P^3$ each independently stands for a protecting group for a hydroxyl group.

Compounds represented by the formula (1) wherein (p, q, r, s, t)=(1, 0, 1, 0, 0), referred to as compound (1af) hereinbelow, may be produced, for example, according to the following synthesizing process.

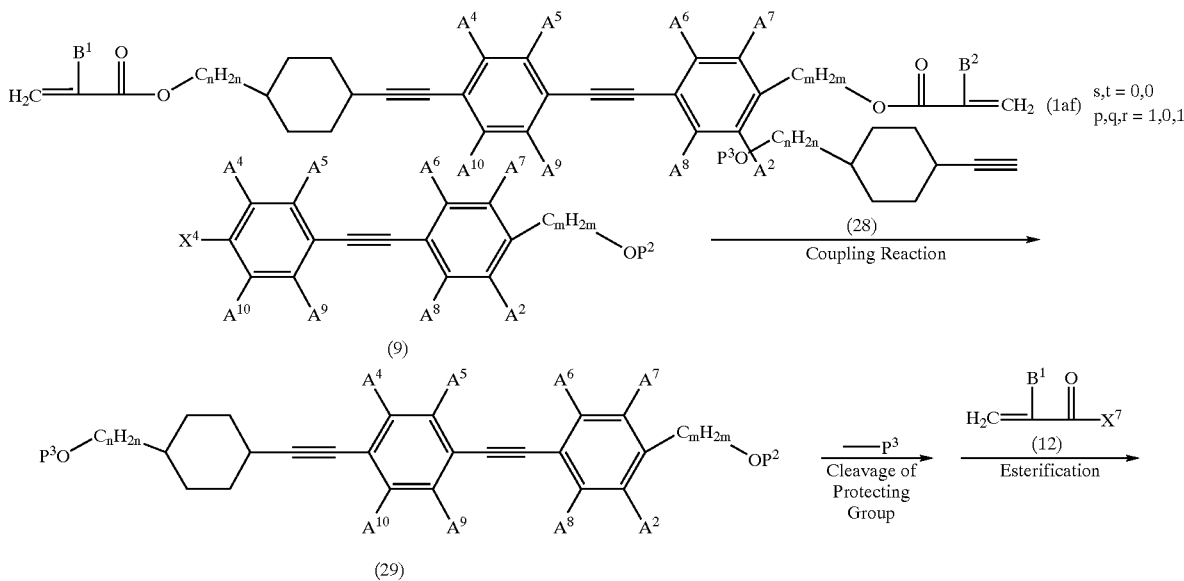

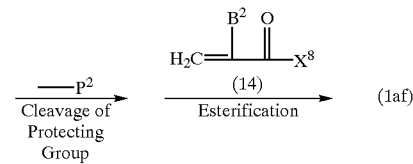

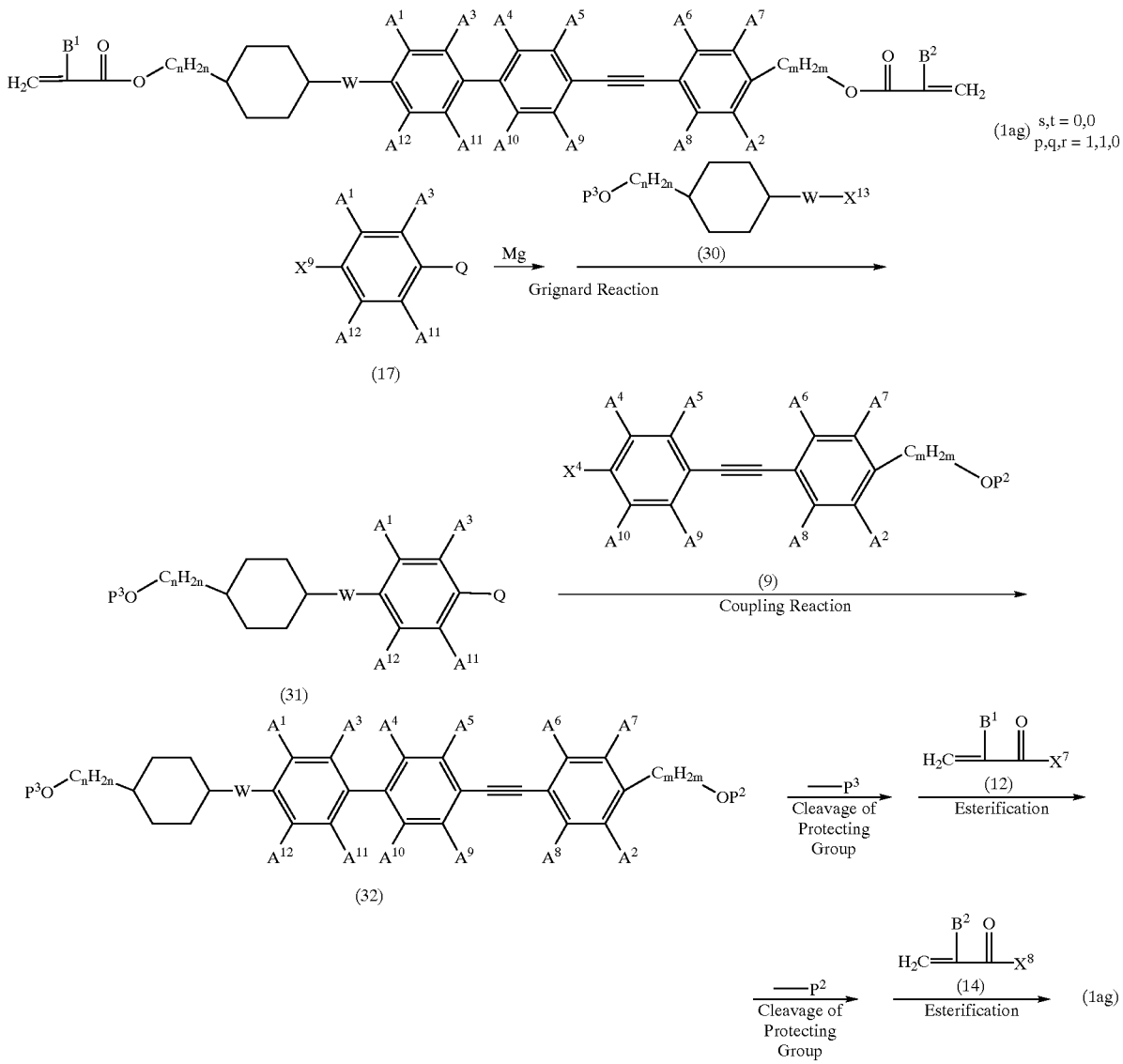

In the formulae above, $A^2$, $A^4$ to $A^{10}$, $B^1$, $B^2$, m, and n mean the same as in the formula (1). $X^7$ and $X^8$ each independently stands for a halogen atom, and $X^4$ stands for a halogen atom, $-OSO_2CF_3$, or $-OSO_2C_4F_9$. $P^2$ and $P^3$ each independently stands for a protecting group for a hydroxyl group.

The coupling reaction of the compounds represented by the formulae (9) and (28) in the above example of synthesis may be effected by reaction of the two compounds in the presence of copper iodide, a palladium catalyst, or a base such as triethylamine.

Compounds represented by the formula (1) wherein (p, q, r, s, t)=(1, 1, 0, 0, 0) referred to as compound (1ag) hereinbelow, may be produced, for example, according to the following synthesizing process.

In the formulae above, $A^1$ to $A^{12}$, $B^1$, $B^2$, W, m, and n mean the same as in the formula (1). $X^7$ to $X^9$ and $X^{13}$ each independently stands for a halogen atom, and $X^4$ stands for a halogen atom, $-OSO_2CF_3$, or $-OSO_2C_4F_9$. $P^2$ and $P^3$ each independently stands for a protecting group for a hydroxyl group. Q stands for $B(OZ^1)_2$ or $SnZ^2_3$, wherein $Z^1$ stands for a hydrogen atom or an alkyl group, two $Z^1$'s may be bonded to form a ring, and $Z^2$ stands for an alkyl group or a halogen atom.

The coupling reaction of the compounds represented by the formulae (9) and (31) may be effected by reaction of the two compounds in the presence of a palladium catalyst or a base such as sodium carbonate.

Compounds represented by the formula (1) wherein (p, q, r, s, t)=(1, 1, 1, 0, 0) referred to as compound (1ah) hereinbelow, may be produced, for example, according to the following synthesizing process.

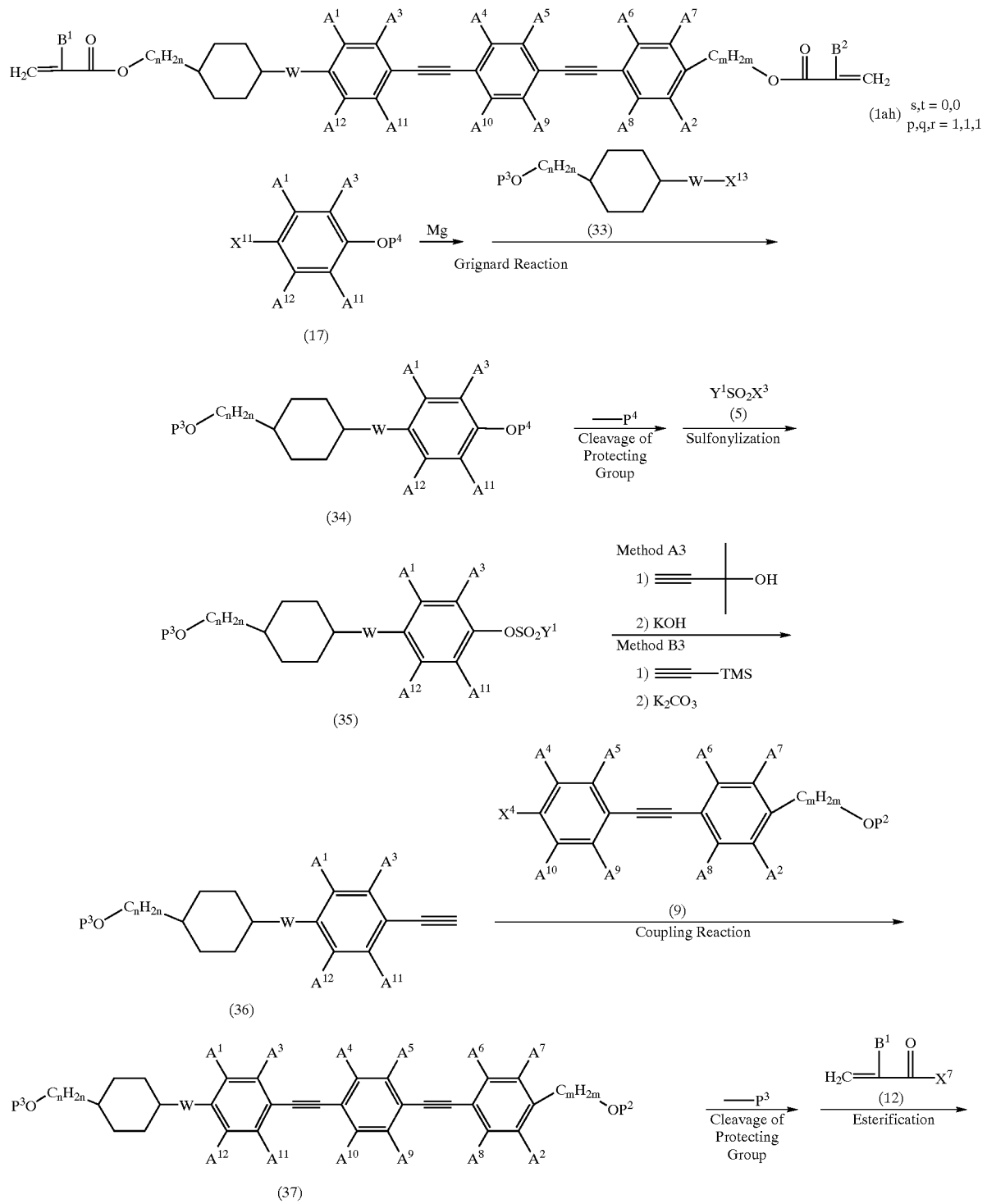

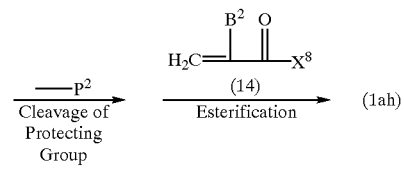

In the formulae above, $A^1$ to $A^{12}$, $B^1$, $B^2$, W, m, and n mean the same as in the formula (1). $X^7$, $X^8$, $X^{11}$, and $X^{13}$ each independently stands for a halogen atom, and $X^3$ and $X^4$ each independently stands for a halogen atom, $-OSO_2CF_3$, or $-OSO_2C_4F_9$. $Y^1$ stands for $-CF_3$ or $-C_4F_9$, and $P^2$ to $P^4$ each independently stands for a protecting group for a hydroxyl group.

The reaction for preparing the compound represented by the formula (36) from the compound represented by the formula (35) in the above example of synthesis may be effected, for example, through the following Method (A3) or (B3):

Method (A3): Reacting the compound represented by the formula (35) with 1,1-dimethyl-2-propynol in the presence of copper iodide, a palladium catalyst, or a base such as triethylamine, followed by reaction with a base such as an alkali hydroxide;

Method (B3): Reacting the compound represented by the formula (35) with trimethylsilylacetylene in the presence of copper iodide, a palladium catalyst, or a base such as triethylamine, followed by reaction with a base such as an alkali carbonate.

The coupling reaction of the compounds represented by the formulae (9) and (36) in the above example of synthesis may be effected by reaction of the two compounds in the presence of copper iodide, a palladium catalyst, or a base such as triethylamine.

Compounds represented by the formula (1) wherein (p, q, r, s, t)=(0, 0, 0, 1, 1), referred to as compound (1 ba) hereinbelow, may be produced, for example, according to the following synthesizing process.

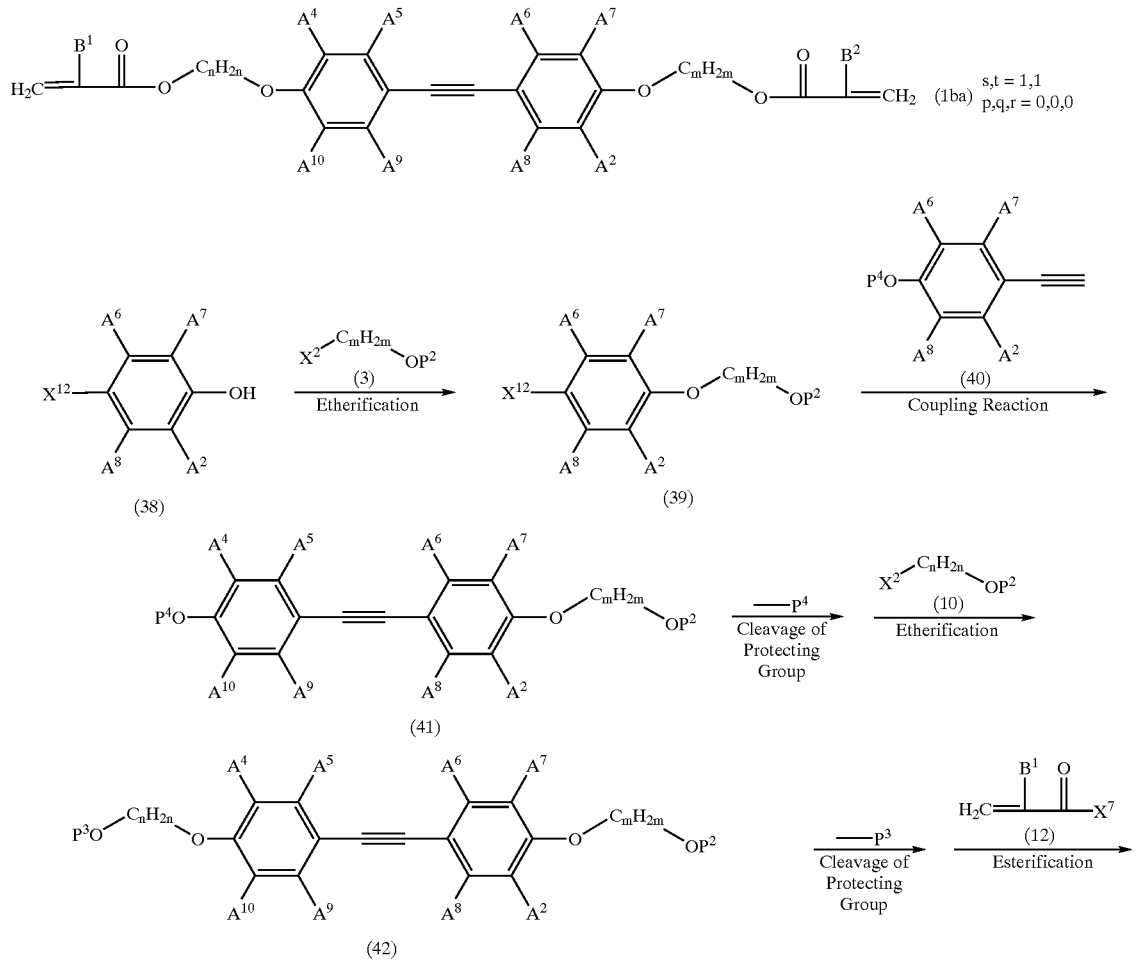

-continued

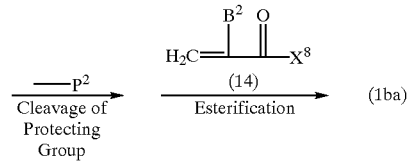

In the formulae above, $A^2$, $A^4$ to $A^{10}$, $B^1$, $B^2$, m, and n mean the same as in the formula (1). $X^2$ and $X^6$ to $X^8$ each independently stands for a halogen atom, and $X^{12}$ stands for a halogen atom, $-OSO_2CF_3$, or $-OSO_2C_4F_9$. $P^2$ and $P^4$ each independently stands for a protecting group for a hydroxyl group.

The coupling reaction of the compounds represented by the formulae (39) and (40) in the above example of synthesis may be effected by reaction of the two compounds in the presence of copper iodide, a palladium catalyst, or a base such as triethylamine.

Compounds represented by the formula (1) wherein (p, q, r, s, t)=(0, 0, 1, 1, 1) referred to as compound (1bb) hereinbelow, may be produced, for example, according to the following synthesizing process.

each independently stands for a halogen atom, $-OSO_2CF_3$, or $-OSO_2C_4F_9$. $R^1$ stands for an alkyl group having 1 to 4 carbon atoms or a phenyl group, and $P^2$ and $P^3$ each independently stands for a protecting group for a hydroxyl group.

The reaction for preparing the compound represented by the formula (43) from the compound represented by the formula (39) in the above example of synthesis may be effected, for example, through the following Method (A4) or (B4):

Method (A4): Reacting the compound represented by the formula (39) with 1,1-dimethyl-2-propynol in the presence of copper iodide, a palladium catalyst, or a base such as triethylamine, followed by reaction with a base such as an alkali hydroxide;

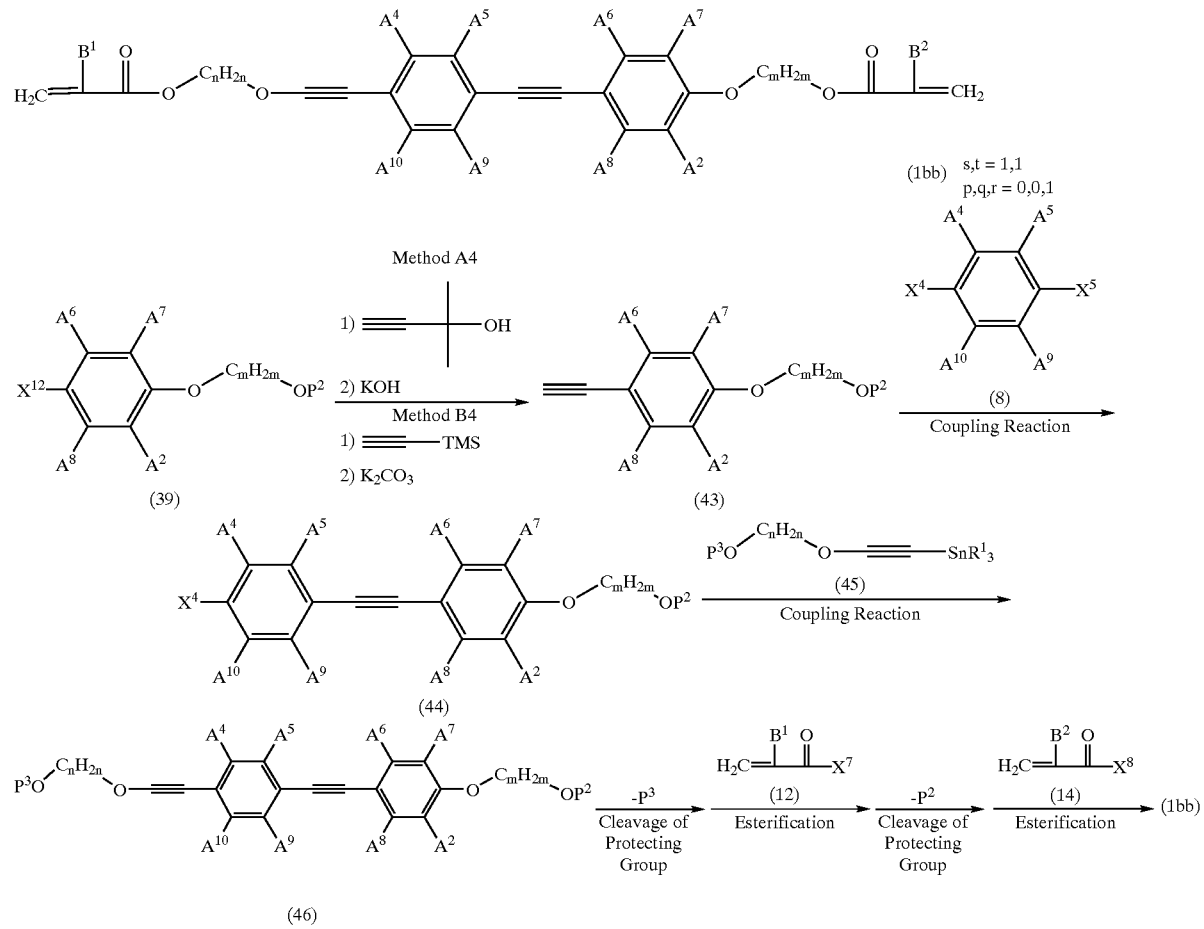

In the formulae above, $A^2$, $A^4$ to $A^{10}$, $B^1$, $B^2$, m, and n mean the same as in the formula (1). $X^5$, $X^7$, and $X^8$ each independently stands for a halogen atom, and $X^4$ and $X^{12}$ Method (B4): Reacting the compound represented by the formula (39) with trimethylsilylacetylene in the presence of copper iodide, a palladium catalyst, or a base such as triethylamine, followed by reaction with a base such as an alkali carbonate.

The coupling reaction of the compounds represented by the formulae (8) and (43) in the above example of synthesis may be effected by reaction of the two compounds in the presence of copper iodide, a palladium catalyst, or a base such as triethylamine.

The coupling reaction of the compounds represented by the formulae (44) and (45) in the above example of synthesis may be effected by reaction of the two compounds in the presence of a palladium catalyst.

Compounds represented by the formula (1) wherein (p, q, r, s, t)=(0, 1, 0, 1, 1), referred to as compound (1bc) hereinbelow, may be produced, for example, according to the following synthesizing process.

a halogen atom, —$OSO_2CF_3$, or —$OSO_2C_4F_9$. $P^2$ and $P^3$ each independently stands for a protecting group for a hydroxyl group. Q stands for $B(OZ^1)_2$ or $SnZ^2{}_3$, wherein $Z^1$ stands for a hydrogen atom or an alkyl group, two $Z^1$'s may be bonded to form a ring, and $Z^2$ stands for an alkyl group or a halogen atom.

The coupling reaction of the compounds represented by the formulae (44) and (48) maybe effected by reaction of the two compounds in the presence of a palladium catalyst or a base such as sodium carbonate.

Compounds represented by the formula (1) wherein (p, q, r, s, t)=(0, 1, 1, 1, 1), referred to as compound (1bd) hereinbelow, may be produced, for example, according to the following synthesizing process.

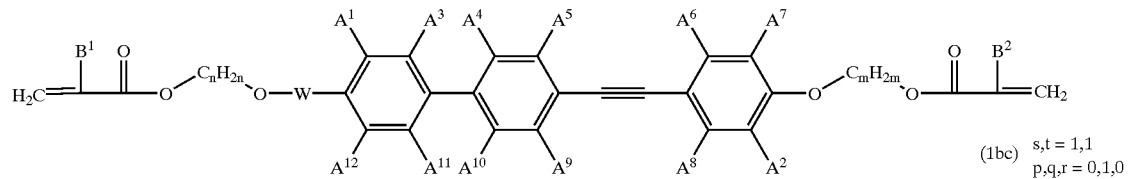

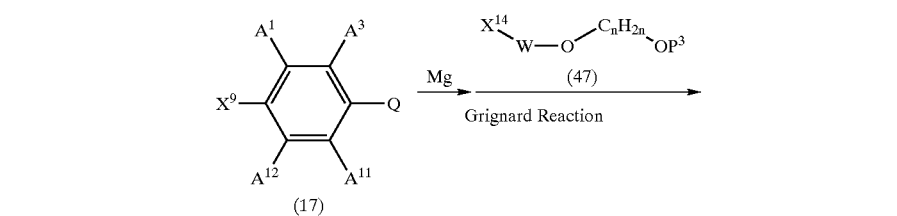

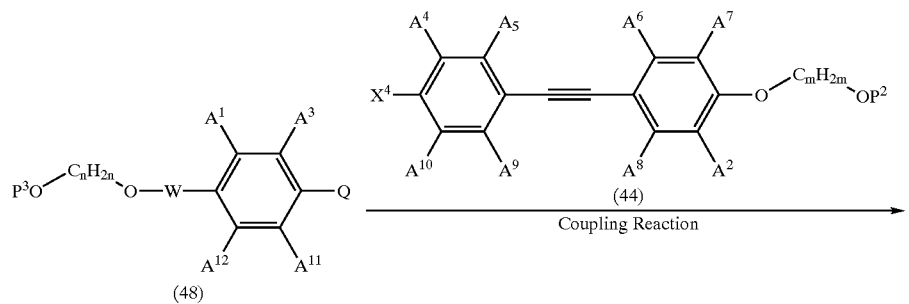

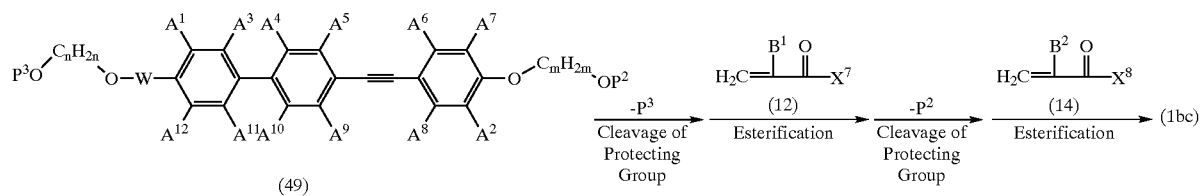

In the formulae above, $A^1$ to $A^{12}$, $B^1$, $B^2$, W, m, and n mean the same as in the formula (1). $X^7$ to $X^9$ and $X^{14}$ each independently stands for a halogen atom, and $X^4$ stands for

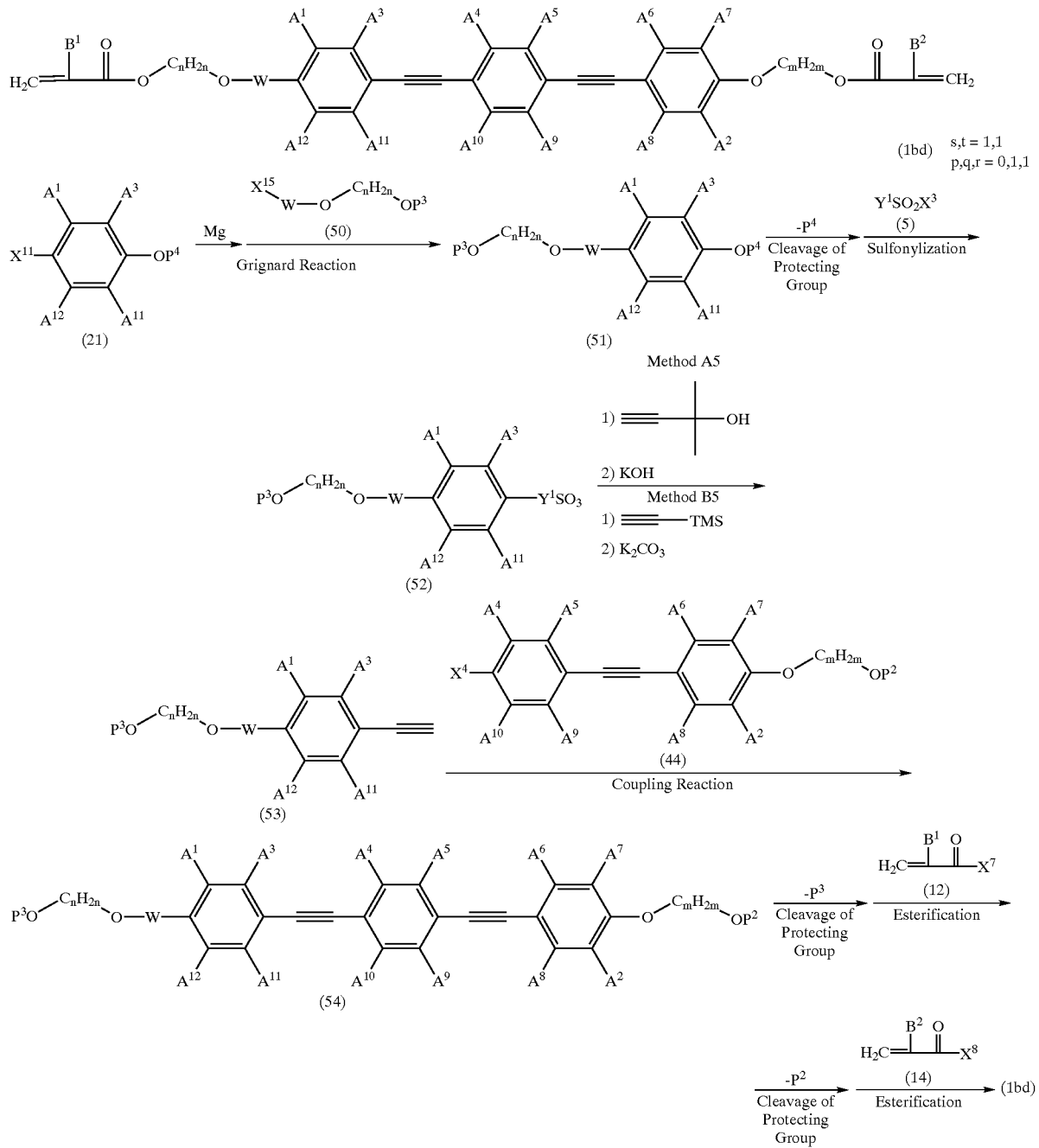

In the formulae above, $A^1$ to $A^{12}$, $B^1$, $B^2$, W, m, and n mean the same as in the formula (1). $X^7$, $X^8$, $X^{11}$, and $X^{15}$ each independently stands for a halogen atom, and $X^3$ and $X^4$ each independently stands for a halogen atom, $-OSO_2CF_3$, or $-OSO_2C_4F_9$. $P^2$ to $P^4$ each independently stands for a protecting group for a hydroxyl group.

The reaction for preparing the compound represented by the formula (53) from the compound represented by the formula (52) in the above example of synthesis may be effected, for example, through the following Method (A5) or (B5):

Method (A5): Reacting the compound represented by the formula (52) with 1,1-dimethyl-2-propynol in the presence of copper iodide, a palladium catalyst, or a base such as triethylamine, followed by reaction with a base such as an alkali hydroxide;

Method (B5): Reacting the compound represented by the formula (52) with trimethylsilylacetylene in the presence of copper iodide, a palladium catalyst, or a base such as triethylamine, followed by reaction with a base such as an alkali carbonate.

The coupling reaction of the compounds represented by the formulae (44) and (53) in the above example of synthesis may be effected by reaction of the two compounds in the presence of copper iodide, a palladium catalyst, or a base such as triethylamine.

Compounds represented by the formula (1) wherein (p, q, r, s, t)=(1, 0, 0, 1, 1), referred to as compound (1be) hereinbelow, may be produced, for example, according to the following synthesizing process.

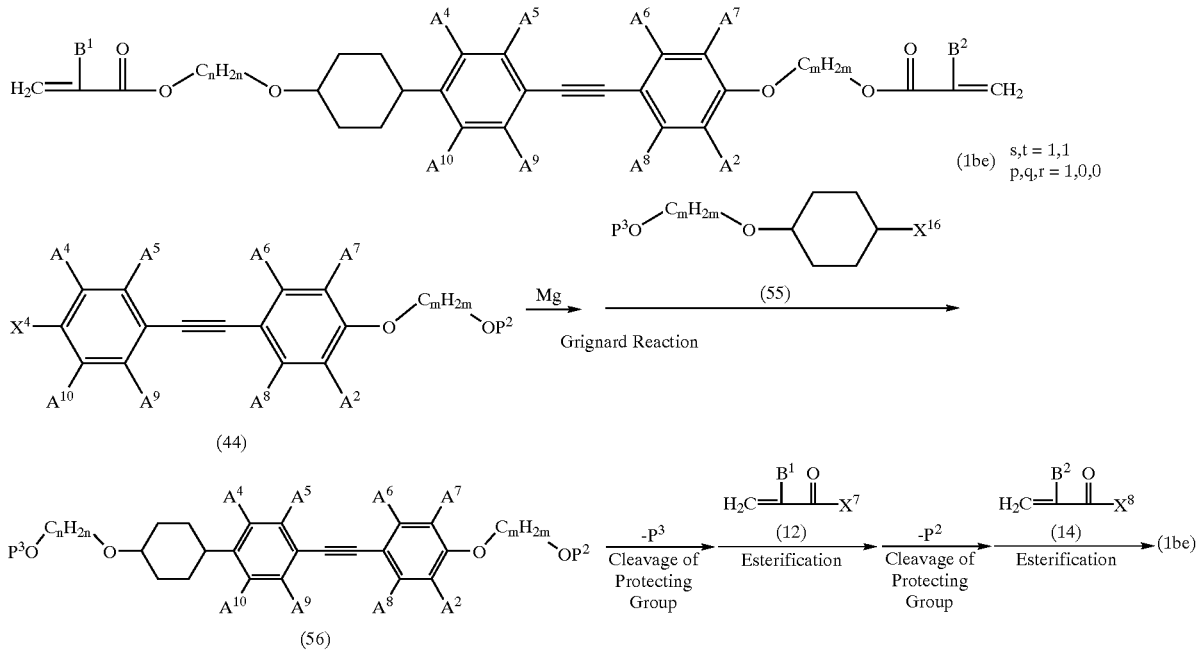

In the formulae above, $A^2$, $A^4$ to $A^{10}$, $B^1$, $B^2$, m, and n mean the same as in the formula (1). $X^4$, $X^7$, $X^8$, and $X^{16}$ each independently stands for a halogen atom. $P^2$ and $P^3$ each independently stands for a protecting group for a hydroxyl group.

Compounds represented by the formula (1) wherein (p, q, r, s, t)=(1, 0, 1, 1, 1), referred to as compound (1bf) hereinbelow, may be produced, for example, according to the following synthesizing process.

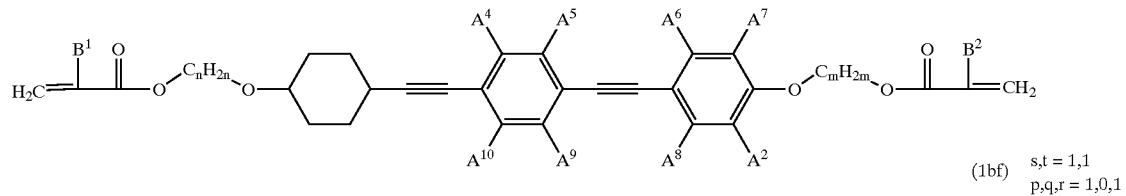

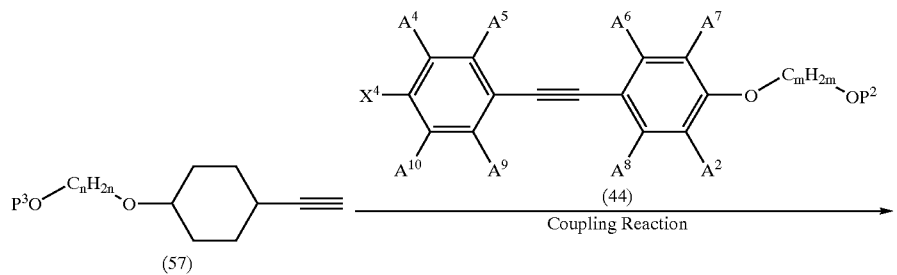

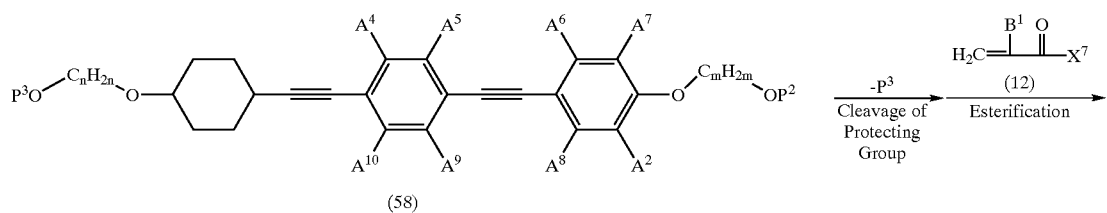

-continued

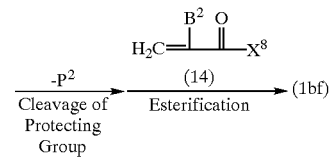

In the formulae above, $A^2$, $A^4$ to $A^{10}$, $B^1$, $B^2$, m, and n mean the same as in the formula (1). $X^7$ and $X^8$ each independently stands for a halogen atom, and $X^4$ stands for a halogen atom, $-OSO_2CF_3$, or $-OSO_2C_4F_9$. $P^2$ and $P^3$ each independently stands for a protecting group for a hydroxyl group.

The coupling reaction of the compounds represented by the formulae (44) and (57) in the above example of synthesis may be effected by reaction of the two compounds in the presence of copper iodide, a palladium catalyst, or a base such as triethylamine.

Compounds represented by the formula (1) wherein (p, q, r, s, t)=(1, 1, 0, 1, 1) referred to as compound (1bg) hereinbelow, may be produced, for example, according to the following synthesizing process.

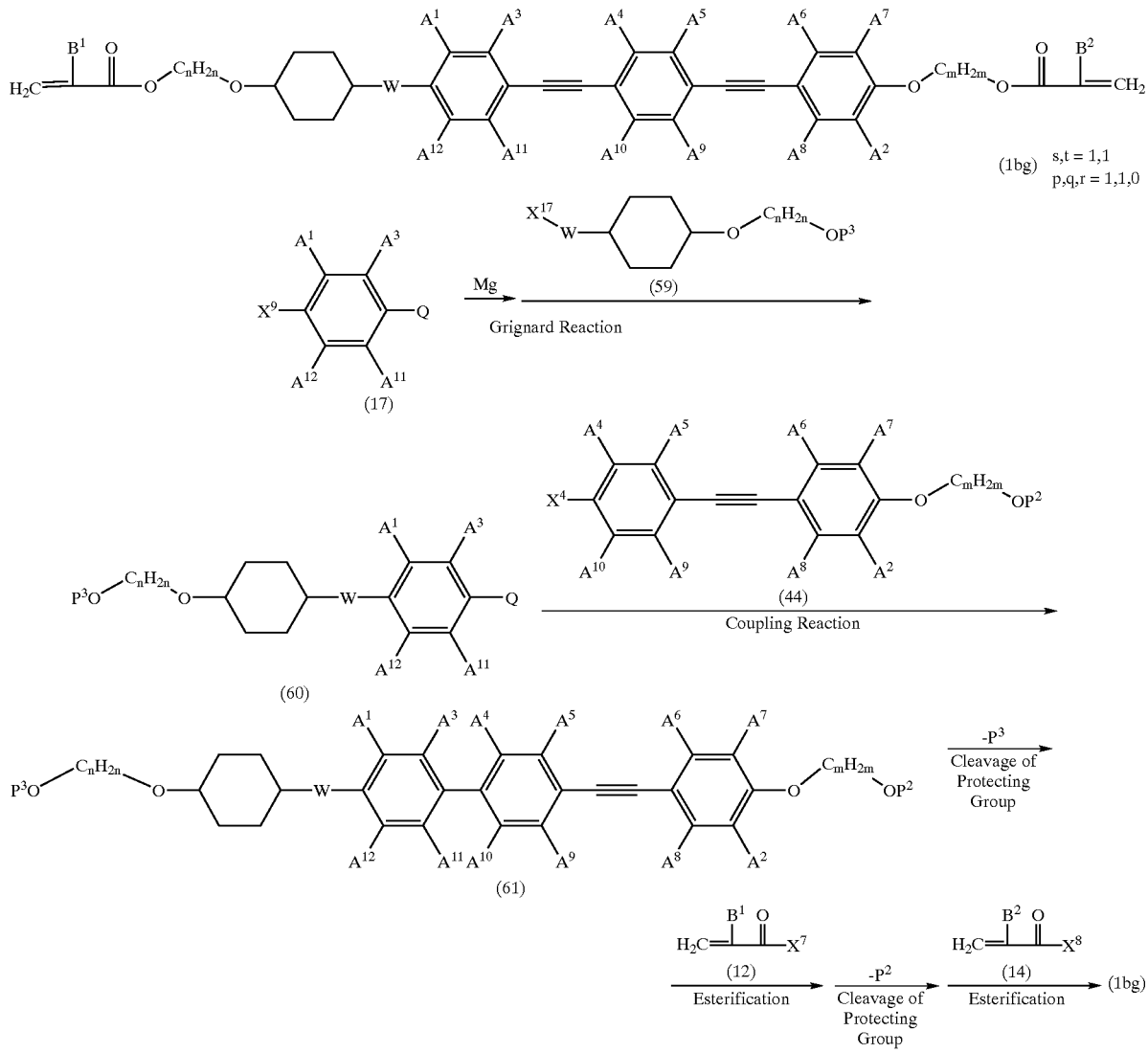

In the formulae above, $A^1$ to $A^{12}$, $B^1$, $B^2$, W, m, and n mean the same as in the formula (1). $X^7$ to $X^9$ and $X^{17}$ each independently stands for a halogen atom, and $X^4$ stands for a halogen atom, $-OSO_2CF_3$, or $-OSO_2C_4F_9$. $P^2$ and $P^3$ each independently stands for a protecting group for a hydroxyl group. Q stands for $B(OZ^1)_2$ or $SnZ^2{}_3$, wherein $Z^1$ stands for a hydrogen atom or an alkyl group, two $Z^1$'s may be bonded to form a ring, and $Z^2$ stands for an alkyl group or a halogen atom.

The coupling reaction of the compounds represented by the formulae (44) and (60) maybe be effected by reaction of the two compounds in the presence of a palladium catalyst or a base such as sodium carbonate.

Compounds represented by the formula (1) wherein (p, q, r, s, t)=(1, 1, 1, 1, 1), referred to as compound (1bh) hereinbelow, may be produced, for example, according to the following synthesizing process.

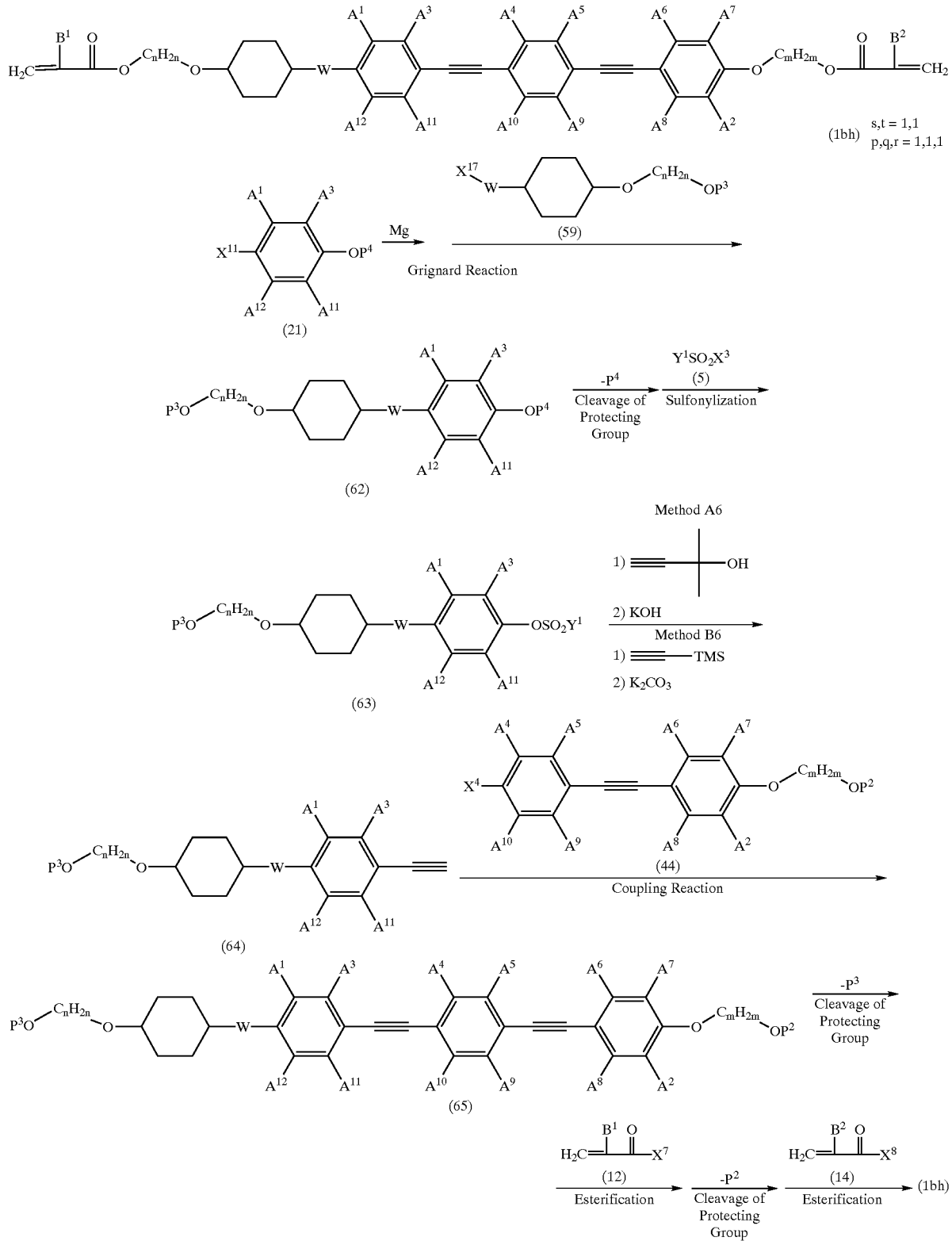

In the formulae above, $A^1$ to $A^{12}$, $B^1$, $B^2$, W, m, and n mean the same as in the formula (1). $X^7$, $X^8$, $X^{11}$, and $X^{17}$ each independently stands for a halogen atom, and $X^3$ and $X^4$ each independently stands for a halogen atom, $-OSO_2CF_3$, or $-OSO_2C_4F_9$. $Y^1$ stands for $-CF_3$ or $-C_4F_9$, and $P^2$ to $P^4$ each independently stands for a protecting group for a hydroxyl group.

The reaction for preparing the compound represented by the formula (64) from the compound represented by the formula (63) in the above example of synthesis may be effected, for example, through the following Method (A6) or (B6):

Method (A6): Reacting the compound represented by the formula (63) with 1,1-dimethyl-2-propynol in the presence of copper iodide, a palladium catalyst, or a base such as triethylamine, followed by reaction with a base such as an alkali hydroxide;

Method (B6): Reacting the compound represented by the formula (63) with trimethylsilylacetylene in the presence of copper iodide, a palladium catalyst, or a base such as triethylamine, followed by reaction with a base such as an alkali carbonate.

The coupling reaction of the compounds represented by the formulae (44) and (64) in the above example of synthesis may be effected by reaction of the two compounds in the presence of copper iodide, a palladium catalyst, or a base such as triethylamine.

Compounds represented by the formula (1) wherein (p, q, r, s, t)=(0, 0, 0, 0, 1), referred to as compound (1ca) hereinbelow, may be produced, for example, according to the same synthesizing process for the compound (1aa) except that the compound represented by the formula (6) is replaced with the compound represented by the formula (39).

Compounds represented by the formula (1) wherein (p, q, r, s, t)=(0, 0, 1, 0, 1), referred to as compound (1cb) hereinbelow, may be produced, for example, according to the same synthesizing process for the compound (1ab) except that the compound represented by the formula (9) is replaced with the compound represented by the formula (44).

Compounds represented by the formula (1) wherein (p, q, r, s, t)=(0, 1, 0, 0, 1), referred to as compound (1cc) hereinbelow, may be produced, for example, according to the same synthesizing process for the compound (1ac) except that the compound represented by the formula (9) is replaced with the compound represented by the formula (44).

Compounds represented by the formula (1) wherein (p, q, r, s, t)=(0, 1, 1, 0, 1), referred to as compound (1cd) hereinbelow, may be produced, for example, according to the same synthesizing process for the compound (1ad) except that the compound represented by the formula (9) is replaced with the compound represented by the formula (44).

Compounds represented by the formula (1) wherein (p, q, r, s, t)=(1, 0, 0, 0, 1), referred to as compound (1ce) hereinbelow, may be produced, for example, according to the same synthesizing process for the compound (1ae) except that the compound represented by the formula (9) is replaced with the compound represented by the formula (44).

Compounds represented by the formula (1) wherein (p, q, r, s, t)=(1, 0, 1, 0, 1), referred to as compound (1cf) hereinbelow, may be produced, for example, according to the same synthesizing process for the compound (1af) except that the compound represented by the formula (9) is replaced with the compound represented by the formula (44).

Compounds represented by the formula (1) wherein (p, q, r, s, t)=(1, 1, 0, 0, 1), referred to as compound (1cg) hereinbelow, may be produced, for example, according to the same synthesizing process for the compound (1ag) except that the compound represented by the formula (9) is replaced with the compound represented by the formula (44).

Compounds represented by the formula (1) wherein (p, q, r, s, t)=(1, 1, 1, 0, 1), referred to as compound (1ch) hereinbelow, may be produced, for example, according to the same synthesizing process for the compound (1ah) except that the compound represented by the formula (9) is replaced with the compound represented by the formula (44).

Compounds represented by the formula (1) wherein (p, q, r, s, t)=(0, 0, 0, 1, 0), referred to as compound (1da) hereinbelow, may be produced, for example, according to the following synthesizing process.

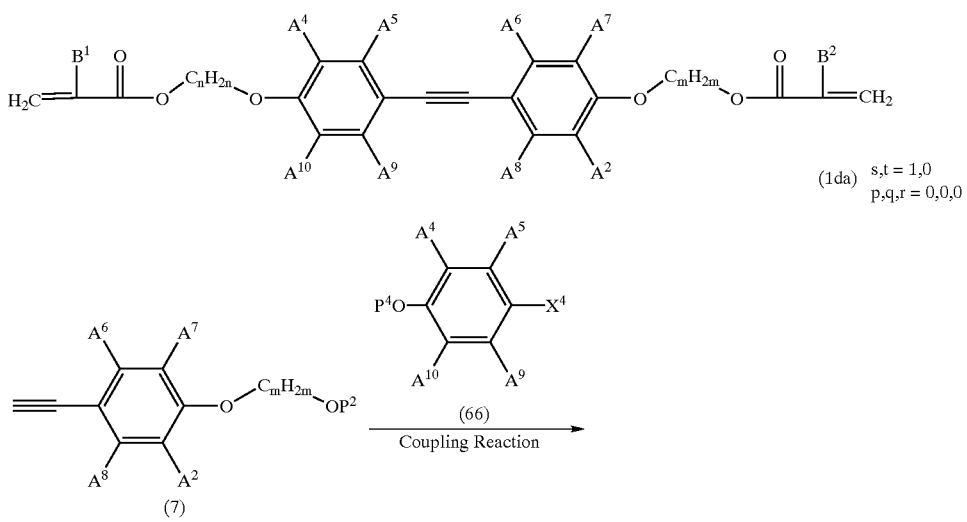

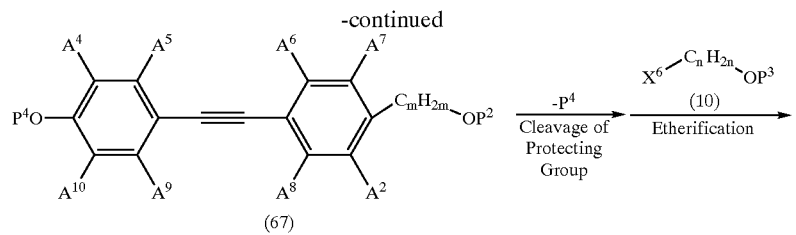

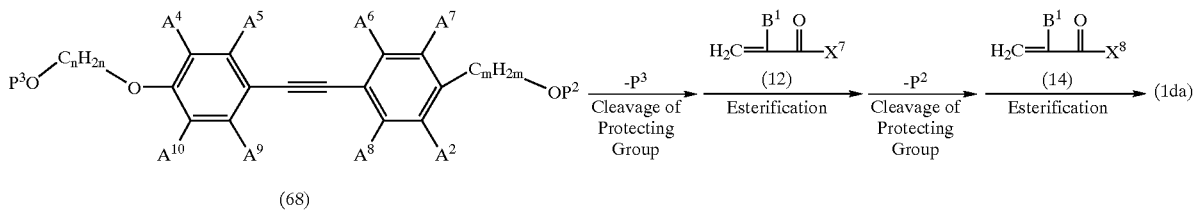

In the formulae above, $A^2$, $A^4$ to $A^{10}$, $B^1$, $B^2$, m, and n mean the same as in the formula (1). $X^6$ to $X^8$ each independently stands for a halogen atom, and $X^4$ stands for a halogen atom, $-OSO_2CF_3$, or $-OSO_2C_4F_9$. $P^2$ to $P^4$ each independently stands for a protecting group for a hydroxyl group.

The coupling reaction of the compounds represented by the formulae (7) and (66) in the above example of synthesis may be effected by reaction of the two compounds in the presence of copper iodide, a palladium catalyst, or a base such as triethylamine.

Compounds represented by the formula (1) wherein (p, q, r, s, t)=(0, 0, 1, 1, 0), referred to as compound (1db) hereinbelow, may be produced, for example, according to the same synthesizing process for the compound (1bb) except that the compound represented by the formula (44) is replaced with the compound represented by the formula (9).

Compounds represented by the formula (1) wherein (p, q, r, s, t)=(0, 1, 0, 1, 0), referred to as compound (1dc) hereinbelow, may be produced, for example, according to the same synthesizing process for the compound (1bc) except that the compound represented by the formula (44) is replaced with the compound represented by the formula (9).

Compounds represented by the formula (1) wherein (p, q, r, s, t)=(0, 1, 1, 1, 0), referred to as compound (1dd) hereinbelow, may be produced, for example, according to the same synthesizing process for the compound (1bd) except that the compound represented by the formula (44) is replaced with the compound represented by the formula (9).

Compounds represented by the formula (1) wherein (p, q, r, s, t)=(1, 0, 0, 1, 0), referred to as compound (1de) hereinbelow, may be produced, for example, according to the same synthesizing process for the compound (1be) except that the compound represented by the formula (44) is replaced with the compound represented by the formula (9).

Compounds represented by the formula (1) wherein (p, q, r, s, t)=(1, 0, 1, 1, 0), referred to as compound (1df) hereinbelow, may be produced, for example, according to the same synthesizing process for the compound (1bf) except that the compound represented by the formula (44) is replaced with the compound represented by the formula (9).

Compounds represented by the formula (1) wherein (p, q, r, s, t)=(1, 1, 0, 1, 0), referred to as compound (1dg) hereinbelow, may be produced, for example, according to the same synthesizing process for the compound (1bg) except that the compound represented by the formula (44) is replaced with the compound represented by the formula (9).

Compounds represented by the formula (1) wherein (p, q, r, s, t)=(1, 1, 1, 1, 0), referred to as compound (1dh) hereinbelow, may be produced, for example, according to the same synthesizing process for the compound (1bh) except that the compound represented by the formula (44) is replaced with the compound represented by the formula (9).

The liquid crystal compositions of the present invention contain one or more phenylacetylene compounds represented by the formula (1) above. The liquid crystal compositions may optionally contain other liquid crystalline materials depending on the purpose of the compounds, as long as their liquid crystal properties are maintained.

In the liquid crystal compositions of the present invention, the content of the one or more phenylacetylene compounds represented by the formula (1) may suitably be selected depending on the purpose of the compositions, but is usually not less than 50 wt %, preferably 60 to 90 wt % of the weight of the liquid crystal compositions.

Examples of such other liquid crystalline materials contained in the liquid crystal compositions of the present invention may preferably include liquid crystalline compounds represented by the formulae (α-1) to (α-3); monomer (A) having at least one kind of polymerizable functional group selected from the group consisting of a methacrylate ester, an acrylate ester, epoxy, and vinyl ether; or mixtures thereof:

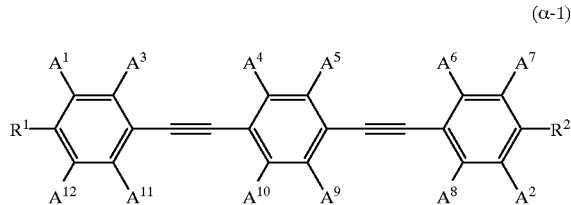

(α-1)

wherein $A^1$ to $A^{12}$ each independently stands for a hydrogen atom, a fluorine atom, an alkyl or alkoxy group having 1 to 10 carbon atoms optionally substituted with at least one fluorine atom; $R^1$ and $R^2$ each independently stands for a hydrogen atom, a fluorine atom, a cyano group, —SF$_5$, —NCS, a 4-$R^3$-(cycloalkyl) group, a 4-$R^3$-(cycloalkenyl) group, or an $R^4$—(O)$q^1$ group, wherein $R^3$ stands for a hydrogen atom or a straight or branched alkyl group having 1 to 12 carbon atoms optionally substituted with at least one fluorine atom, $R^4$ stands for a straight or branched alkyl group having 1 to 12 carbon atoms optionally substituted with at least one fluorine atom, and $q^1$ denotes 0 or 1;

wherein rings A, B, C, and D each independently stands for 1,4-phenylene, 1,4-cyclohexylene, 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl, or 5,2-dioxanediyl, and at least one hydrogen atom on any of the rings A, B, C, and D may be substituted with a fluorine atom; $R^5$ and $R^6$ each independently stands for a hydrogen atom, a fluorine atom, a fluoromethyl group, a difluoromethyl group, a trifluoromethyl group, a fluoromethoxy group, a difluoromethoxy group, a trifluoromethoxy group, a cyano group, an alkyl group having 1 to 12 carbon atoms, an alkenyl group having 2 to 12 carbon atoms, an alkoxy group having 1 to 12 carbon atoms, an alkenyloxy group having 2 to 12 carbon atoms, an alkynyloxy group having 3 to 12 carbon atoms, an alkoxyalkyl group having 2 to 16 carbon atoms, or an alkoxyalkenyl group having 3 to 16 carbon atoms, wherein at least one methylene group of an alkyl, alkenyl, or alkynyl group may be replaced with an oxygen, sulfur, or silicon atom, and these groups may be straight or

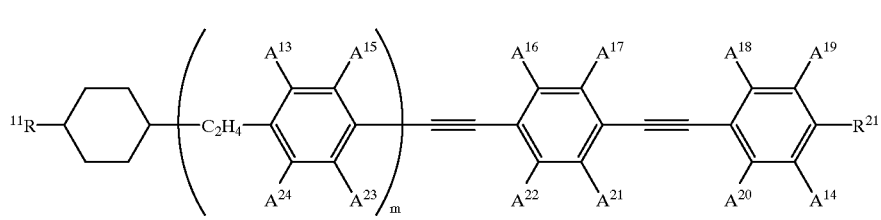

(α-2)

wherein $A^{13}$ to $A^{24}$ each independently stands for a hydrogen atom, a fluorine atom, or an alkyl group having 1 to 10 carbon atoms; m is 0 or 1; $R^{11}$ stands for a hydrogen atom or a straight or branched alkyl group having 1 to 12 carbon atoms optionally substituted with at least one fluorine atom; $R^{21}$ stands for $R^{11}$, a fluorine atom, a cyano group, a 4-$R^{31}$-(cycloalkyl) group, a 4-$R^{31}$-(cycloalkenyl) group, or an $R^{41}$—(O) $q^2$ group, wherein $R^{31}$ stands for a hydrogen atom or a straight or branched alkyl group having 1 to 12 carbon atoms optionally substituted with at least one fluorine atom; $R^{41}$ stands for an alkyl group having 1 to 12 carbon atoms optionally substituted with at least one fluorine atom; $q^2$ is 0 or 1;

branched; $Z^1$, $Z^2$, and $Z^3$ each independently stands for —COO—, —OCO—, —OCH$_2$—, —CH$_2$O—, an alkylene group having 1 to 5 carbon atoms, an alkenylene group having 2 to 5 carbon atoms, an alkynylene group having 2 to 5 carbon atoms, or a single bond; b, c, and d each independently denotes 0 or 1 with b+c+d≧1.

Examples of the compounds represented by the formula (α-1) may include the compounds represented by the following formulae, which compounds may be synthesized through ordinary organic synthesizing processes:

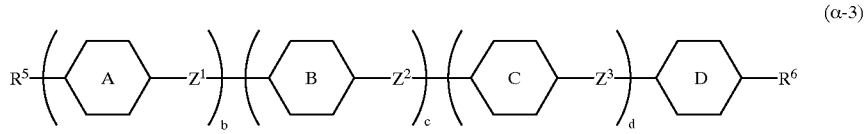

(α-3)

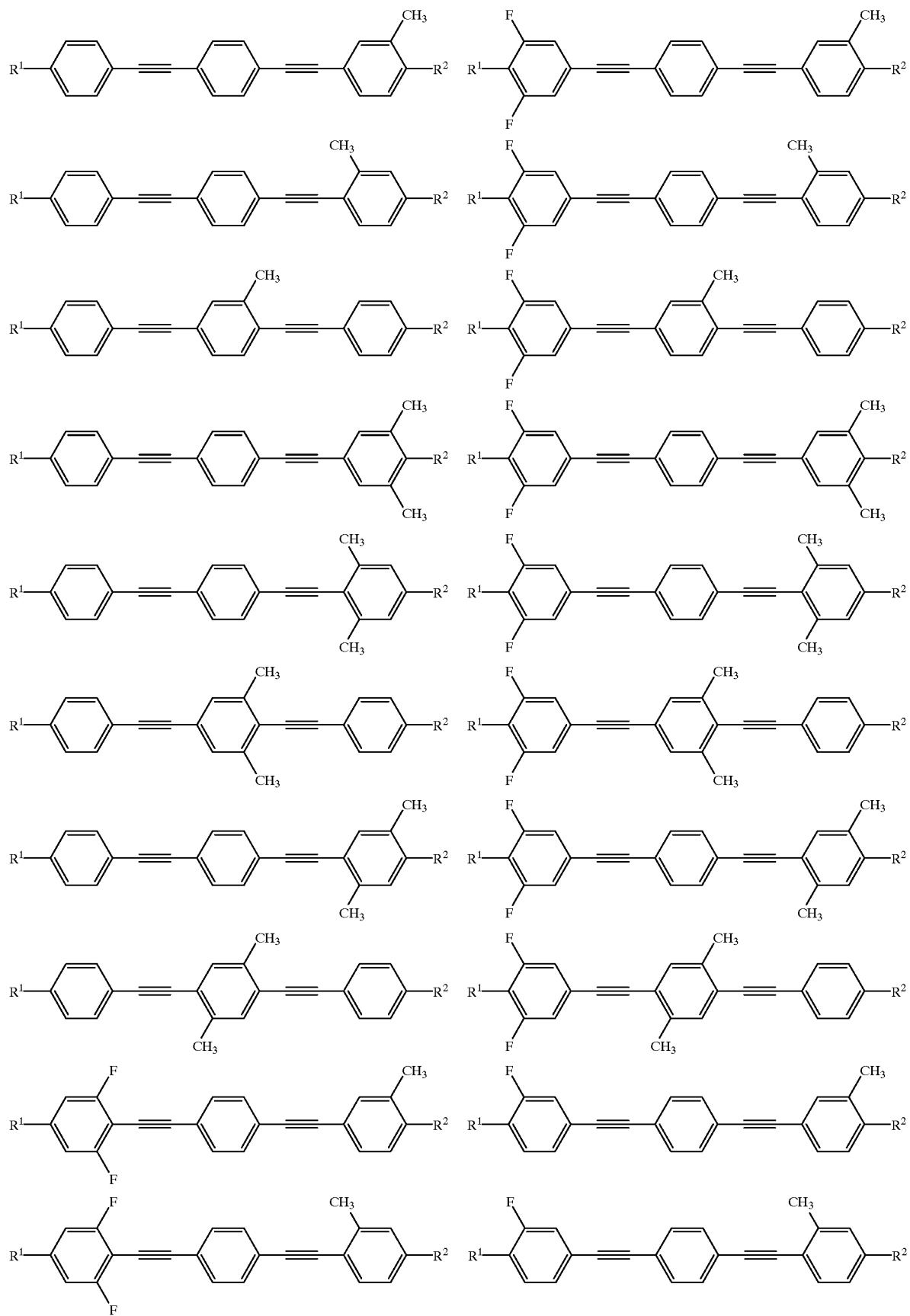

-continued
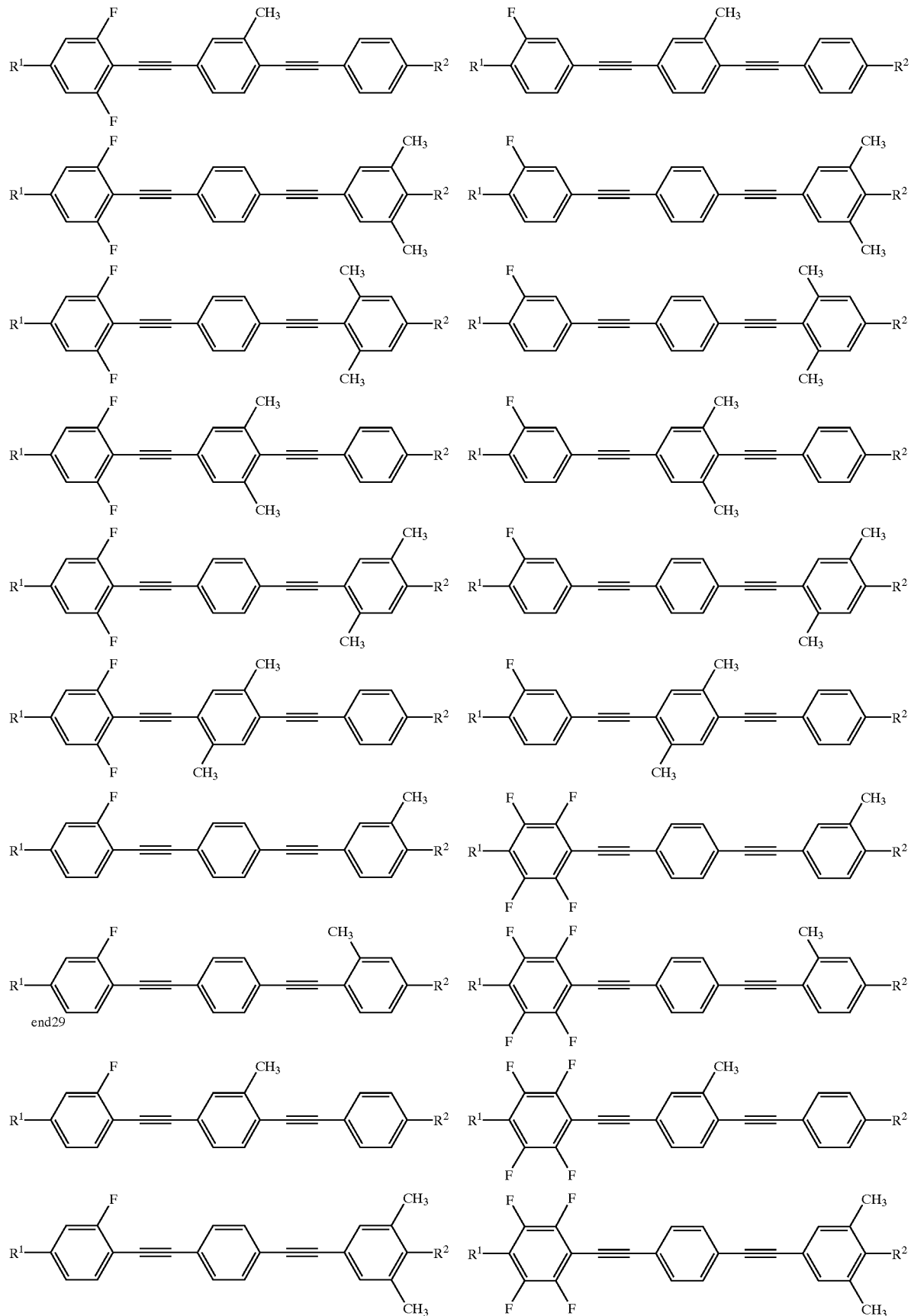

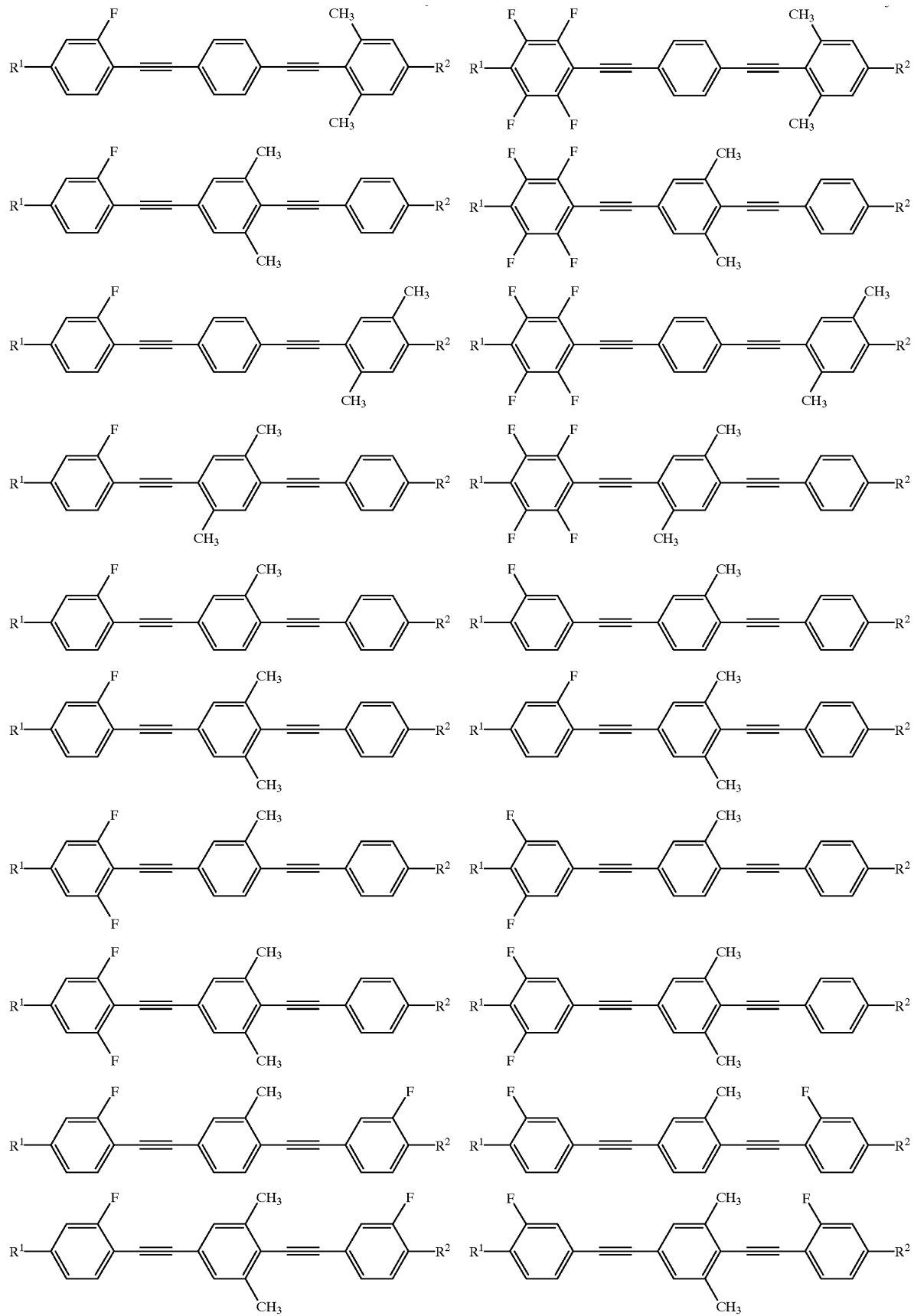

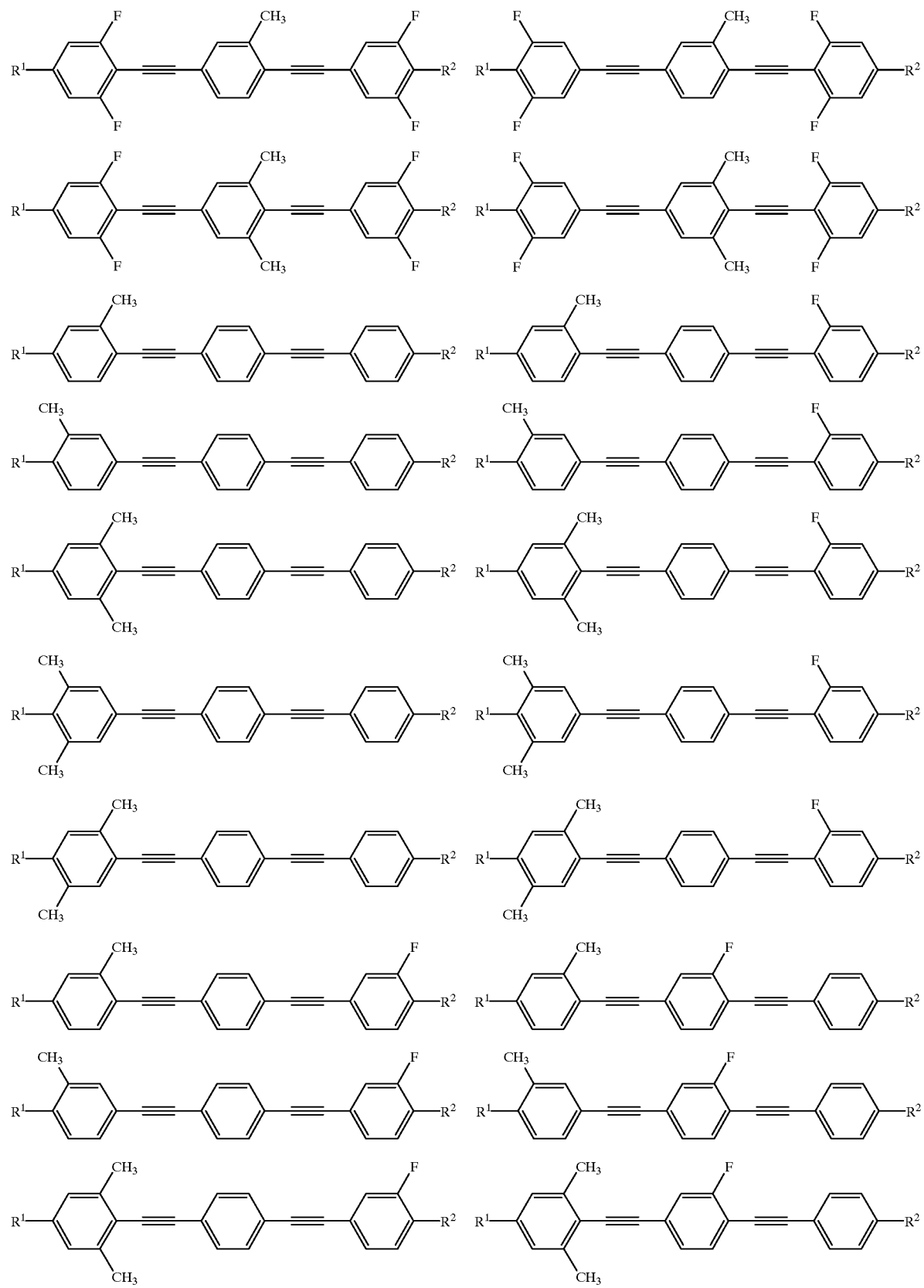

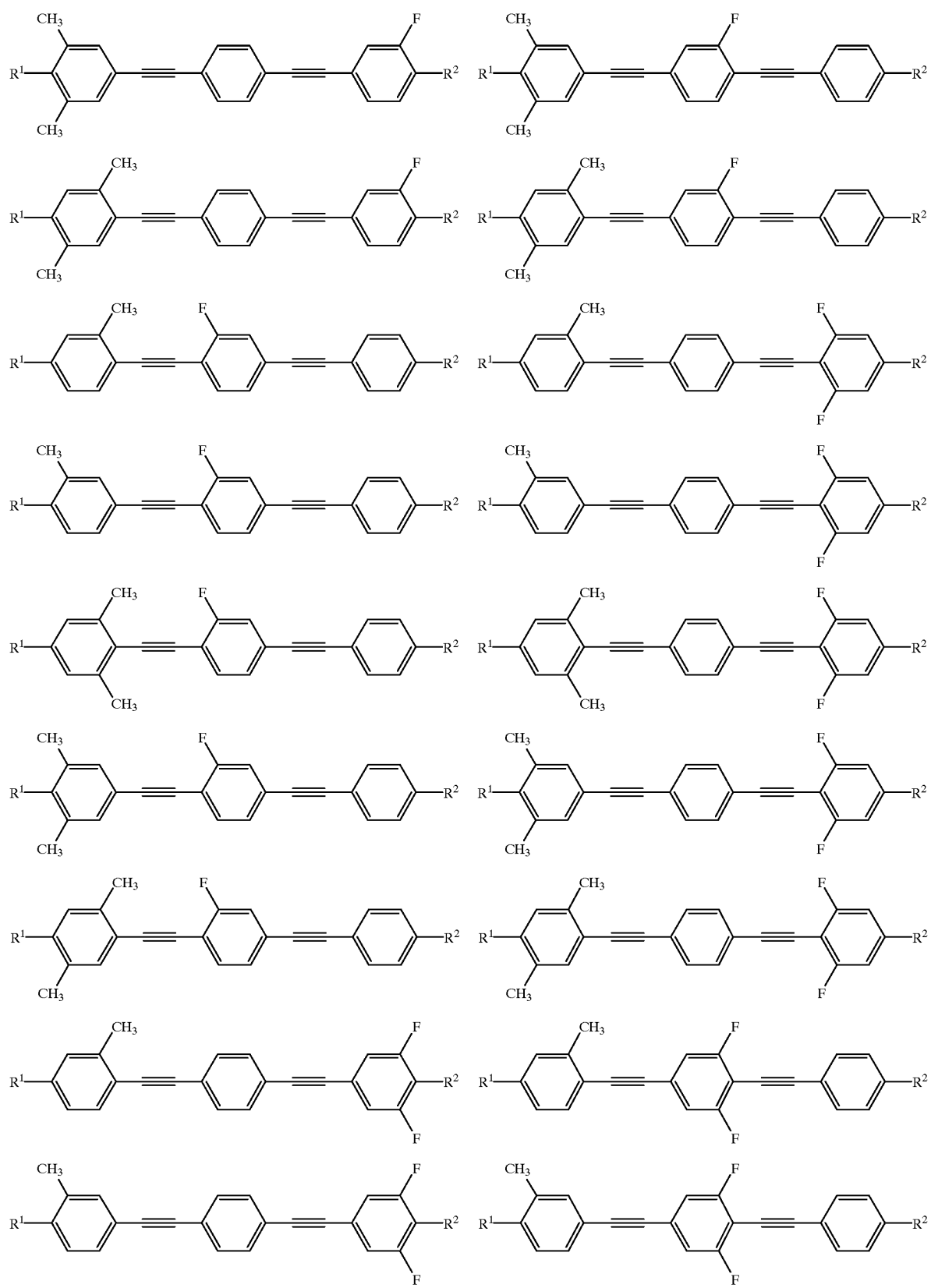

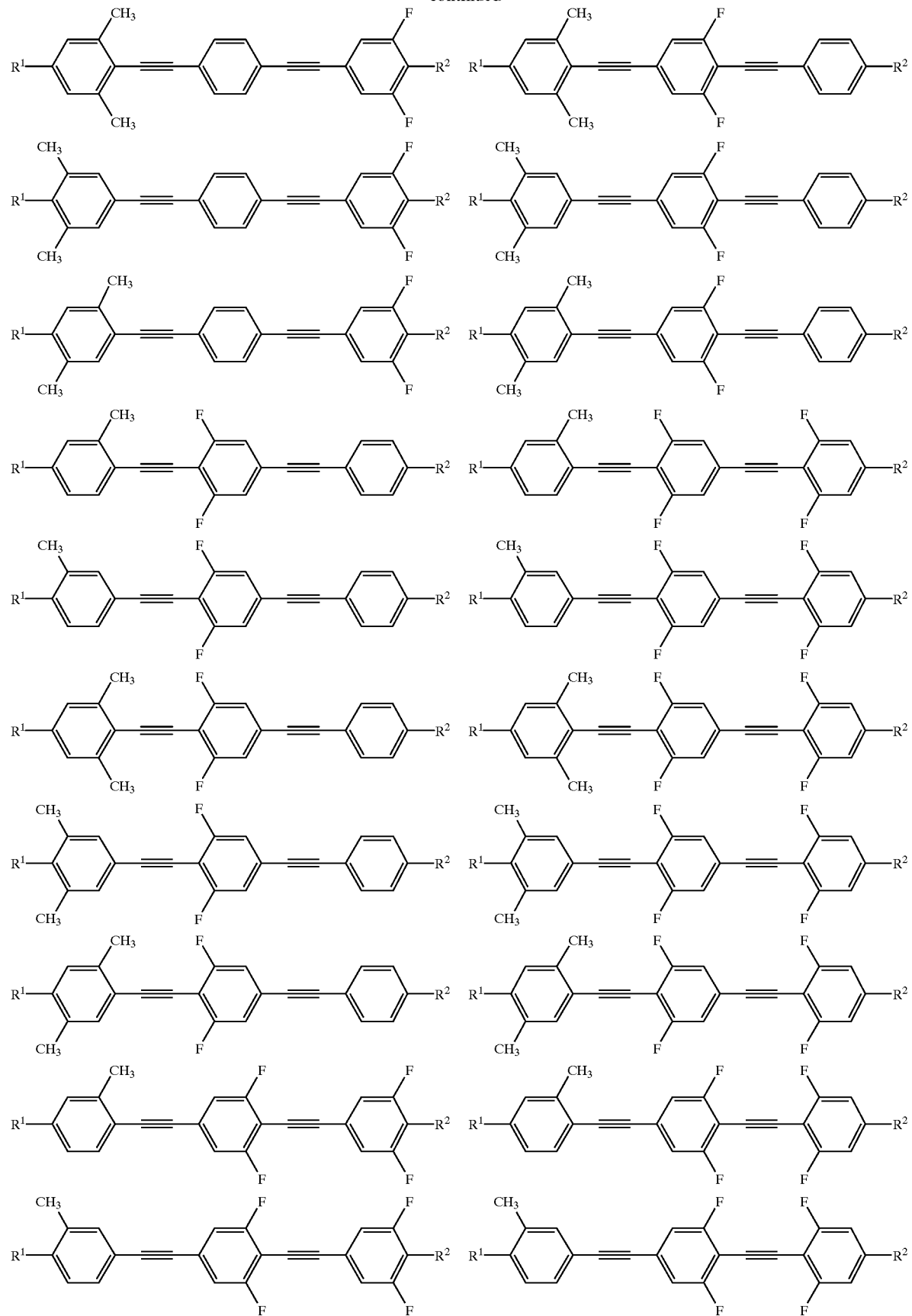

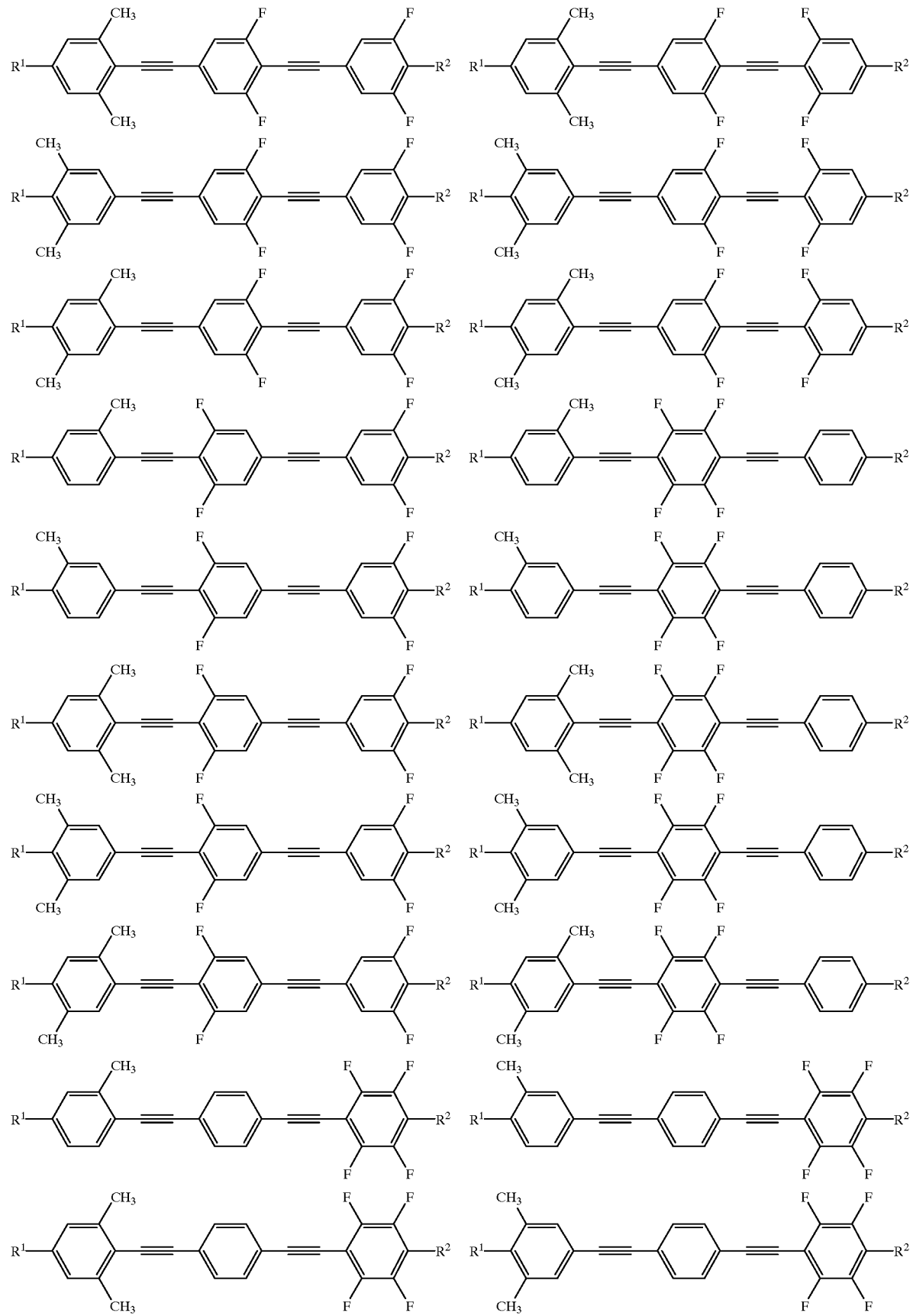
-continued

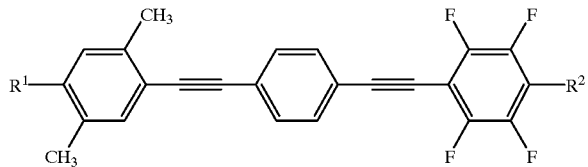

In the formula (α-1), each of $R^1$ and $R^2$ may independently stands for, for example, a hydrogen atom; a fluorine atom; an alkyl group such as a methyl, ethyl, propyl, butyl, pentyl, hexyl, heptyl, octyl, nonyl, decyl, undecyl, or dodecyl group, or an alkyl group substituted with at least one fluorine atom, i.e. a fluoroalkyl group such as a trifluoromethyl group; an alkoxy group such as a methoxy, ethoxy, propoxy, butoxy, pentyloxy, hexyloxy, octyloxy, nonyloxy, decyloxy, undecyloxy, or dodecyloxy group, or an alkoxy group substituted with at least one fluorine atom, i.e. a fluoroalkoxy group such as a methoxy group having 1 to 3 substituted fluorine atoms, or an ethoxy group having 1 to 5 substituted fluorine atoms; an alkoxyalkyl group such as a methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, methoxybutyl, ethoxybutyl, propoxybutyl, butoxybutyl, pentyloxybutyl, hexyloxybutyl, heptyloxybutyl, octyloxybutyl, methoxypentyl, ethoxypentyl, propoxypentyl, butoxypentyl, pentyloxypentyl, hexyloxypentyl, or heptyloxypentyl, or an alkoxyalkyl group substituted with at least one fluorine atom, i.e., a fluoroalkoxyalkyl group; a branched alkyl group such as a 2-methylpropyl, 2-methylbutyl, 3-methylbutyl, or 3-methylpentyl group, or a branched alkyl group substituted with at least one fluorine atom, i.e., a branched fluoroalkyl group; a branched alkyloxy group such as a 2-methylpropyloxy, 2-methylbutyloxy, 3-methylbutyloxy, or 3-methylpentyloxy group, or a branched alkyloxy group substituted with at least one fluorine atom, i.e., a branched fluoroalkyloxy group; a 4-alkyl-cycloalkyl group such as a 4-methylcyclohexyl, 4-ethylcyclohexyl, 4-propylcyclohexyl, 4-butylcyclohexyl, 4-pentylcyclohexyl, 4-hexylcyclohexyl, 4-heptylcyclohexyl, 4-octylcyclohexyl, 4-nonylcyclohexyl, or 4-decylcyclohexyl group, or a 4-alkyl-cycloalkyl group substituted with at least one fluorine atom, i.e., a 4-fluoroalkyl-cycloalkyl group; a 4-alkyl-cycloalkenyl group such as a 4-propylcyclohexenyl or 4-pentylcyclohexenyl group, or a 4-alkyl-cycloalkenyl group substituted with at least one fluorine atom, i.e., a 4-fluoroalkyl-cycloalkenyl group; a cyano group; —$SF_5$; or —NCS.

Examples of the compounds represented by the formula (α-2) may include the compounds represented by the following formulae, which compounds may be synthesized through ordinary organic synthesizing processes:

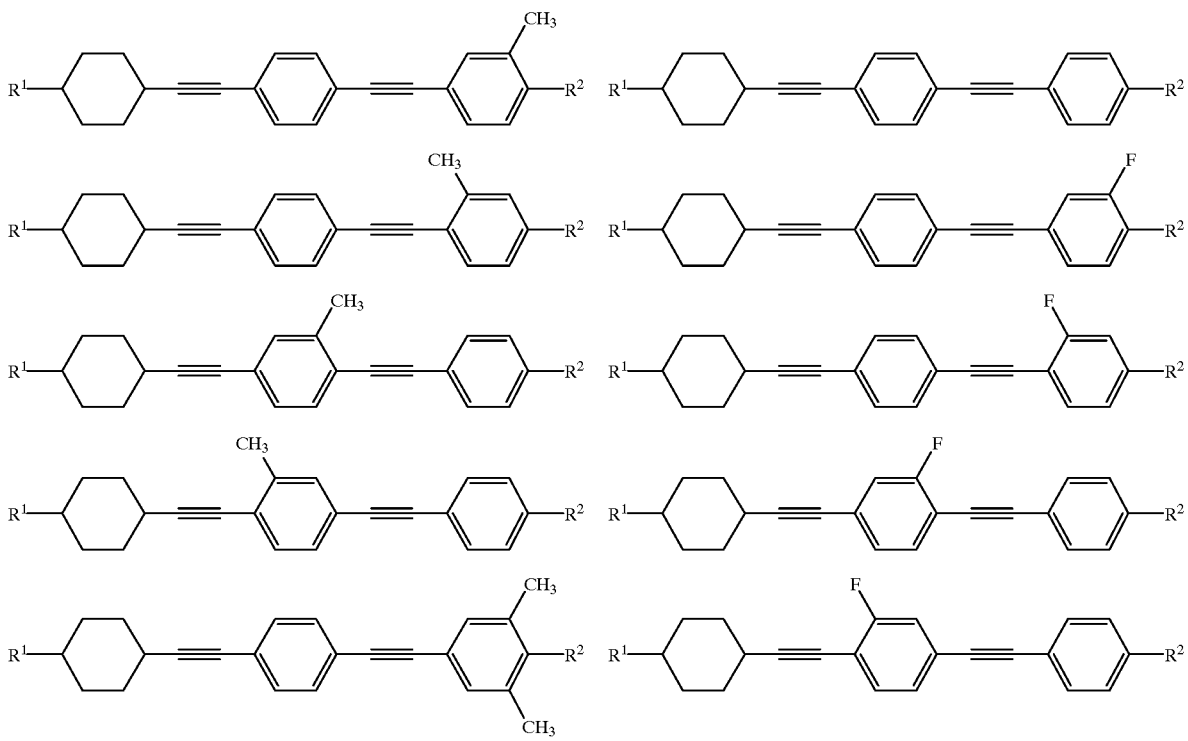

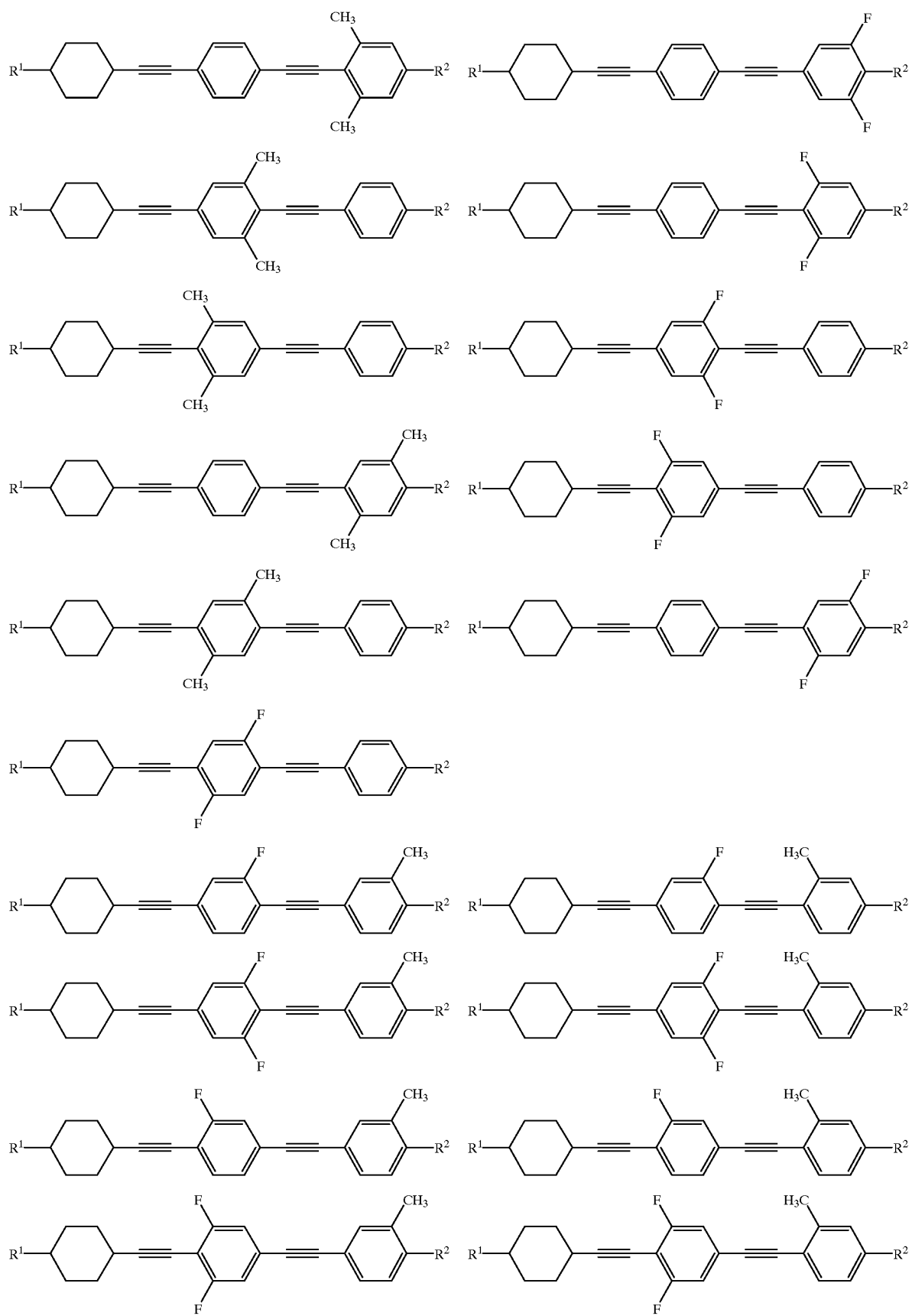

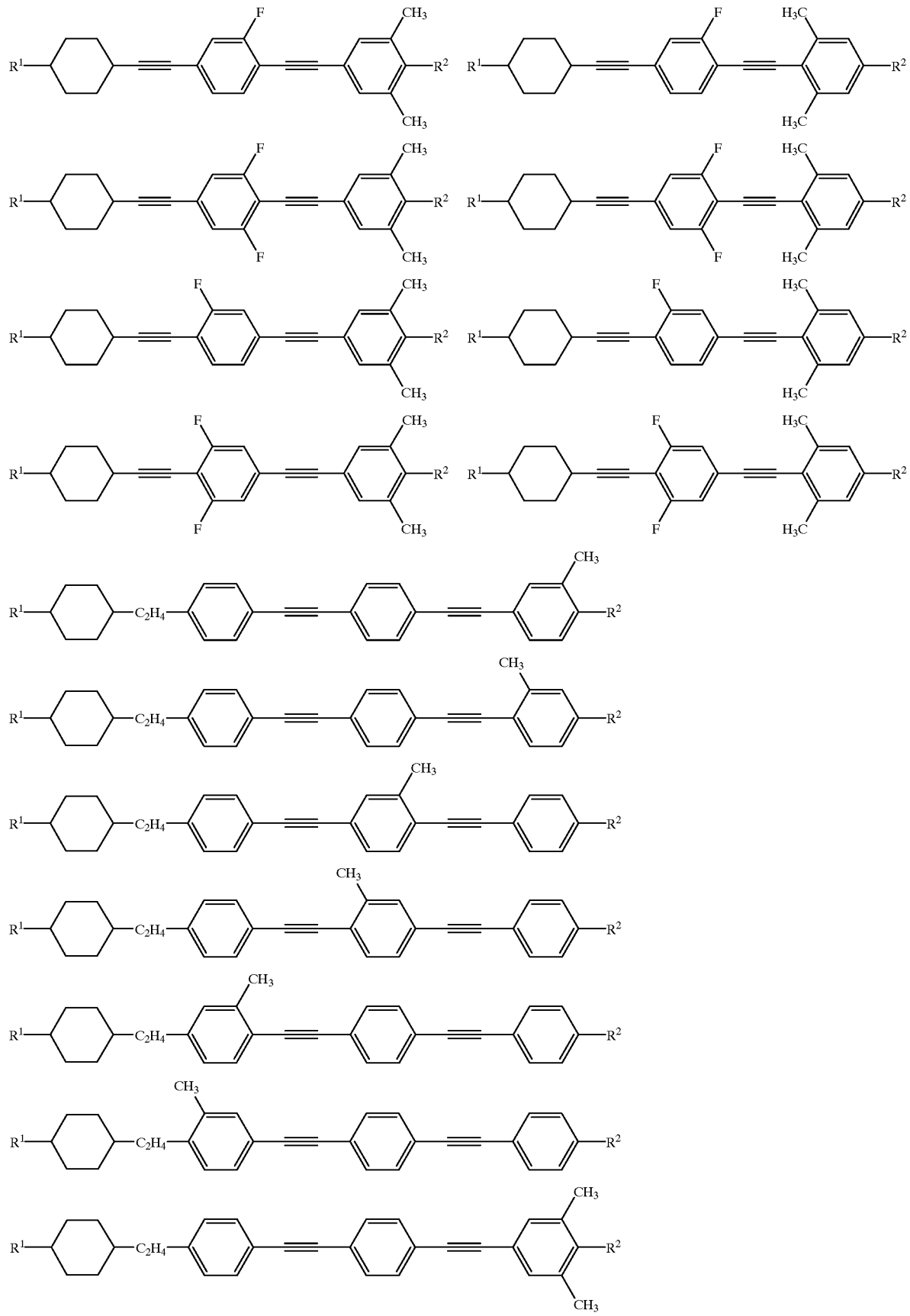

-continued
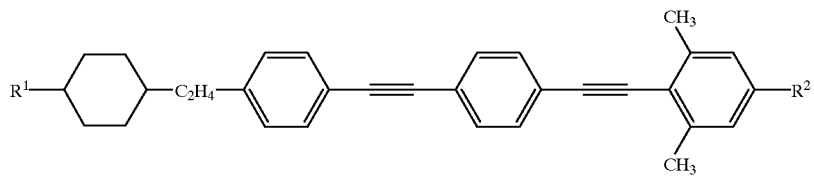
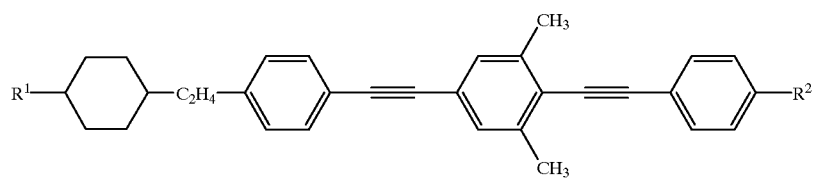
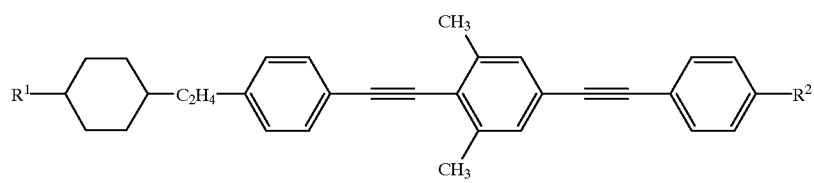
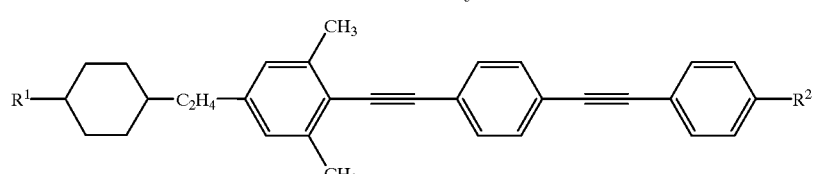
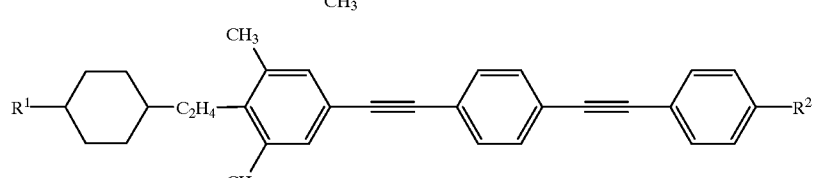
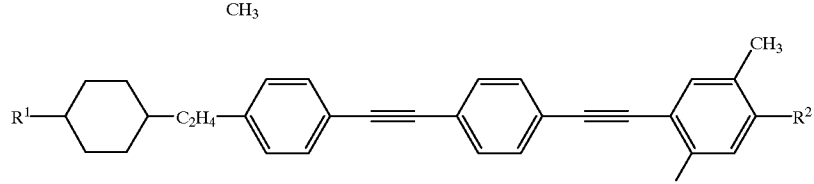
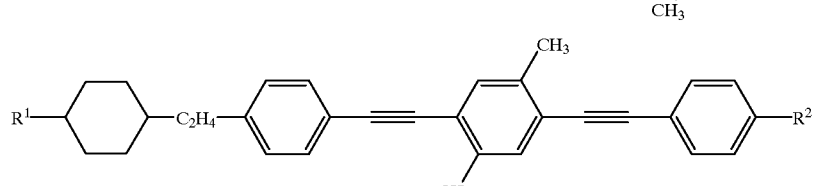
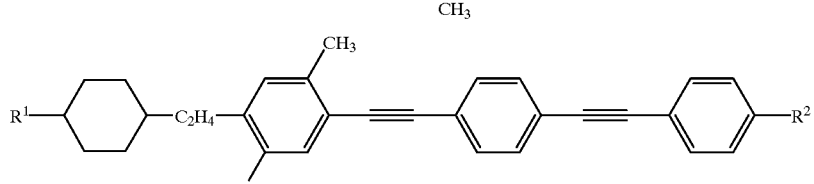
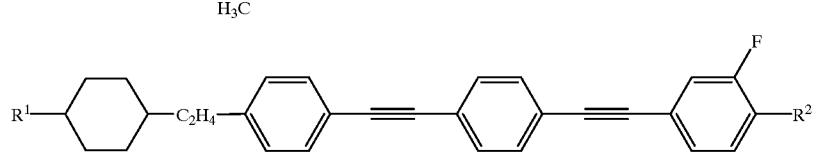
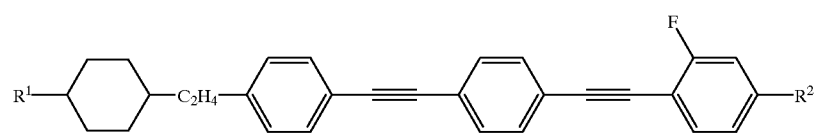

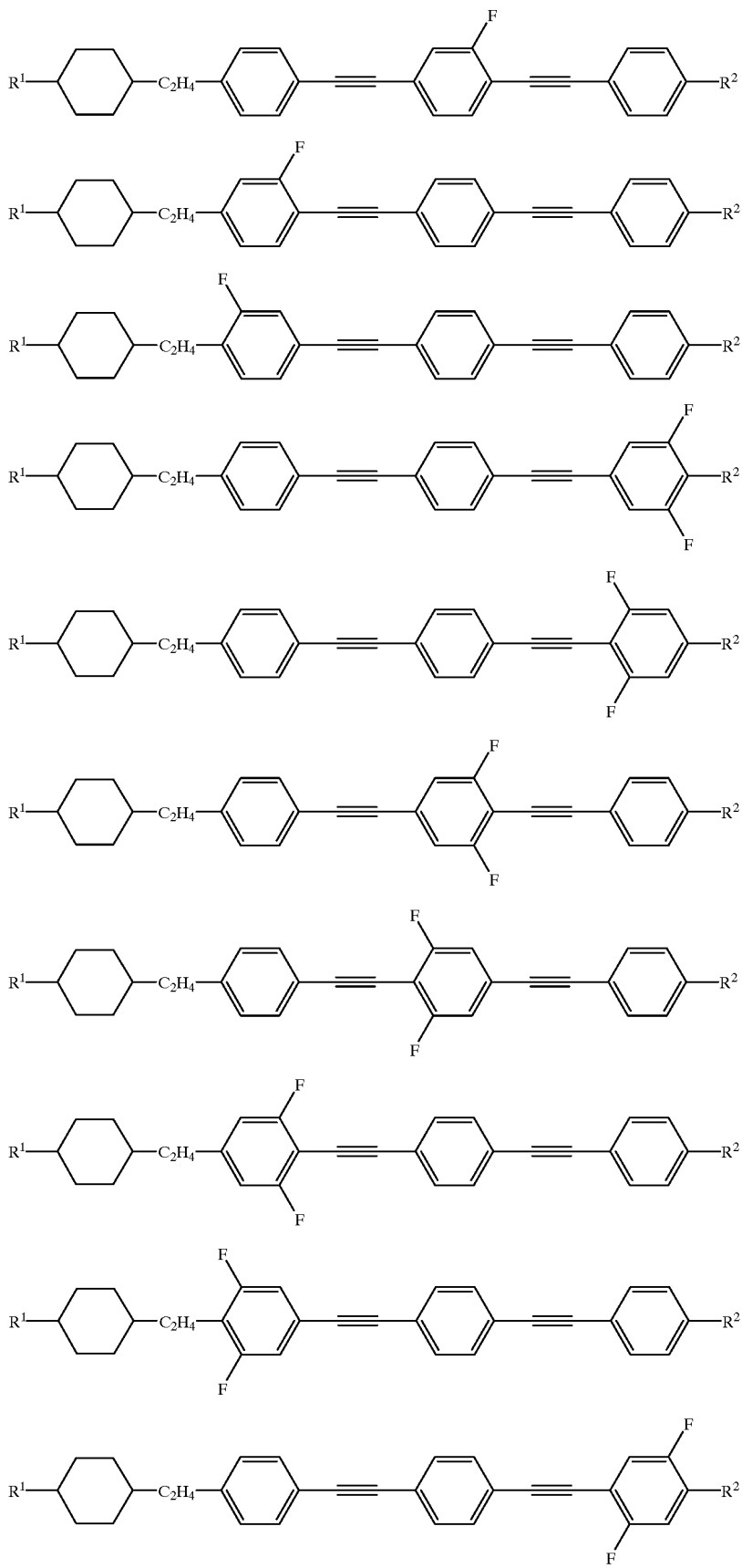

-continued
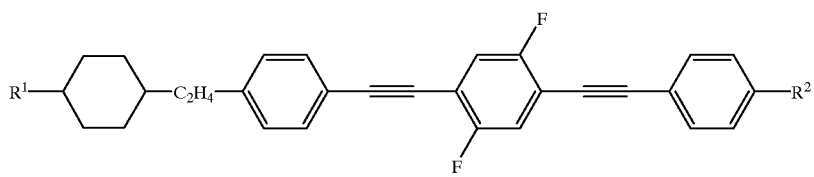
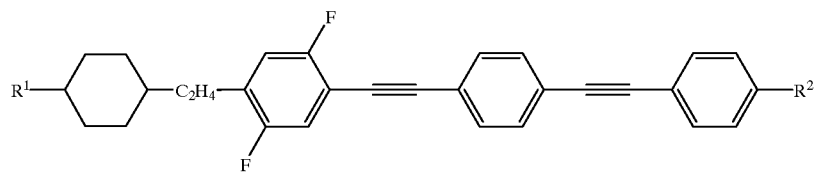
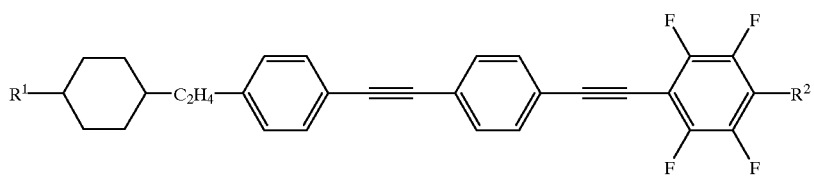
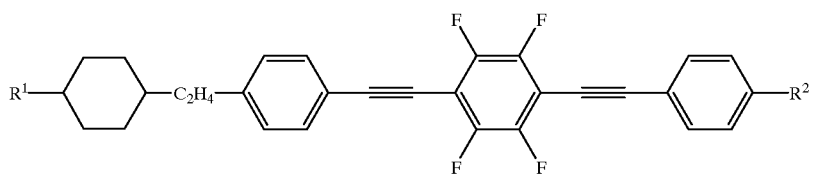
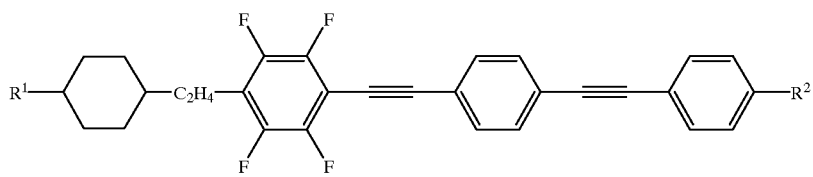
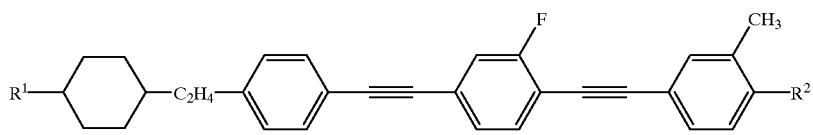
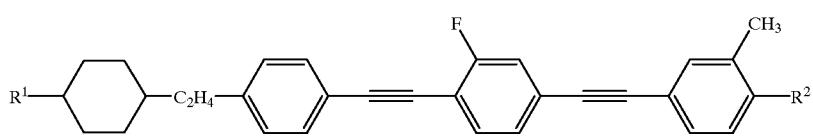
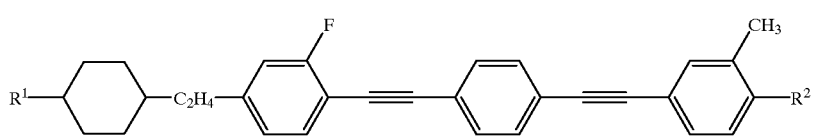
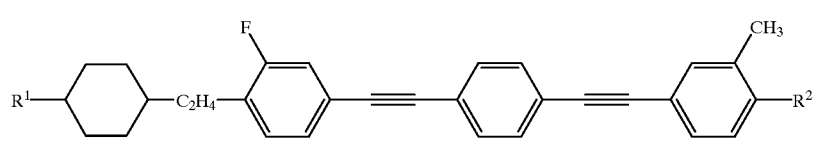
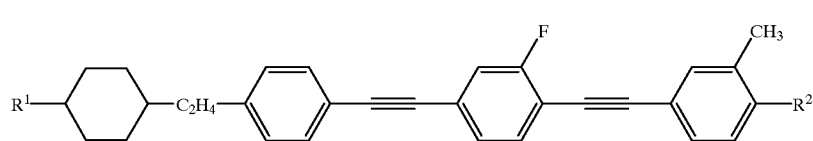

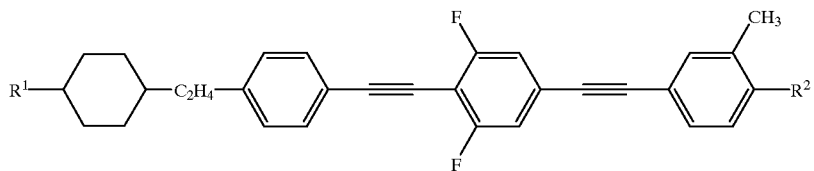
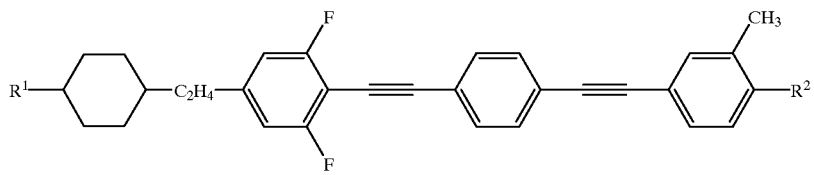
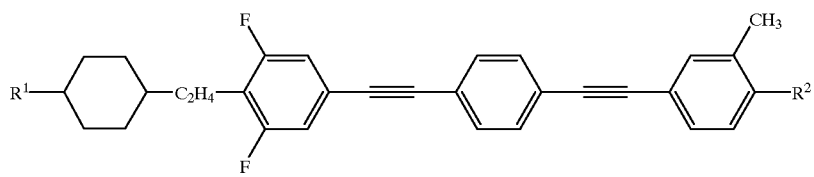
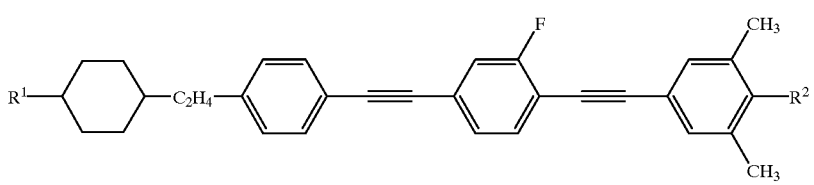
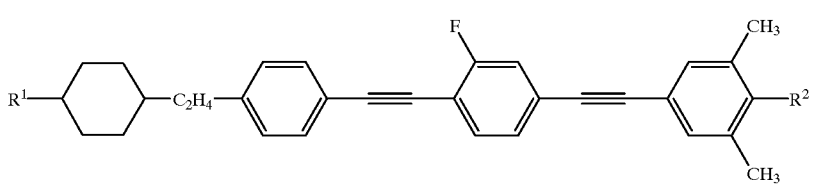
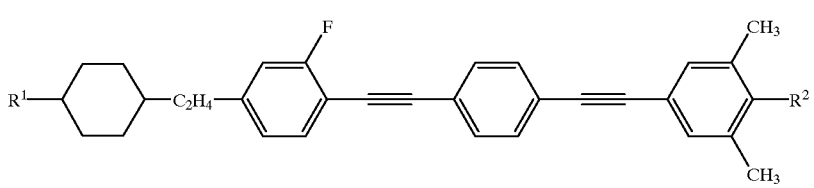
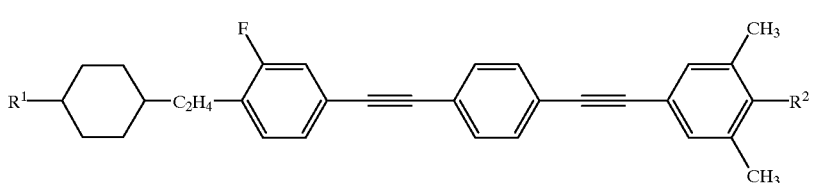
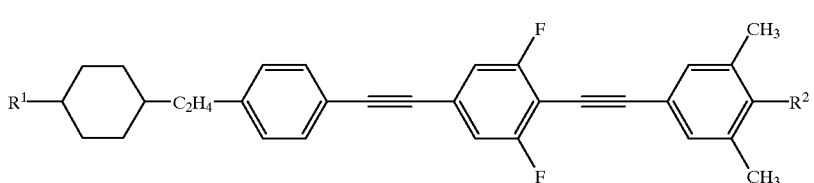
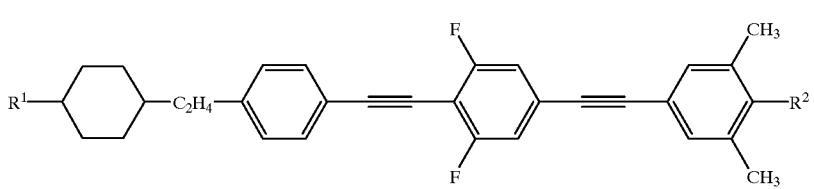

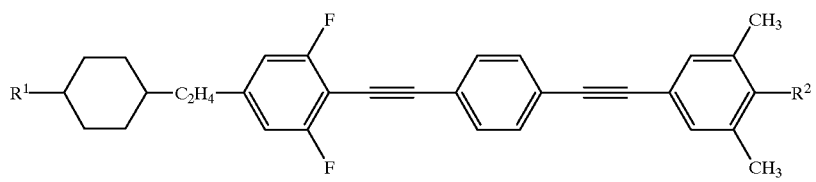
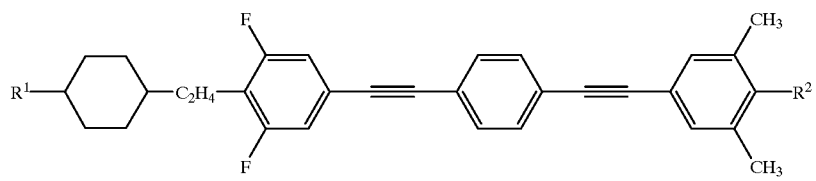
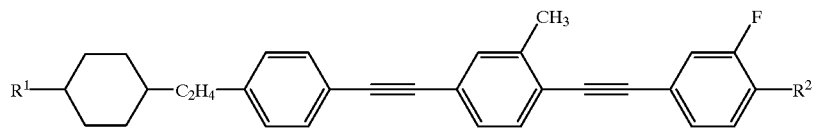
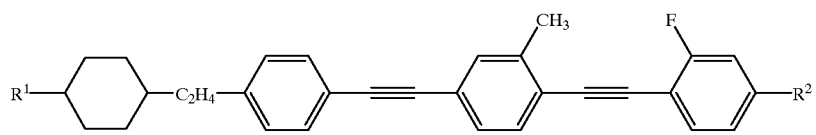
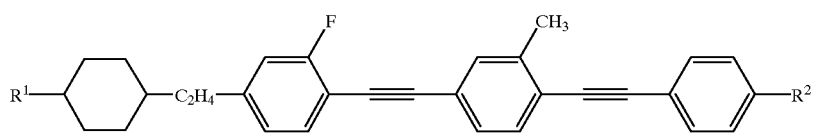
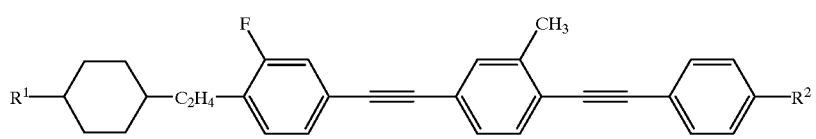
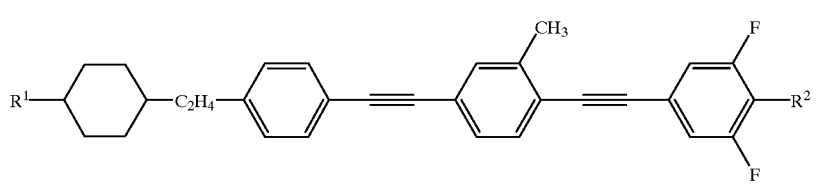
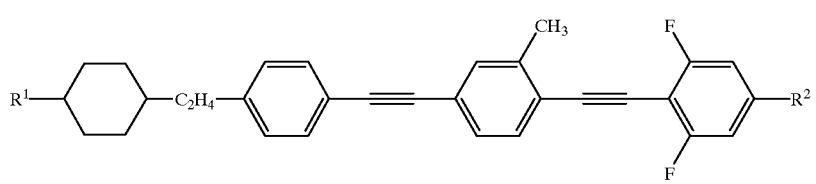
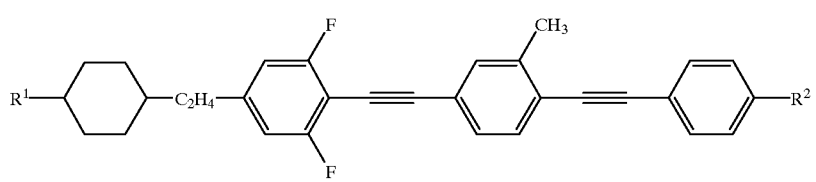
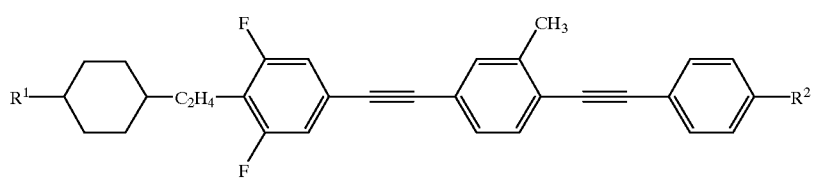

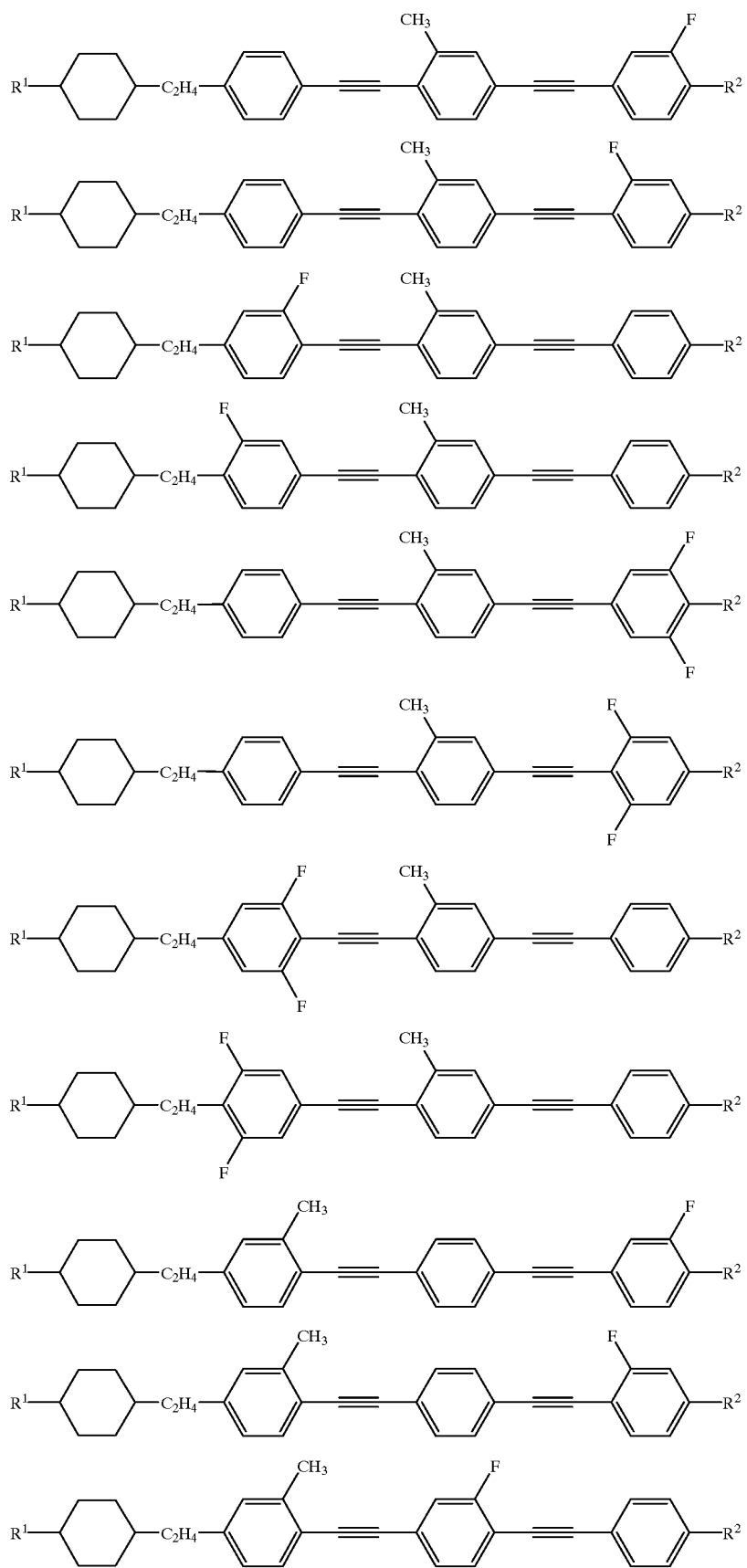

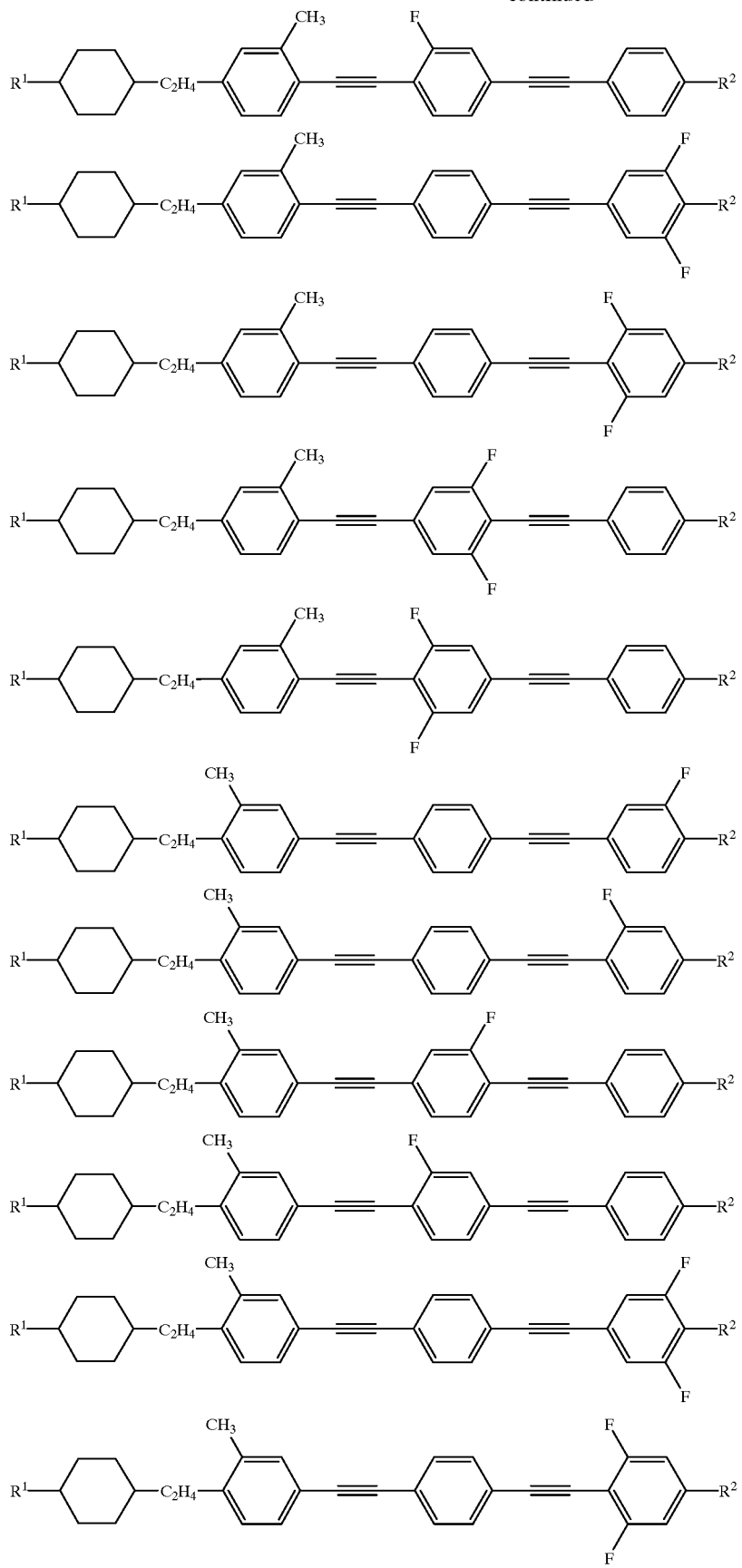

-continued
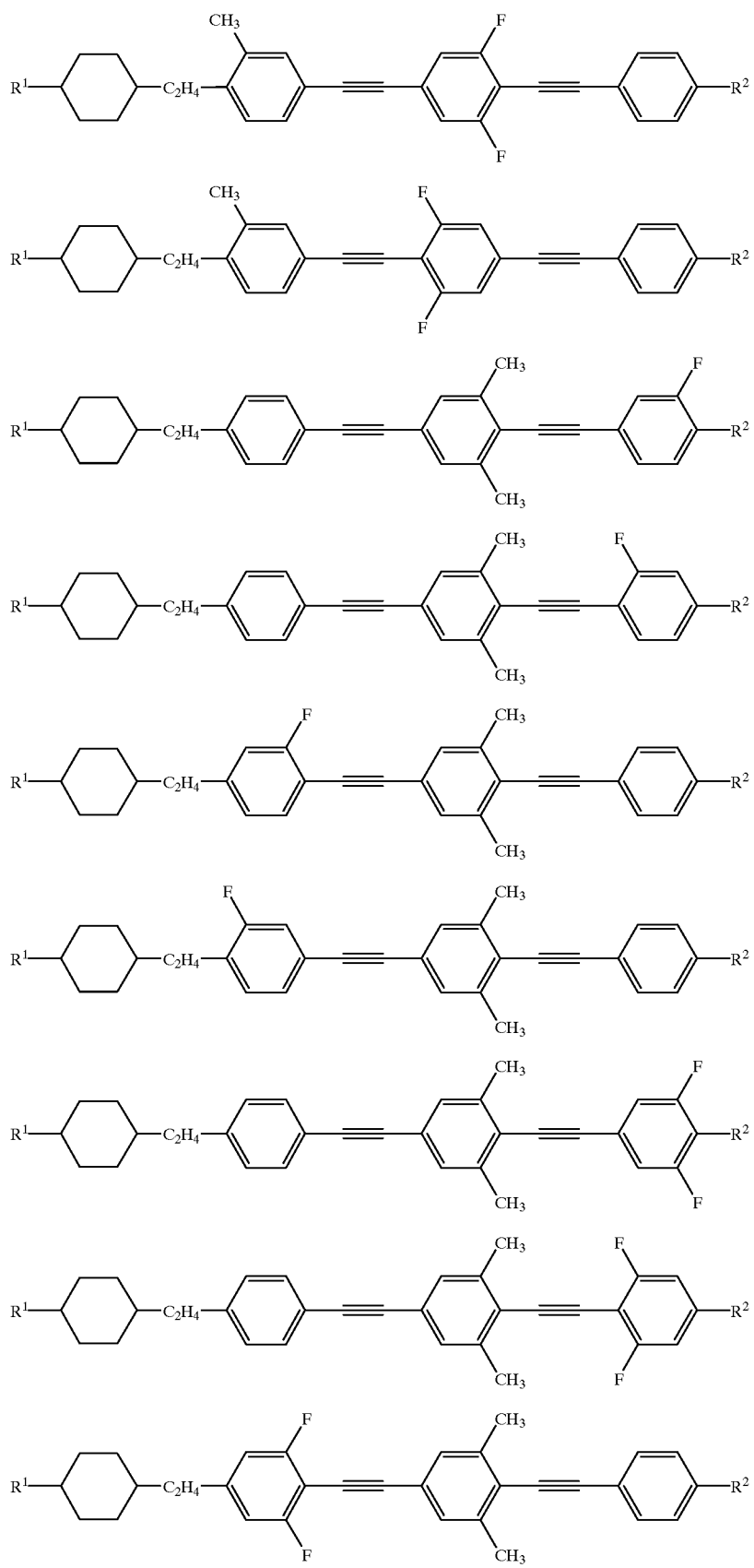

-continued
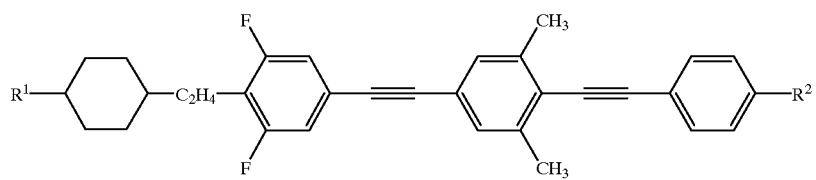
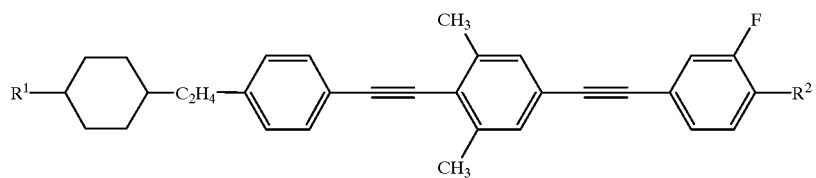
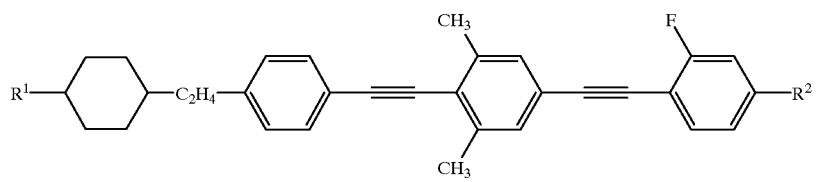
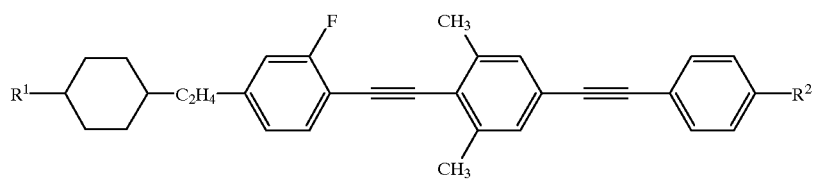
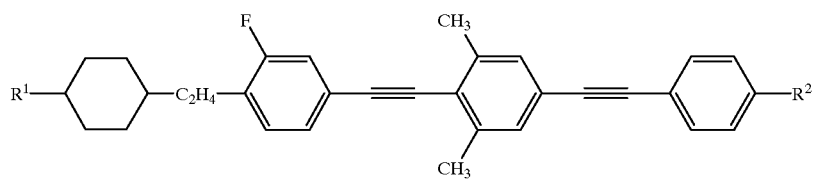
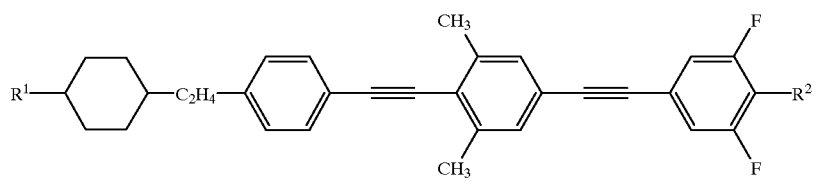
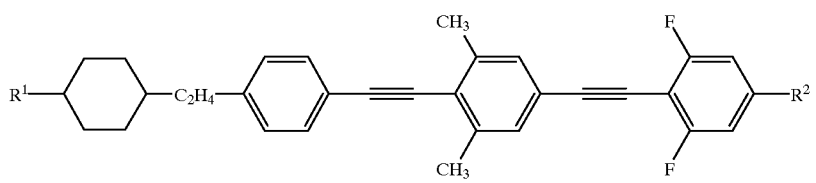
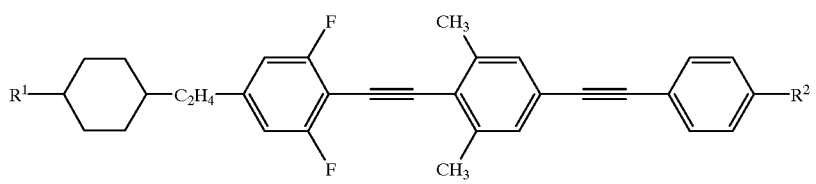
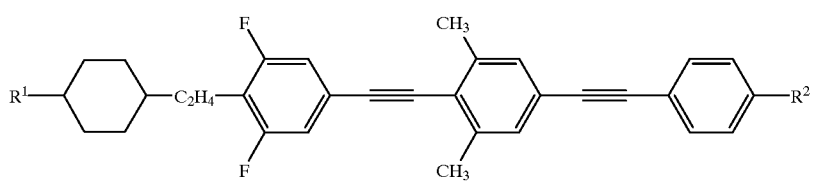

-continued
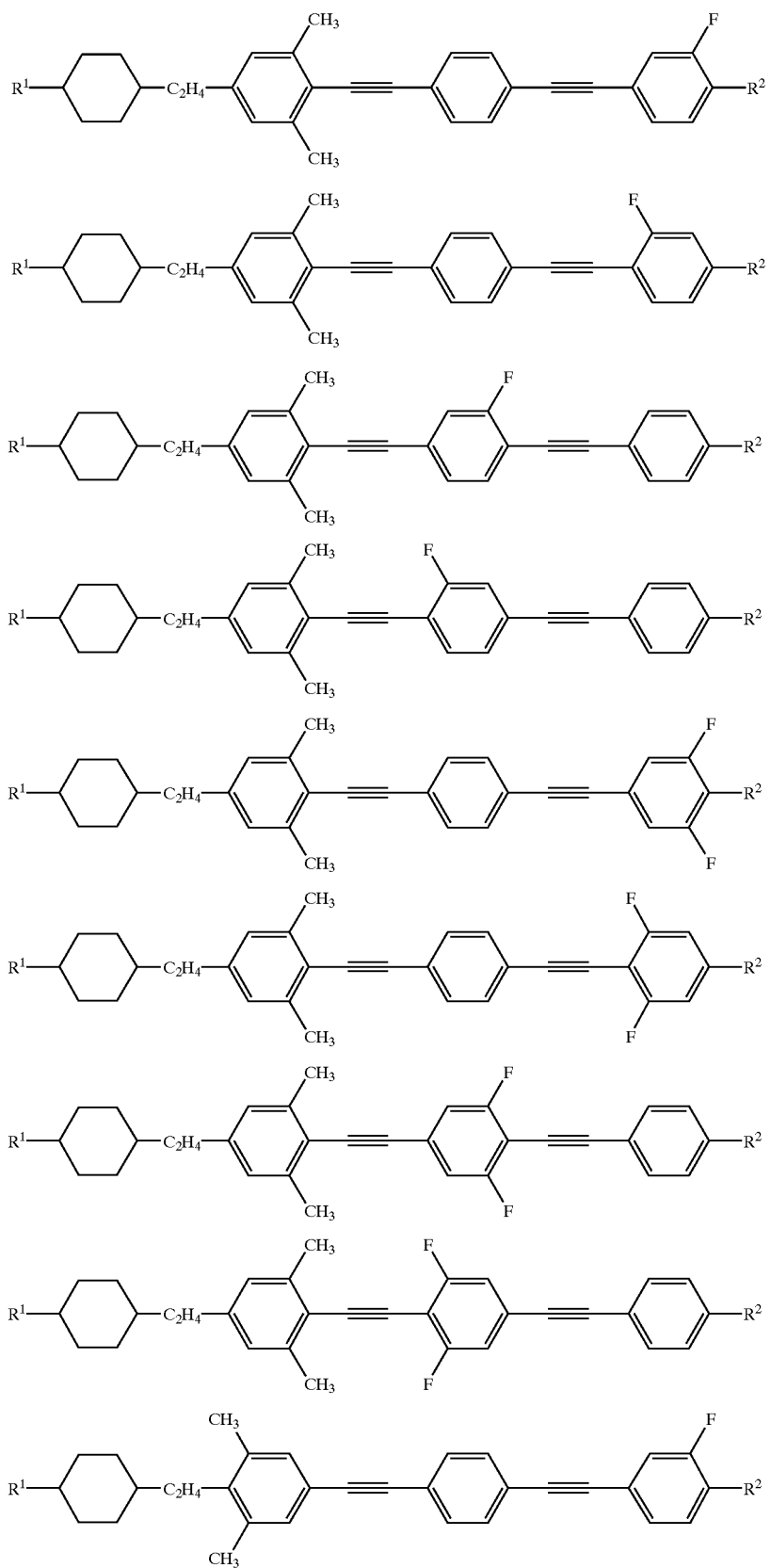

-continued
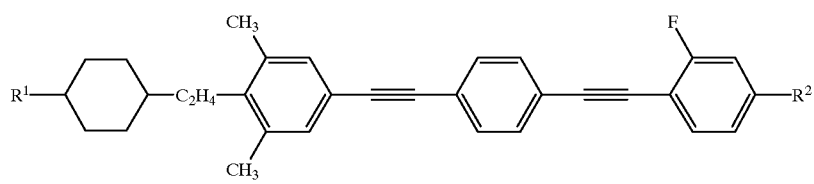
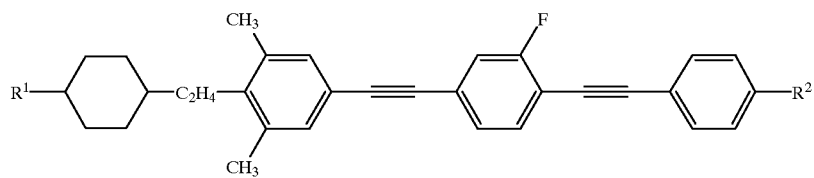
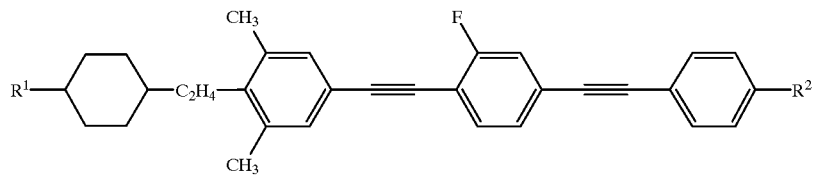
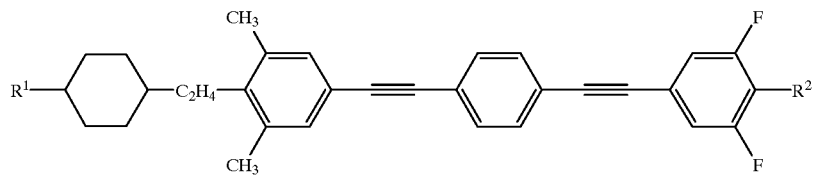
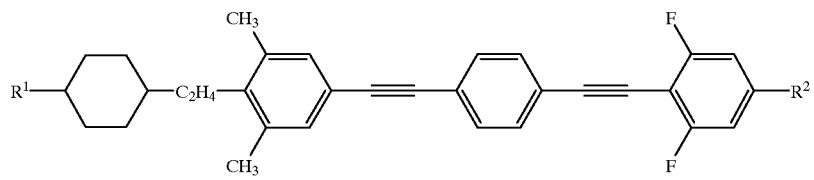
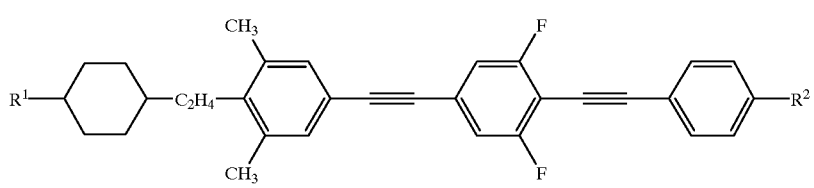
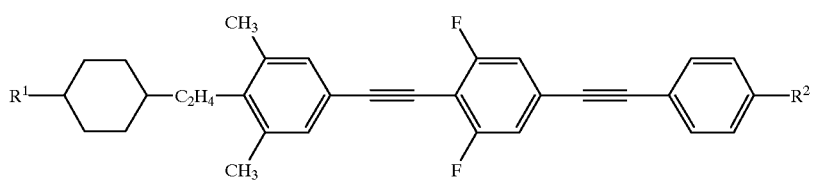

In the formula (α-2), examples of $R^{11}$ and $R^{21}$ may preferably include those listed above as examples of $R^1$ and $R^2$ in the formula (α-1) and corresponding to $R^{11}$ and $R^{21}$, respectively.
Examples of the compounds represented by the formula (α-3) may include the compounds represented by the following formulae.
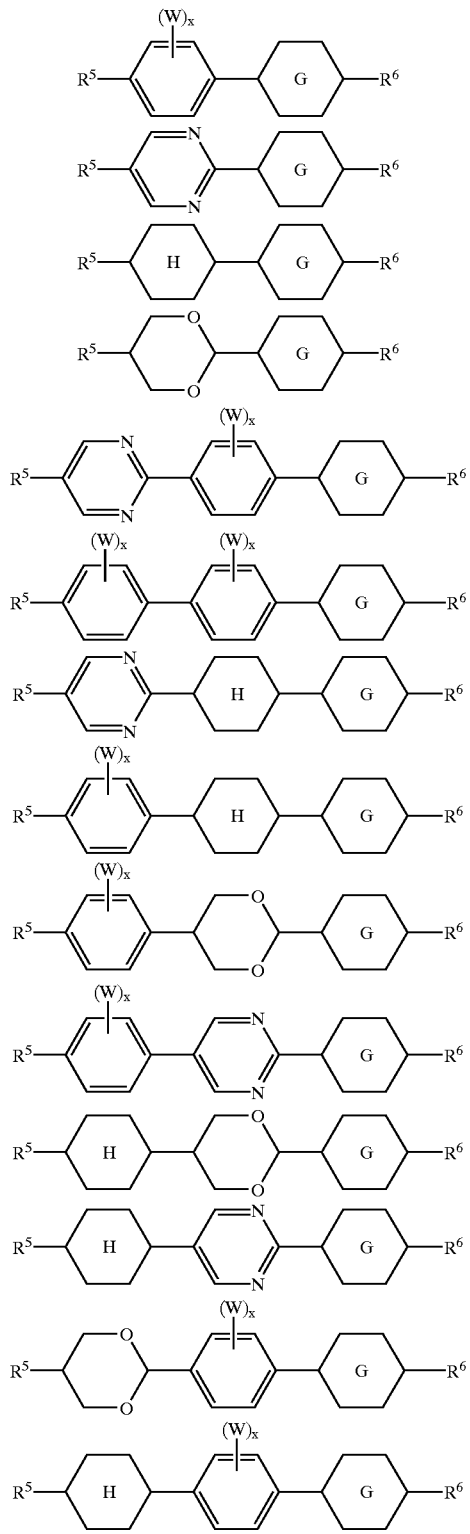
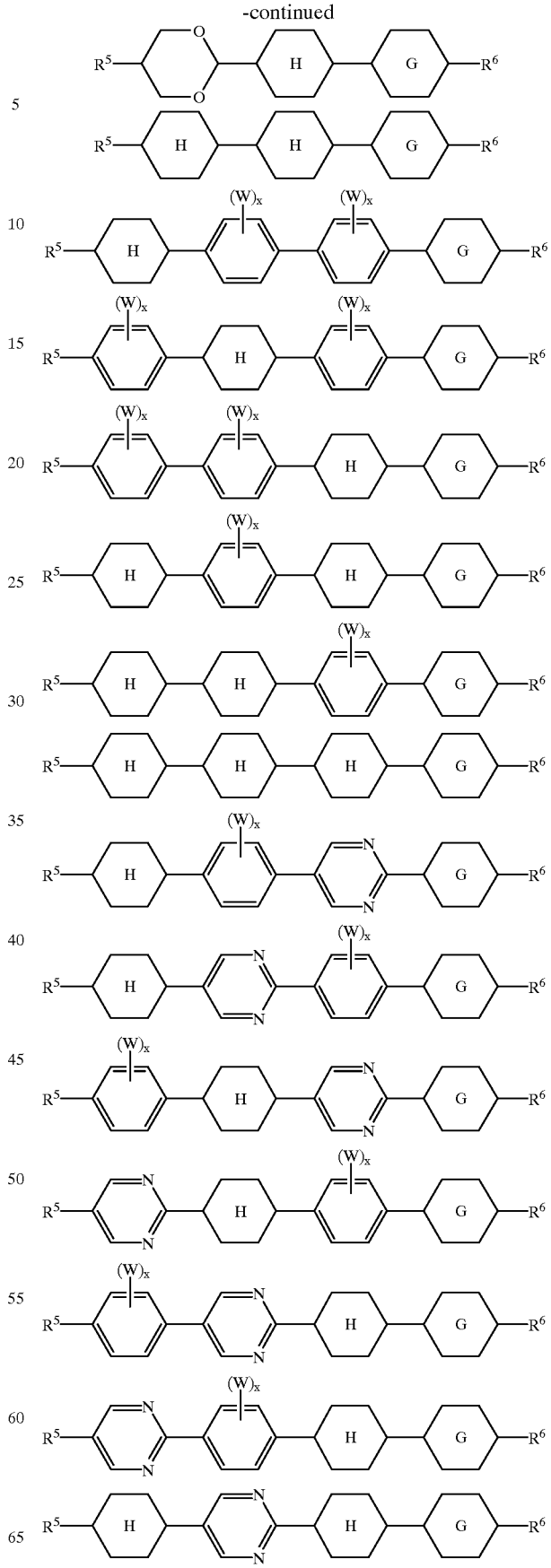

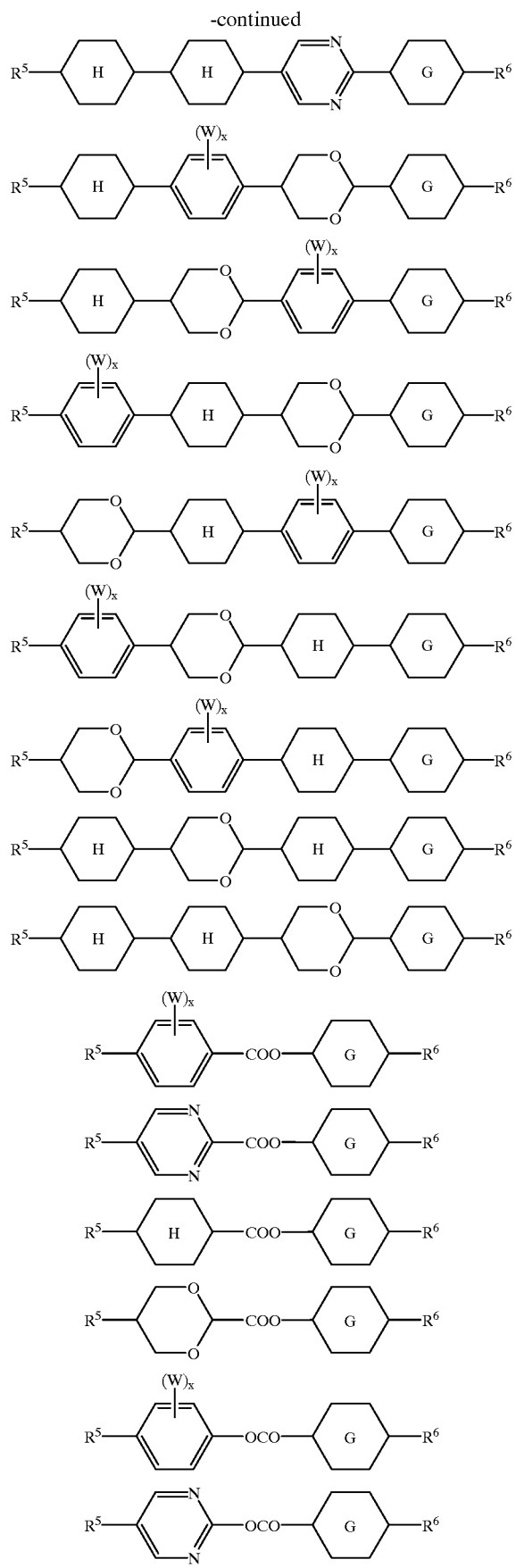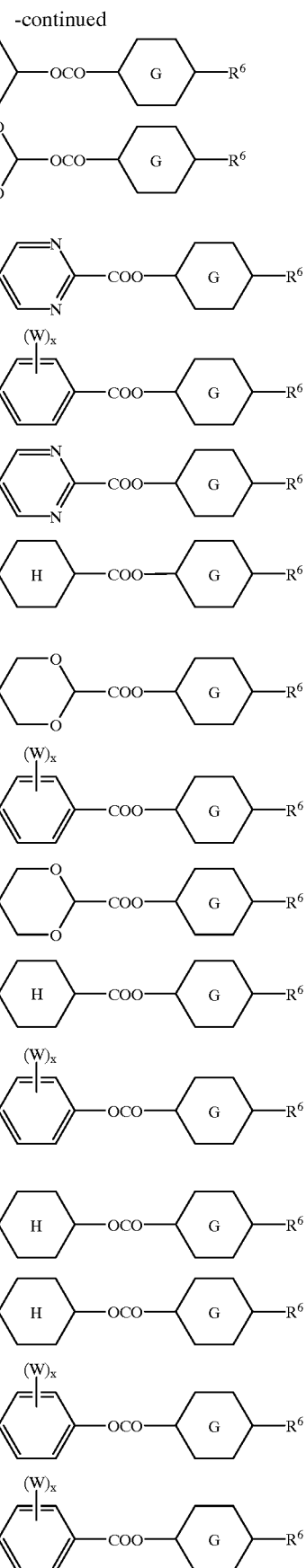

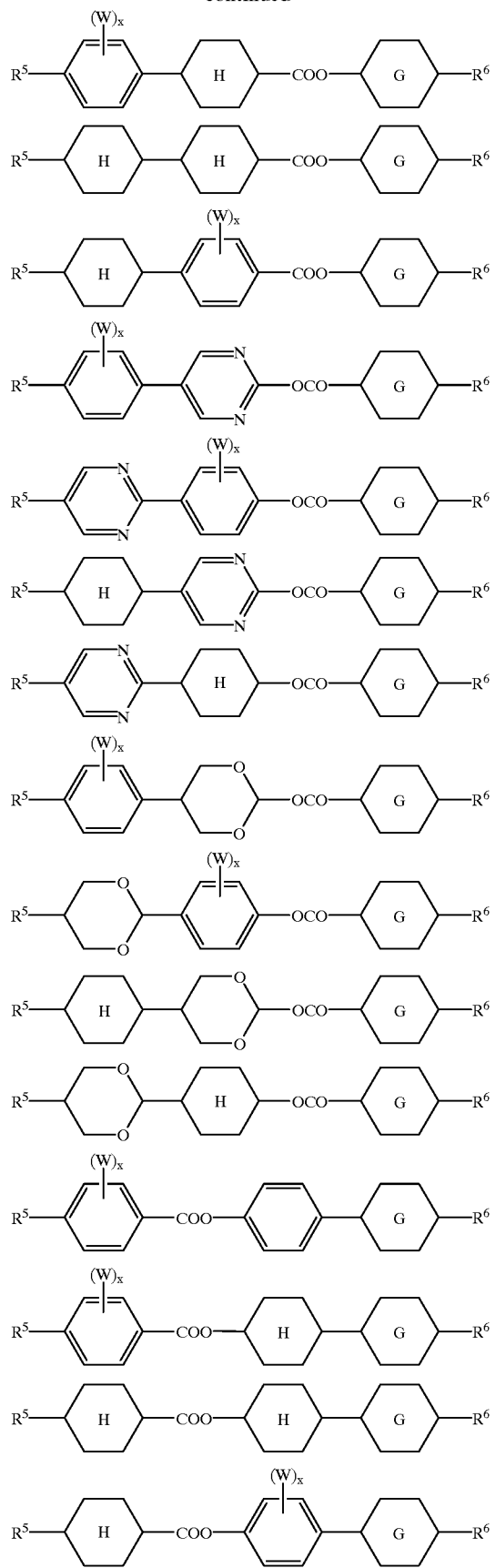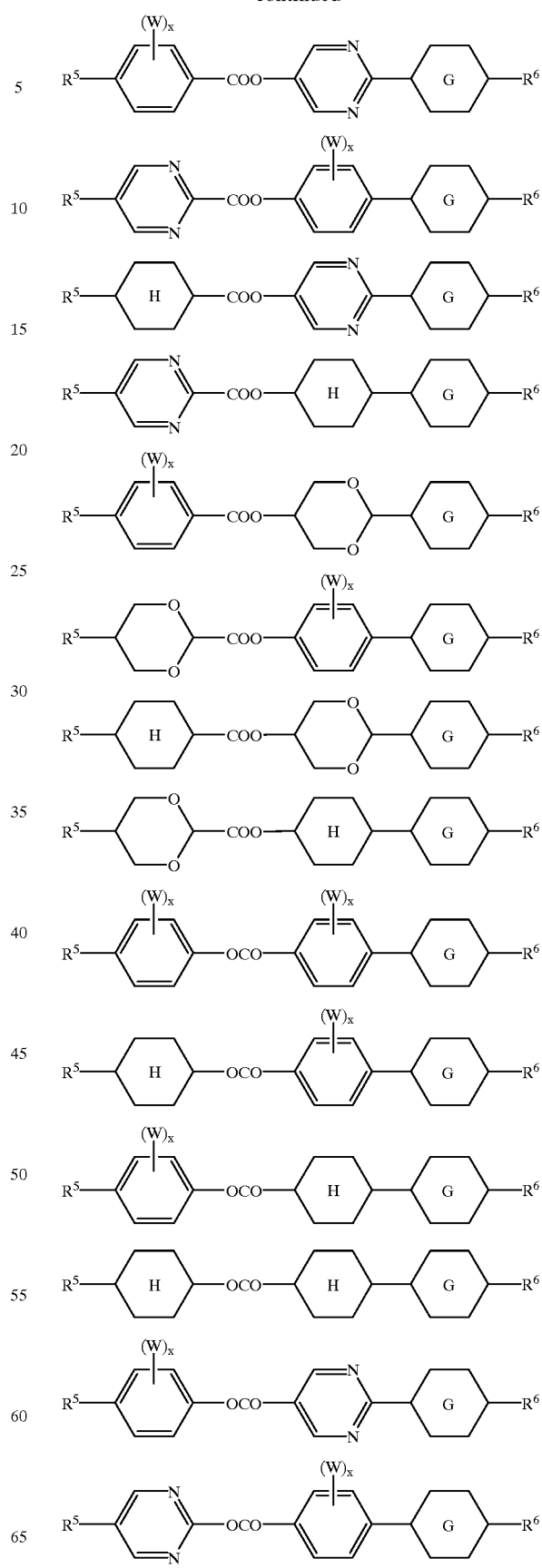

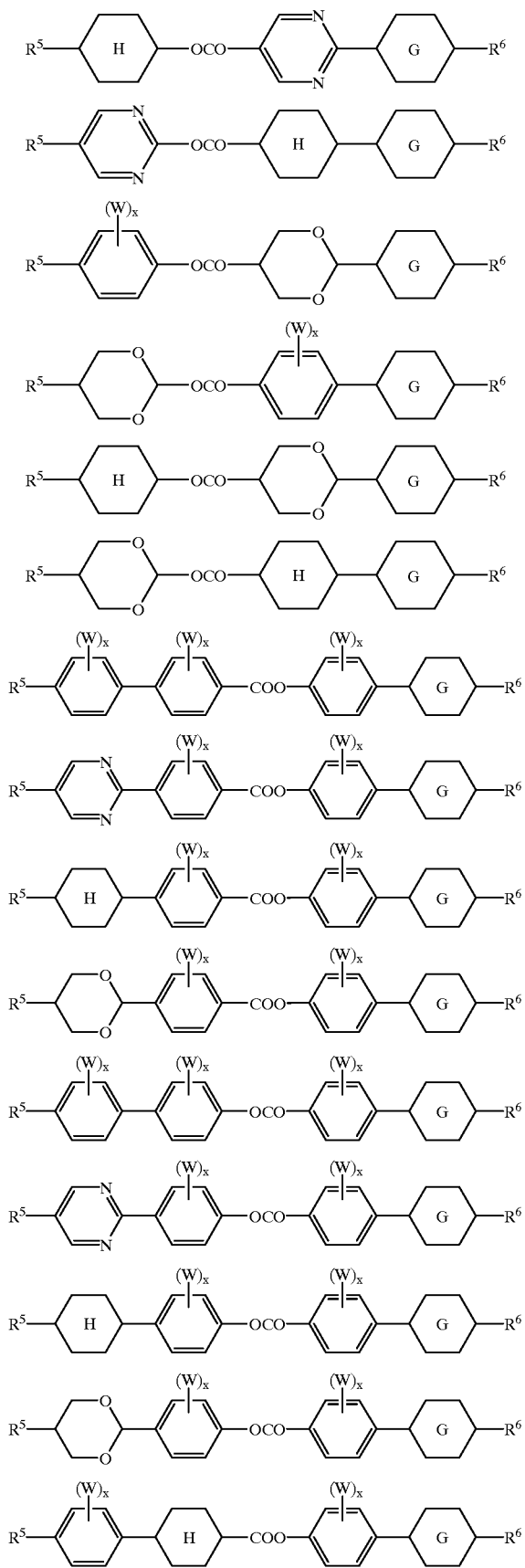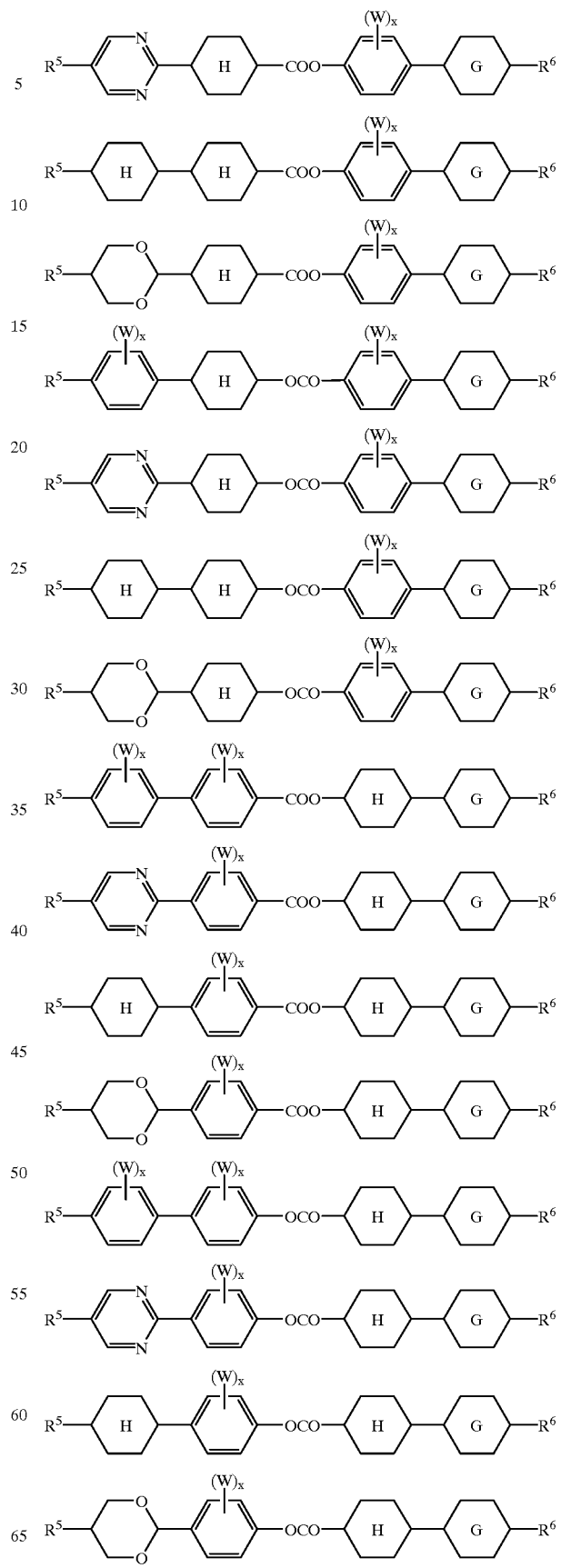

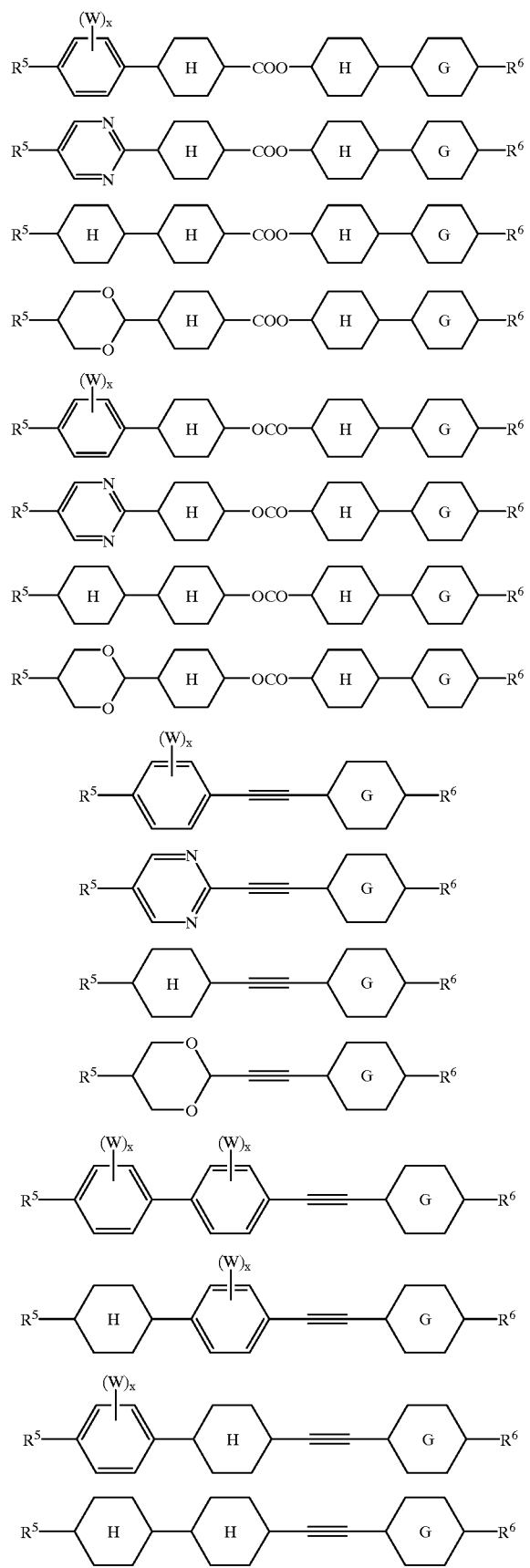
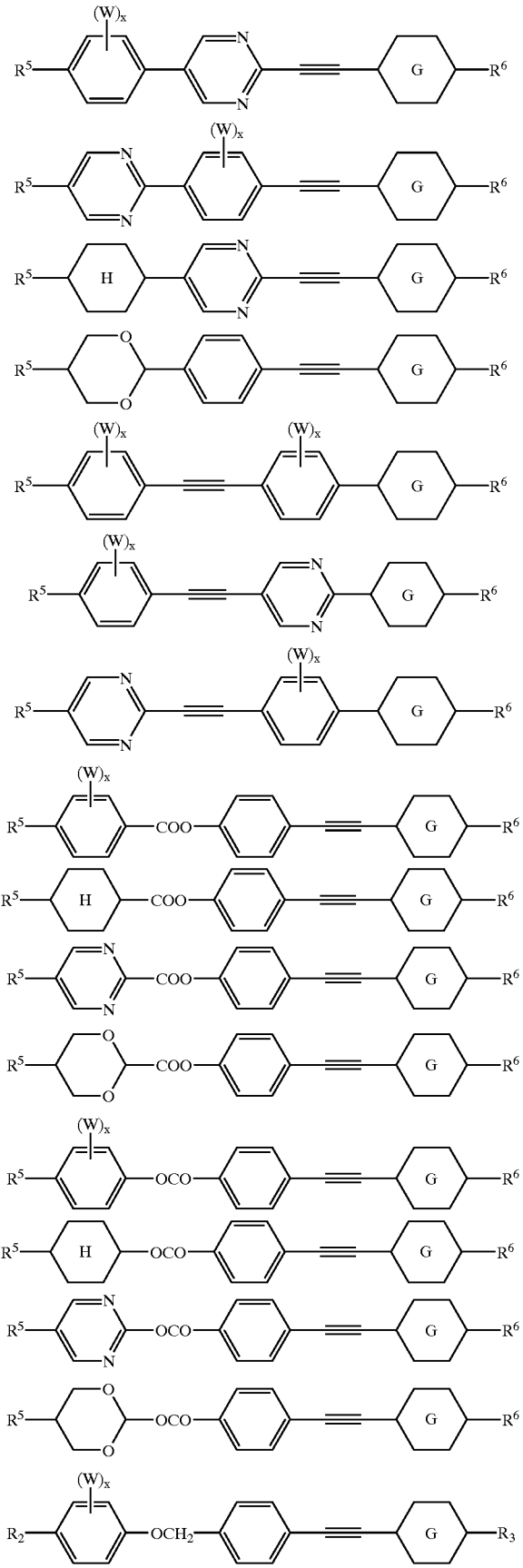

-continued

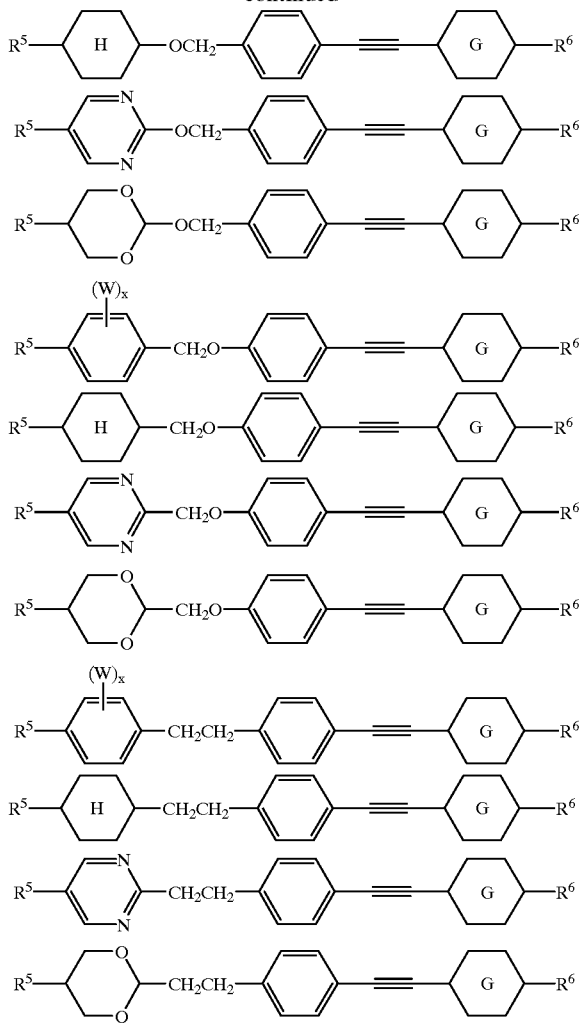

In the formulae, W stands for a hydrogen or fluorine atom; x denotes an integer of 0 to 3; ring H stands for 1,4-cyclohexylene; ring G stands for 1,4-phenylene, 1,4-cyclohexylene, 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl, or 5,2-dioxanediyl, all of which may optionally be substituted with at least one fluorine atom. The ring G preferably stands for 1,4-cyclohexylene, 1,4-cyclohexenylene, 4,1-cyclohexenylene, 2,5-cyclohexenylene, 5,2-cyclohexenylene, 3,6-cyclohexenylene, or 6,3-cyclohexenylene. Examples of $R^5$ and $R^6$ may include a hydrogen atom; a fluorine atom; a fluoromethyl group; a difluoromethyl group; a trifluoromethyl group; a fluoromethoxy group; a difluoromethoxy group; a trifluoromethoxy group; a cyano group; alkyl groups, such as a methyl, ethyl, propyl, butyl, pentyl, hexyl, heptyl, octyl, nonyl, decyl, undecyl, or dodecyl group; alkenyl groups, such as an ethenyl, propenyl, butenyl, pentenyl, hexenyl, heptenyl, octenyl, nonenyl, decenyl, undecenyl, or dodecenyl group; alkoxy groups, such as a methoxy, ethoxy, propoxy, butoxy, pentyloxy, hexyloxy, heptyloxy, octyloxy, nonyloxy, decyloxy, undecyloxy, or dodecyloxy group; alkenyloxy group, such as a vinyl oxy, propenyloxy, butenyloxy, pentenyloxy, hexenyloxy, heptenyloxy, octenyloxy, nonenyloxy, or decenyloxy group; alkynyloxy groups, such as a propynyloxy, butynyloxy, pentynyloxy, hexynyloxy, heptynyloxy, octynyloxy, nonynyloxy, decynyloxy, undecynyloxy, or dodecynyloxy group; alkoxyalkyl groups, such as a methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, decyloxypropyl, methoxybutyl, ethoxybutyl, propoxybutyl, butoxybutyl, pentyloxybutyl, hexyloxybutyl, heptyloxybutyl, octyloxybutyl, nonyloxybutyl, decyloxybutyl, methoxypentyl, ethoxypentyl, propoxypentyl, butoxypentyl, pentyloxypentyl, hexyloxypentyl, heptyloxypentyl, octyloxypentyl, nonyloxypentyl, or decyloxypentyl group.

These compounds may be synthesized through ordinary organic synthesizing processes.

Examples of the monomer (A) may include the compounds represented by the formula (β), which may be synthesized through ordinary organic synthesizing processes:

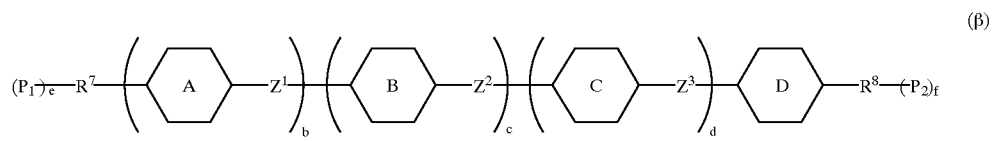

(β)

wherein rings A, B, C, and D, $Z^1$, $Z^2$, $Z^3$, b, c, and d mean the same as in the formula (α-3); $R^7$ and $R^8$ each independently stands for an alkyl group having 1 to 12 carbon atoms, an alkoxy group having 1 to 12 carbon atoms, or an alkoxyalkyl group having 2 to 16 carbon atoms, wherein at least one methylene group of an alkyl group may be replaced with an oxygen, sulfur, or silicon atom, and these groups may be straight or branched; $P_1$ and $P_2$ each stands for a methacrylate ester, an acrylate ester, epoxy, vinyl ether, a hydrogen atom, a fluorine atom, a fluoromethyl group, a difluoromethyl group, a trifluoromethyl group, a fluoromethoxy group, a difluoromethoxy group, a trifluoromethoxy group, or a cyano group, provided that at least one of $P_1$ and $P_2$ stands for a methacrylate ester, an acrylate ester, epoxy, or vinyl ether; e and f each denotes 0 or 1, provided that not both of e and f denote 0.

Examples of the compounds represented by the formula (β) may include the compounds represented by the following formulae:

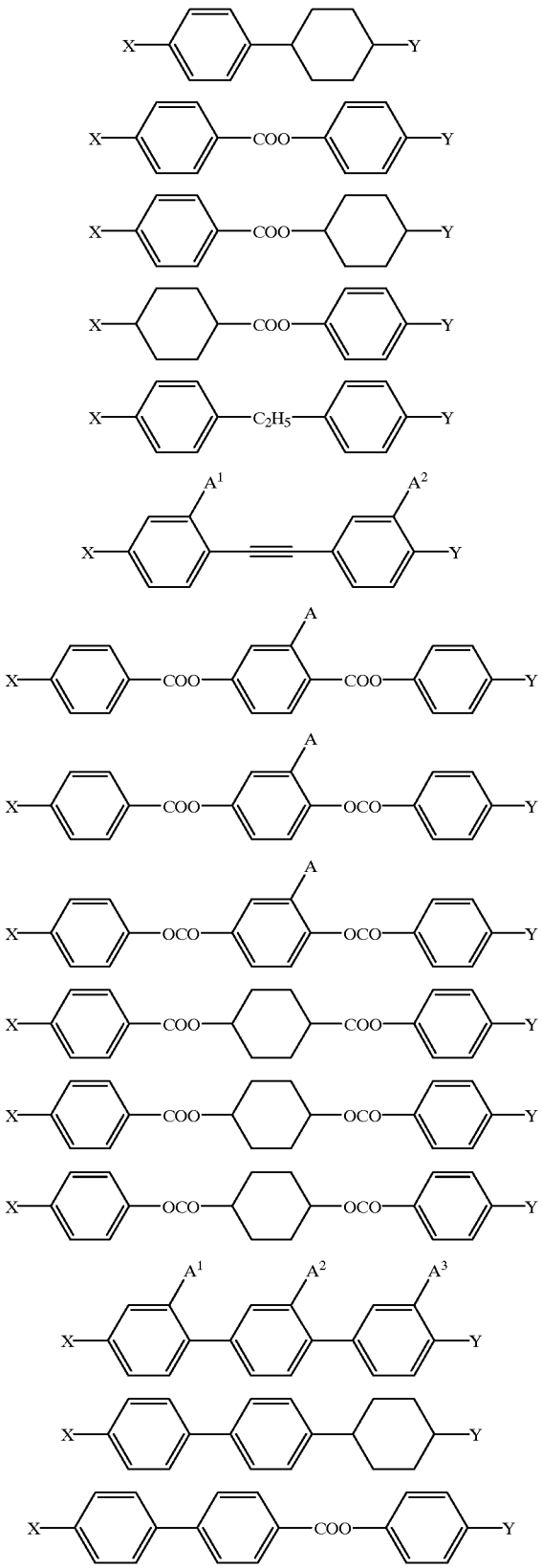

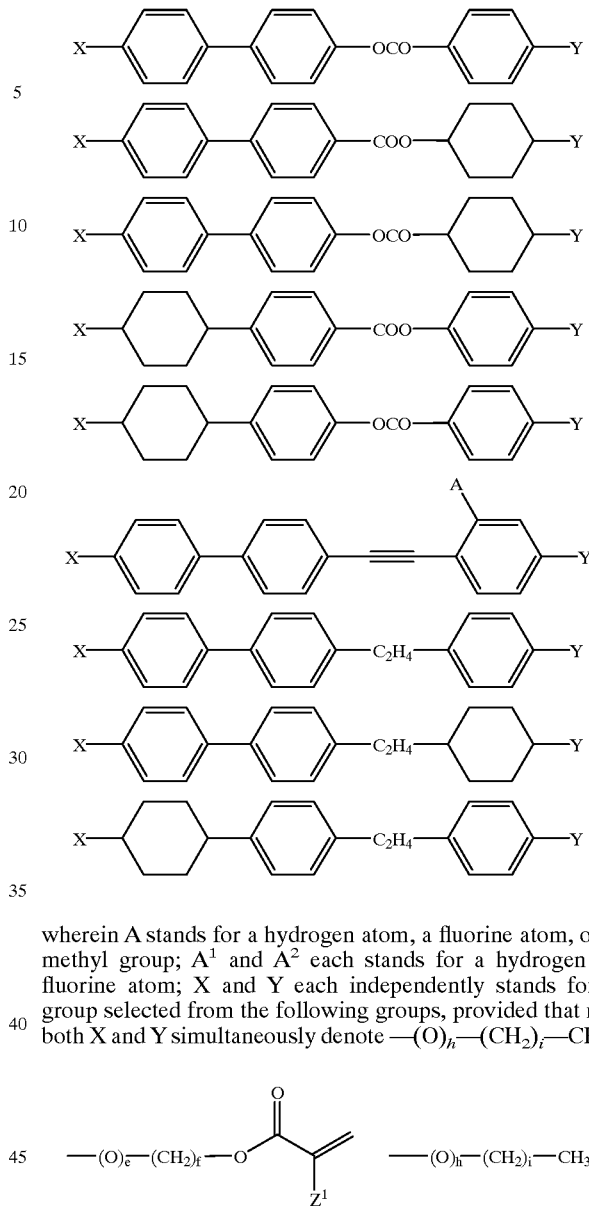

wherein A stands for a hydrogen atom, a fluorine atom, or a methyl group; $A^1$ and $A^2$ each stands for a hydrogen or fluorine atom; X and Y each independently stands for a group selected from the following groups, provided that not both X and Y simultaneously denote $-(O)_h-(CH_2)_i-CH_3$:

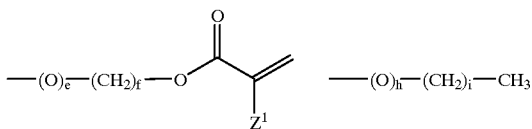

wherein e and h each denotes 0 or 1; f and i each denotes an integer of 1 to 12; $Z^1$ stands for a hydrogen atom or a methyl group.

The content of other liquid crystalline compounds mentioned above, when contained, may suitably be decided depending on the purpose of the liquid crystal compositions, but is usually selected from the range of 10 to 50 wt %, preferably 10 to 40 wt % of the liquid crystal compositions.

The liquid crystal compositions of the present invention may optionally contain a chiral (optically active) compound, which does not necessarily exhibit liquid crystal properties itself. Examples of the chiral compound may include the following compounds, and the content of the chiral compound may suitably be decided:

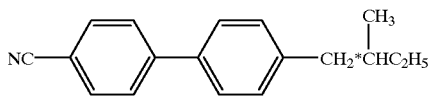

NC—⟨C6H4⟩—⟨C6H4⟩—OCH₂*CHC₂H₅ (with CH₃ branch)

C₆H₁₃O—⟨C6H4⟩—COO—⟨C6H4⟩—COO*CHC₆H₁₃ (with CH₃ branch)

C₆H₁₃O—⟨C6H4⟩—COO—⟨C6H4⟩—COOCH₂*CHC₆H₁₃ (with CH₃ branch)

NC—⟨C6H4⟩—OCO—⟨C6H4⟩—OCH₂*CHC₂H₅ (with CH₃ branch)

C₅H₁₁—⟨C6H4⟩—⟨C6H4⟩—COOCH₂*CHC₂H₅ (with CH₃ branch)

C₅H₁₁—⟨C6H4⟩—OCO—⟨C6H4⟩—O*CHC₆H₁₃ (with CH₃ branch)

C₅H₁₁—⟨cyclohexyl⟩—OCO—⟨C6H4⟩—⟨C6H4⟩—CH₂*CHC₂H₅ (with CH₃ branch)

[Cholesteryl ester structure with C₆H₁₃ and C₈H₁₇ substituents]

When the liquid crystal compositions of the present invention are used for preparing, for example, polarizing films, printing inks, or paints, the compositions may optionally contain pigments, coloring agents, or dyes in a suitable amount, depending on the purpose of the liquid crystal compositions.

The polymers of the present invention have been obtained by polymerizing liquid crystal compositions containing one or more phenylacetylene compounds represented by the formula (1), which compositions may optionally contain other materials such as other liquid crystalline materials exemplified above.

When compounds not having a photopolymerizable functional group are used as such other materials, the content of such compounds may be decided depending on the purpose, as long as liquid crystal properties are not impaired. However, where the temperature-dependent change in the refractive index anisotropy is not desired, the content of such compounds is preferably in the range of 0 to 50 wt % of all the monomers contained in the liquid crystal compositions.

As other materials mentioned above, compounds that have at least one photopolymerizable functional group and not exhibit liquid crystal properties may also be used. Any compounds recognized in the art as polymerizable monomers or oligomers may be used as such compounds, and acrylate compounds, methacrylate compounds, and vinyl ether compounds are particularly preferred.

In the liquid crystal compositions for producing the polymers of the present invention, the ratio of the one or more phenylacetylene compounds represented by the formula (1) and the other materials may suitably be decided depending on the purpose of the polymers, but it is usually preferred to select the ratio from the range of 90:10 to 50:50 by weight.

The liquid crystal compositions for producing the polymers of the present invention may also contain a chiral (optically active) compound for the purpose of producing twisted oriented polymers. In this case, the chiral compound itself does not necessarily exhibit liquid crystal properties, and does not necessarily have a polymerizable functional group. Examples of the chiral compound may include those listed above. The content of the chiral compound may suitably be decided depending on the purpose of the polymers.

The molecular weight and other characteristics of the polymers of the present invention are not particularly limited, and polymers obtained under the following polymerization conditions are preferred.

Preferred methods for producing the polymers of the present invention include photopolymerization by irradiation with energy beams such as ultraviolet rays or electron beams. A light source for effecting such photopolymerization may be those emitting polarized light or those emitting unpolarized light. When a polymerization initiator that absorbs light of the visible region is added to the liquid crystal material, irradiation may be performed with visible light. In this case, two laser beams may be caused to interfere with the visible light to thereby give spatially distributed intensity to the light beams. The irradiation temperature is preferably in the range for allowing maintenance of the liquid crystal state of the liquid crystal compositions of the present invention. When an optically anisotropic product is to be produced by photopolymerization, it is particularly preferred to polymerize the liquid crystal compositions at a temperature as close to the room temperature as possible in order to avoid induction of unintended thermal polymerization. The optically anisotropic product obtained by the polymerization may further be subjected to a heat treatment for inhibiting change in its initial characteristics to steadily maintain the characteristics. The heat treatment may preferably be carried out at a temperature in the range of approximately 50 to 200° C. for a period in the range of 30 seconds to 12 hours.

In order to improve the polymerizability, a thermal polymerization initiator or a photopolymerization initiator may be added to the liquid crystal compositions. Examples of the thermal polymerization initiator may include benzoyl peroxide and bisazobutylonitrile, and examples of the photopolymerization initiator may include benzoin ethers, benzophenones, acetophenones, and benzylketals.

The amount of the polymerization initiator is preferably not more than 10 wt %, more preferably 0.5 to 1.5 wt % of the total weight of the monomers to be polymerized.

The optically anisotropic products of the present invention have been produced using the polymers of the present invention discussed above.

An optically anisotropic product of the present invention may be produced, for example, by preparing a liquid crystal composition for producing a polymer of the present invention so that the composition exhibits liquid crystal properties, and polymerizing the composition with liquid crystal molecules being aligned. More specifically, the optically anisotropic product may be produced by polymerizing the liquid crystal composition carried on a substrate or held between substrates. The substrate used here may have an organic thin film, for example, of polyimide, formed on its surface. The surface of the substrate may either be rubbed with a cloth or has an alignment layer formed by obliquely evaporating $SiO_2$. It is convenient and preferred to use a substrate with an organic thin film formed thereon that has been rubbed with a cloth. The substrate may be made of either an organic or inorganic material.

Examples of the organic material for the substrate may include polycarbonate, polyethylene terephthalate, polystyrene, polyvinyl chloride, polyalylate, triacetyl cellulose, and polysulfone. Examples of the inorganic material for the substrate may include glass and silicone.

When the alignment of the liquid crystal molecules is controlled by an electric field, a substrate having an electrode layer may be used, on which layer the polyimide thin film is preferably formed. For alignment of the liquid crystal molecules, photo-alignment technique may also be used instead of the rubbing method. Alternatively, it is also possible to align the liquid crystal molecules by drawing following the polymerization of the liquid crystal composition.

In producing the optically anisotropic products of the present invention, conditions for the polymerization may suitably be selected from those for producing the polymers of the present invention discussed above. For example, the polymerization may include photopolymerization by irradiation with energy beams such as ultraviolet rays or electron beams. A light source for the photopolymerization may either be a source of polarized light or unpolarized light. The temperature of the irradiation may be decided depending on the purpose and may suitably be selected, since it is sometimes preferred to effect the polymerization in a temperature range wherein the liquid crystal state of the liquid crystal composition is maintained, or in some other times, it is preferred to effect the polymerization in a temperature range wherein the composition is in an isotropic phase.

The optically anisotropic products of the present invention obtained through the processes discussed above may be used as they are with the substrate, or only the polymer layer may be peeled off for use as the optically anisotropic product.

The liquid crystal or optical elements of the present invention include any element that has been produced using a phenylacetylene compound of the present invention, a liquid crystal composition containing the compound, a polymer obtained by polymerizing the composition, or an optically anisotropic product produced using the polymer. These materials may be used, for example, for preparing optical, display, or recording materials, or for preparing optical compensators, polarizers, reflectors, scattering plates, films having coloring effect, or liquid crystal materials. Other constructions of the liquid crystal or optical elements are not particularly limited, and may suitably be selected according to the known methods and depending on the purpose.

EXAMPLES

The present invention will now be explained in detail with reference to Examples, which are merely illustrative and do not intend to limit the present invention.

Example 1

Step 1-1

In a flask equipped with a stirrer and a thermometer, 4.29 g (24.8 mmol) of 4-bromophenol was dissolved in 40 ml of dry dimethylformamide (abbreviated as DMF hereinbelow) under a nitrogen atmosphere, and 5.0 g (29.9 mmol) of 5-bromopentanol and 4.14 g (29.9 mmol) of potassium carbonate were added at room temperature, followed by stirring at 50 to 55° C. for 5 hours under incubation. After the completion of the reaction, water was added, and the mixture was subjected to extraction with ethyl acetate. The resulting organic phase was washed with NaCl saturated water, dried over anhydrous sodium sulfate, filtered, and concentrated, to thereby obtain 7.8 g of a crude product in the form of a yellow oil. The crude product was then purified by silica gel column chromatography using hexane/ethyl acetate as an eluting solvent to obtain 4.91 g of 5-(4-bromophenoxy)pentanol in the form of a light yellow oil in a 76% yield.

Step 1-2

A flask equipped with a stirrer and a thermometer was charged with 7.61 g (29.4 mmol) of 5-(4-bromophenoxy) pentanol and 62 ml of triethylamine under a nitrogen atmosphere. Then 2.72 g (32.3 mmol) of 1-butyne-3-methyl-3-ol, 48.7 mg (0.256 mmol) of copper (I) iodide, 224.1 mg (0.86 mmol) of triphenylphosphine, and 48.7 mg (0.069 mmol) of dichlorobis(triphenylphosphine)palladium(II) were added at room temperature, and stirred under reflux for 5 hours. After the completion of the reaction, the insolubles were filtered off, and the solvent was distilled off. Then ethyl acetate was added, and the pH was adjusted to an acidity with 1N hydrochloric acid, to effect ethyl acetate extraction. The resulting extract was washed with NaCl saturated water, dried over anhydrous sodium sulfate, filtered, and concentrated, to thereby obtain 5.42 g of 5-[4-(3-methyl-3-hydroxybutyne-1-yl)phenoxy]pentanol in the form of light yellow crystals in a 70% yield.

Step 1-3

A flask equipped with a stirrer and a thermometer was charged with 5.41 g (20.6 mmol) of 5-[4-(3-methyl-3-hydroxybutyne-1-yl)phenoxy]pentanol and 70 ml of toluene under a nitrogen atmosphere. To the flask, 1.65 g (41.2 mmol) of sodium hydroxide was added, and stirred under reflux for 4 hours. After the completion of the reaction, water, 1N hydrochloric acid, and ethyl acetate were added to the reactant to adjust the pH to an acidity and effect ethyl acetate extraction. The resulting organic phase was washed with NaCl saturated water, dried over anhydrous sodium sulfate, filtered, and concentrated to thereby obtain 4.13 g of 5-(4-ethynylphenoxy)pentanol in the form of a brown oil in a 98% yield.

Step 1-4

A flask equipped with a stirrer and a thermometer was charged with 3.35 g (9.13 mmol) of 4-bromo-2-(trifluoromethoxy)iodobenzene and 19 ml of triethylamine under a nitrogen atmosphere. Then 1.48 g (9.13 mmol) of 2-[4-(3-methyl-3-hydroxybutyne-1-yl)phenoxy]ethanol, 13.7 mg (0.072 mmol) of copper (I) iodide, 63.2 mg (0.24 mmol) of triphenylphosphine, and 13.7 mg (0.020 mmol) of dichlorobis(triphenylphosphine)palladium were added at room temperature, and stirred under reflux for 6 hours. After the insolubles were filtered off and the solvent was distilled off, ethyl acetate was added to the resulting distillate, and the pH was adjusted to an acidity with 1N hydrochloric acid to effect ethyl acetate extraction. The resulting extract was washed with NaCl saturated water, dried over anhydrous sodium sulfate, filtered, and concentrated to thereby obtain 3.85 g of a crude product in the form of a yellowish brown solid. The crude product was then purified by silica gel column chromatography using hexane/ethyl acetate as an eluting solvent to obtain 3.0 g of 2-(4-{2-[4-bromo-2-(trifluoromethoxy)phenyl]ethynyl}phenoxy)ethanol in the form of a light yellow solid in a 82% yield.

Step 1-5

A flask equipped with a stirrer and a thermometer was charged with 2.99 g (7.44 mmol) of 2-(4-{2-[4-bromo-2-(trifluoromethoxy)phenyl]ethynyl}phenoxy)ethanol and 16 ml of triethylamine under a nitrogen atmosphere. Then 1.52 g (7.44 mmol) of 5-(4-ethynylphenoxy)pentanol, 11.2 mg (0.059 mmol) of copper (I) iodide, 51.5 mg (0.20 mmol) of triphenylphosphine, and 11.2 mg (0.016 mmol) of dichlorobis(triphenylphosphine)palladium were added at room temperature, and stirred under reflux for 6.5 hours. After the insolubles were filtered off and the solvent was distilled off, ethyl acetate was added to the resulting distillate, and the pH was adjusted to an acidity with 1N hydrochloric acid to effect ethyl acetate extraction. The resulting extract was washed with NaCl saturated water, dried over anhydrous sodium sulfate, filtered, and concentrated to thereby obtain 4.27 g of a crude product in the form of a yellowish brown solid. The crude product was then purified by silica gel column chromatography using hexane/ethyl acetate as an eluting solvent to obtain 3.2 g of 5-{4-[2-(4-{2-[4-(2-hydroxyethoxy)phenyl]ethynyl}-3-(trifluoromethoxy)phenyl)ethynyl]phenoxy}pentane-1-ol in the form of a light yellow solid in a 82% yield.

Step 1-6

A flask equipped with a stirrer and a thermometer was charged with 2.7 g (5.15 mmol) of 5-{4-[2-(4-{2-[4-(2-hydroxyethoxy)phenyl]ethynyl}-3-(trifluoromethoxy)phenyl)ethynyl]phenoxy}pentane-1-ol, 1.6 ml of triethylamine, and 50 ml of THF under a nitrogen atmosphere, and cooled with ice. Under the ice cooling, 1.03 g of acrylic acid chloride was added dropwise, stirred for 30 minutes at the same temperature, and then at room temperature for 2 hours. When the starting materials were observed to have been disappeared, the reaction mass was cooled down to 0° C. again, and the reaction was stopped by adding 5% aqueous solution of sodium carbonate. The reactant was subjected to ethyl acetate extraction, and the resulting extract was washed with water and then with NaCl saturated water, dried over anhydrous sodium sulfate, filtered, and concentrated to thereby obtain a crude product. The crude product was then added to 50 ml of a 5:1 mixture of hexane/chloroform to crystallize, and the resulting crystals were filtered and dried under reduced pressure to thereby obtain 2.4 g of light yellow crystals. The crystals thus obtained were dissolved in 10 ml of chloroform, 50 ml of hexane was added, and the mixture was left still overnight. The resulting crystals were filtered and dried under reduced pressure to obtain 1.7 g of 5-{4-[2-(4-{2-[4-(2-prop-2-enoyloxyethoxy)phenyl]ethynyl}-3-(trifluoromethoxy)phenyl)ethynyl]phenoxy}pentylprop-2-enoate (1-1) in the form of light yellow crystals in a 52% yield.

The $^1$H-NMR spectrum data of the compound thus obtained are shown below with its chemical formula. $^1$H-NMR (δ): 1.52–1.63 (m, 2H), 1.71–1.90 (m, 4H), 4.00 (t, 2H, J=6.5 Hz), 4.17–4.26 (m, 4H), 4.51–4.55 (m, 2H), 5.80–5.89 (m, 2H), 6.07–6.22 (m, 2H), 6.81–6.93 (m, 4H), 7.37–7.52 (m, 7H).

The phase sequence of the obtained compound was evaluated through polarization microscopic observation to find that, upon lowering the temperature, the compound exhibited a nematic phase in the range of 21–91° C., thus being a liquid crystalline compound. 10 wt % of this compound was added to a nematic composition MJ931381 (manufactured by Merck Japan Co.) and the refractive index anisotropy Δn was determined, from which Δn of the compound was extrapolated based on the concentration. It was determined that the Δn of the compound was 0.33, which is an extremely large value. Δn was measured with an Abbe refractometer at 20° C. and at the wavelength of 589 nm.

(1-1)

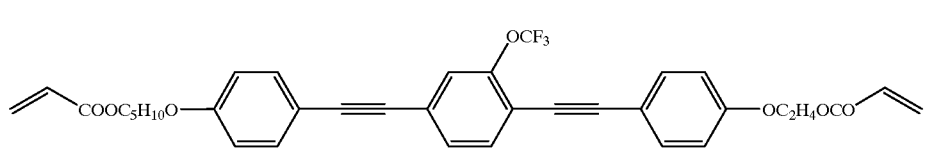

Example 2

Step 2-1

Step 1-1 in Example 1 was performed except that 5-bromopentanol was replaced with 2-bromoethanol, to thereby obtain 2-(4-phenoxy)ethanol in a 77% yield.

Step 2-2

Step 1-2 in Example 1 was performed except that 5-(4-bromophenoxy)pentanol was replaced with 2-(4-phenoxy)ethanol, to thereby obtain 2-[4-(3-methyl-3-hydroxybutyne-1-yl)phenoxy]ethanol in a 75% yield.

Step 2-3

Step 1-3 in Example 1 was performed except that 5-[4-(3-methyl-3-hydroxybutyne-1-yl)phenoxy]pentanol was replaced with 2-[4-(3-methyl-3-hydroxybutyne-1-yl)phenoxy]ethanol, to thereby obtain 2-(4-ethynylphenoxy)ethanol in a 100% yield.

Step 2-4

Step 1-4 in Example 1 was performed except that 4-bromo-2-(trifluoromethoxy)iodobenzene was replaced with 4-bromo-2-(ethyl)iodobenzene, to thereby obtain 2-{4-[2-(4-bromo-2-ethylphenyl)ethynyl]phenoxyl}ethanol in a 73% yield.

Step 2-5

Step 1-5 in Example 1 was performed except that 2-(4-{2-[4-bromo-2-(trifluoromethoxy)phenyl]ethynyl}phenoxy)ethanol was replaced with 2-{4-[2-(4-bromo-2-ethylphenyl)ethynyl]phenoxy}ethanol, to thereby obtain 5-{4-[2-(4-{2-[4-(2-hydroxyethoxy)phenyl]ethynyl}-3-ethylphenyl)ethynyl]phenoxy}pentane-1-ol in a 77% yield.

Step 2-6

Step 1-6 in Example 1 was performed except that 5-{4-[2-(4-{2-[4-(2-hydroxyethoxy)phenyl]ethynyl}-3-(trifluoromethoxy)phenyl)ethynyl]phenoxy}pentane-1-ol was replaced with 5-{4-[2-(4-{2-[4-(2-hydroxyethoxy)phenyl]ethynyl}-3-ethylphenyl)ethynyl]phenoxy}pentane-1-ol, to thereby obtain 5-{4-[2-(4-{2-[4-(2-prop-2-enoyloxyethoxy)phenyl]ethynyl}-3-ethylphenyl)ethynyl]phenoxy}pentylprop-2-enoate (1-2). The $^1$H-NMR spectrum data of the compound thus obtained are shown below with its chemical formula.

$^1$H-NMR (δ): 1.31 (t, 3 H, J=7.8 Hz), 1.52–1.63 (m, 2H), 1.71–1.89 (m, 4H), 2.87 (q, 2H, J=7.8 Hz), 3.99 (t, 2H, J=6.3 Hz), 4.17–4.26 (m, 4H), 4.51–4.55 (m, 2H), 5.80–5.89 (m,

2H), 6.07–6.22 (m, 2H), 6.37–6.49 (m, 2H), 6.84–6.92 (m, 4H), 7.28–7.49 (m, 7H).

(triphenylphosphine)palladium, 20.4 ml of triethylamine, and 243 ml of dry DMF under a nitrogen atmosphere, and (1-2)

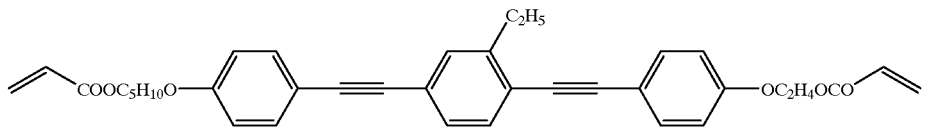

The phase sequence of the obtained compound was evaluated through polarization microscopic observation in the same way as in Example 1 to find that the compound was in a nematic phase in the range of 98–110° C., thus being a liquid crystalline compound. Further, the Δn of this compound was determined in the same way as in Example 1 to find that the Δn of the compound was 0.33, which is an extremely large value.

Example 3

Step 3-1

A flask equipped with a stirrer and a thermometer was charged with 26 g of IDAM-2, 0.182 g of dichlorobis(triphenylphosphine)palladium, 0.68 g of triphenylphosphine, 0.15 g of copper iodide, and 182 ml of triethylamine under a nitrogen atmosphere, and the temperature was raised up to 65° C. Then a solution of 28.0 g of IM-1a dissolved in 30 ml of triethylamine was added dropwise, and stirred at 89° C. for 5 hours. After the temperature was brought to the room temperature, the reactant was filtered and washed with ethyl acetate. The resulting filtrate was concentrated to obtain a solid, which was subjected to separation by silica gel chromatography using a 1:7 mixture of ethyl acetate/hexane mixed with 0.1% triethylamine as an eluting solvent, to thereby obtain 39.1 g of the objective compound IDAM-3a.

Step 3-2

A flask equipped with a stirrer and a thermometer was charged with 28.1 g of IDAM-3a, 413.1 ml of methanol, and 0.83 g of p-toluenesulfonic acid under a nitrogen atmosphere, and stirred at 3 to 6° C. After the completion of the reaction, 10 ml of triethylamine was added, and the reactant was concentrated. The resulting concentrate was subjected to separation by silica gel chromatography using a 1:3 mixture of ethyl acetate/hexane as an eluting solvent, to thereby obtain 22.91 g of the objective compound IDAM-4a.

Step 3-3

A flask equipped with a stirrer and a thermometer was charged with 19.5 g of IDAM-4a, 2.3 g of 4-pyrorinopyridine, 82 ml of pyridine, and dry dichloromethane under a nitrogen atmosphere, and stirred in an ice bed. Then 15.4 ml of trifluoromethane sulfonic acid dissolved in 20 ml of dichloromethane was added dropwise, and stirred in an ice bed for 1 hour. After the completion of the reaction, water and dichloromethane was added to the reactant to effect extraction. The dichloromethane extract was washed with water, concentrated, and subjected to separation by silica gel chromatography using a 1:4 mixture of ethyl acetate/hexane mixed with 0.1% triethylamine as an eluting solvent to thereby obtain 25.6 g of the objective compound IDAM-5a.

Step 3-4

A flask equipped with a stirrer and a thermometer was charged with 23.5 g of IDAM-5a, 0.6 g of dichlorobis(triphenylphosphine)palladium, 20.4 ml of triethylamine, and 243 ml of dry DMF under a nitrogen atmosphere, and the temperature was raised up to 65° C. Then 12.0 g of IM-2 dissolved in 12 ml of DMF was added dropwise, and stirred for 5.5 hours. After the completion of the reaction, hexane, ethyl acetate, and water were added to the reactant to effect extraction, and the extract was washed with water. The resulting organic phase was dried, concentrated, and subjected to separation by silica gel chromatography using a 1:3 mixture of ethyl acetate/hexane mixed with 0.1% triethylamine as an eluting solvent to thereby obtain 29 g of the objective compound IDAM-6a.

Step 3-5

A flask equipped with a stirrer and a thermometer was charged with 23.31 g of IDAM-6a, 195 ml of THT, and 1.8 g of lithium aluminum hydride under a nitrogen atmosphere, and stirred in an ice bed for 1 hour. After the completion of the reaction, the reactant was neutralized with 21.69 g of a 10% aqueous solution of sodium hydroxide, and the resulting reactant was extracted with ethyl acetate. The organic phase was washed with water and concentrated to thereby obtain 22.28 g of the objective compound IDAM-7a.

Step 3-6

A flask equipped with a stirrer and a thermometer was charged with22.28 g of IDAM-7a, 100 ml of chloroform, 100 ml of methanol, and 0.6 g of p-toluenesulfonic acid under a nitrogen atmosphere, and stirred at room temperature for a day. After the completion of the reaction, 63 ml of triethylamine was added, and the reactant was concentrated. The concentrate was subjected to separation by silica gel chromatography using a 1:3 mixture of ethyl acetate/hexane mixed with 0.1% triethylamine as an eluting solvent, to thereby obtain 18.4 g of the objective compound IDAM-8a.

Step 3-7

A flask equipped with a stirrer and a thermometer was charged with 5.4 g of IDAM-8a, 4 ml of dry triethylamine, and 117 ml of dry THF under a nitrogen atmosphere, to which 2.3 ml of acrylic acid chloride was added dropwise in an ice bed. After the resulting mass was stirred for 30 minutes, and the temperature was brought to the room temperature, 50 ml of a 5% aqueous solution of sodium carbonate was added dropwise. The reactant was extracted with ethyl acetate, washed with water and with NaCl saturated water. The organic phase was washed, dried, concentrated, and subjected to separation by silica gel chromatography using a 5:1 mixture of chloroform/hexane mixed with 0.2% triethylamine as an eluting solvent, to thereby obtain 6.4 g of the objective compound 5-{4-[2-(4-{2-[4-(2-prop-2-enoyloxyethoxy)phenyl]ethynyl}-3-methoxyphenyl)ethynyl]phenoxy}pentylprop-2-enoate (1-3). The $^1$H-NMR spectrum data of the resulting compound (1-3) are shown below. Further, the reaction process of this Example as well as that of Example 4 to be discussed later are also shown below.

$^1$H-NMR(CDCl$_3$, δ): 1.52–1.61 (m, 2H), 1.71–1.87 (m, 4H), 3.93 (s, 3H), 3.99 (t, 2H, J=6.3 Hz), 4.19–4.25 (m, 4H), 4.53 (t, 2H, J=4.8 Hz), 5.84–5.90 (m, 2H), 6.08–6.22 (m, 2H), 6.38–6.50 (m, 2H), 6.85–6.91 (m, 4H), 7.02–7.16 (m, 2H), 7.41–7.52 (m, 5H).
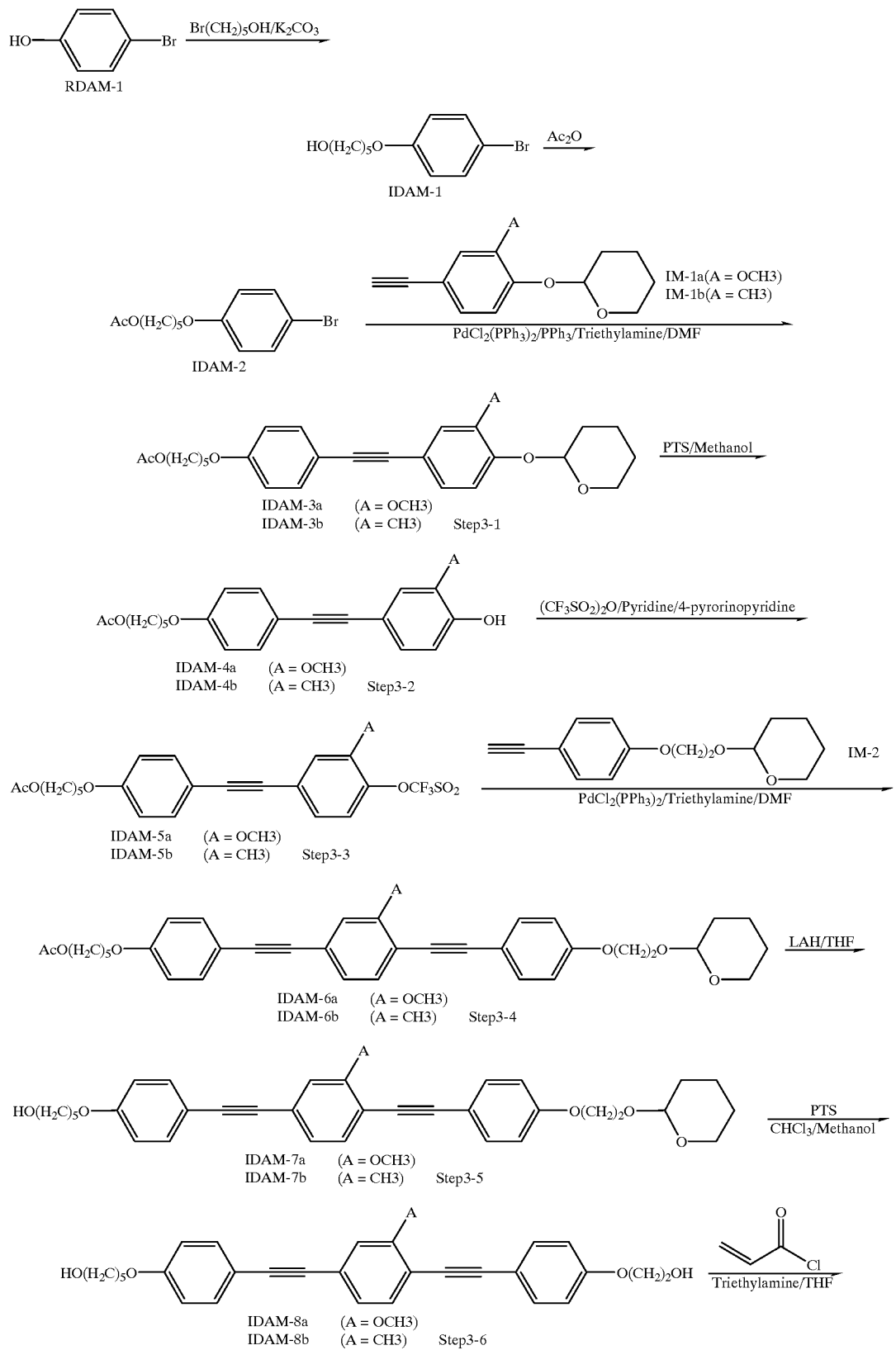

-continued

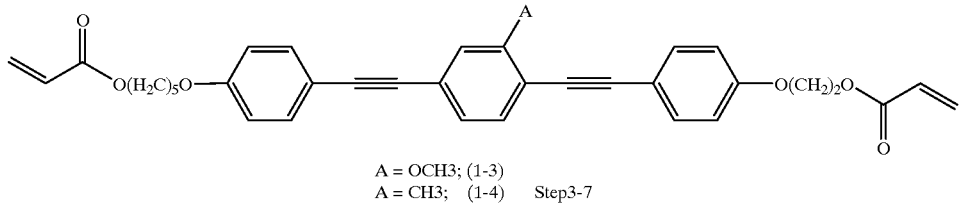

A = OCH3; (1-3)
A = CH3; (1-4)   Step3-7

The phase sequence of the compound obtained above was evaluated in the same way as in Example 1 to find that, upon lowering the temperature, the compound exhibited a nematic phase in the range of 51–107° C., thus being a liquid crystalline compound. Further, the Δn of this compound was determined in the same way as in Example 1 to find that the Δn of the compound was 0.35, which is an extremely large value.

Example 4

Process of Example 3 for synthesizing the compound (1-3) was performed except that the intermediates IDAM-3a to 8a were replaced with IDAM-3b to 8b, and IM-1a was replaced with IM-1b to thereby obtain 5-{4-[2-(4-{2-[4-(2-prop-2-enoyloxyethoxy)phenyl]ethynyl}-3-methylphenyl) ethynyl]phenoxy}pentylprop-2-enoate (1-4). The $^1$H-NMR spectrum data of the compound (1-4) thus obtained are shown below.

$^1$H-NMR (CDCl$_3$, δ): 1.52–1.61 (m, 2H), 1.71–1.87 (m, 4H), 2.49 (s, 3H), 3.98 (t, 2H, J=6.3 Hz), 4.19–4.25 (m, 4H), 4.53 (t, 2H, J=4.8 Hz), 5.84–5.90 (m, 2H), 6.08–6.22 (m, 2H), 6.38–6.50 (m, 2H), 6.84–6.98 (m, 4H), 7.29–7.52 (m, 7H).

The phase sequence of the compound obtained above was evaluated in the same way as in Example 1 to find that, upon lowering the temperature, the compound exhibited a nematic phase in the range of 93–140° C., thus being a liquid crystalline compound. Further, the Δn of this compound was determined in the same way as in Example 1 to find that the Δn of the compound was 0.34, which is an extremely large value.

Example 5

A flask equipped with a stirrer and a thermometer was charged with 62 g of RDAM-1, 132 ml of methyl ethyl ketone, and 50 g of potassium carbonate under a nitrogen atmosphere, and the temperature was raised up to 70° C. After stirring for 0.5 hours, 72 g of 1-bromo-n-octyl alcohol was added dropwise, and stirred at 83° C. for 8 hours. After the temperature was brought to the room temperature, the reactant was filtered and washed with methyl ethyl ketone. The filtrate was concentrated and washed with toluene and with a 5% aqueous solution of sodium hydroxide. The resulting filtrate was further washed with water and separated, followed by concentration, to thereby obtain 73.1 g of IM1d-1.

A flask equipped with a stirrer and a thermometer was charged with 72 g of IM1d-1 and 240 g of acetic anhydride under a nitrogen atmosphere, to which 23.9 g of acetyl chloride was added dropwise, and stirred at 23° C. for 0.5 hours. The reactant was concentrated and subjected to separation by silica gel chromatography using a 1:5 mixture of ethyl acetate/hexane mixed with 0.1% triethylamine as an eluting solvent, to thereby obtain 62.4 g of IM1d-2.

A flask equipped with a stirrer and a thermometer was charged with 20 g of IM1d-2, 0.2 g of dichlorobis (triphenylphosphine)palladium, 0.4 g of triphenylphosphine, 0.2 g of copper iodide, and 117 ml of triethylamine under a nitrogen atmosphere, and the temperature was raised up to 70° C. Then 21.5 g of IM1f dissolved in 20 ml of triethylamine was added dropwise, and stirred at 66° C. for 8 hours. The reactant was filtered and washed with ethyl acetate. The filtrate was concentrated and subjected to separation by silica gel chromatography using a 1:20 mixture of ethyl acetate/hexane mixed with 0.1% triethylamine as an eluting solvent to thereby obtain 23.9 g of IM1i-3.

A flask equipped with a stirrer and a thermometer was charged with 23.8 g of IM1i-3, 90 ml of methanol, 190 ml of chloroform, and 0.6 ml of p-toluenesulfonic acid under a nitrogen atmosphere, and stirred in an ice bed for 1.25 hours, and then at room temperature for 4.25 hours. 7 ml of triethylamine was added and the reactant was concentrated. The concentrate was separated by silica gel chromatography using a 1:5 mixture of ethyl acetate/hexane mixed with 0.1% triethylamine as an eluting solvent to thereby obtain 19.8 g of IM1i-4.

A flask equipped with a stirrer and a thermometer was charged with 17 g of IM1i-4, 1.8 g of 4-pyrorinopyridine, 64 ml of pyridine, and 160 ml of dichloromethane under a nitrogen atmosphere, and cooled down to an icy temperature in an ice bed. Then 7.9 ml of trifluoromethane sulfonic anhydride and 10 ml of dichloromethane were added dropwise, and stirred in an ice bed for 4.25 hours. After the temperature was brought to the room temperature, water and ethyl acetate were added to extract the reactant. The ethyl acetate extract was washed twice with water, concentrated, and separated by silica gel chromatography using a 1:5 mixture of ethyl acetate/hexane mixed with 0.1% triethylamine as an eluting solvent to thereby obtain 21.97 g of IM1i-5.

A flask equipped with a stirrer and a thermometer was charged with 21.9 g of IM1i-5, 0.45 g of dichlorobis (triphenylphosphine)palladium, 8.2 ml of triethylamine, and 158 ml of DMF under a nitrogen atmosphere, and the temperature was raised up to 65° C. Then 14.4 g of IM1k-6 dissolved in 15 ml of DMF was added dropwise, and stirred at 65° C. for 4 hours. While observing the behavior of the reaction, 0.4 g of dichlorobis(triphenylphosphine)palladium was added, and the temperature was gradually raised up to 80° C. Ethanol and water were added to the reactant for extraction. The ethanol extract washed with water, dried, concentrated, and subjected to separation by silica gel chromatography using a 1:8 mixture of ethyl acetate/hexane mixed with 0.1% triethylamine as an eluting solvent, to thereby obtain 23.64 g of IM1i-7.

A flask equipped with a stirrer and a thermometer was charged with 23.64 g of IM1i-7, 167 ml of THF, and 1.4 g of LAH under a nitrogen atmosphere, and stirred at room temperature for 1.5 hours. Then 50 ml of water and 50 ml of a 20% aqueous solution of sodium hydroxide were added, and the reactant was extracted with ethyl acetate. The extract was washed with water and concentrated to thereby obtain 21.11 g of IM1i-8.

A flask equipped with a stirrer and a thermometer was charged with 21.11 g of IM1i-8, 60 ml of methylene chloride, and 0.4 g of p-toluenesulfonic acid under a nitrogen atmosphere, to which 90 ml of methanol was added dropwise, and stirred at 2 to 16° C. for 10.5 hours. After the resulting mass was cooled down to an icy temperature in an ice bed, 5 ml of triethylamine was added. The reactant was concentrated and subjected to separation by silica gel chromatography using a 1:1 mixture of ethyl acetate/hexane mixed with 0.1% triethylamine as an eluting solvent, followed by recrystallization from ethyl acetate, to thereby obtain 14.6 g of IM1i-9.

A flask equipped with a stirrer and a thermometer was charged with 5 g of IM1i-9, 3 ml of dry triethylamine, and 90 ml of dry THF under a nitrogen atmosphere, to which 1.8 ml of acrylic acid chloride was added dropwise in an ice bed. The resulting mass was stirred in an ice bed for 30 minutes and then at the room temperature for 1 hour. Then 50 ml of a 5% aqueous solution of sodium carbonate was added dropwise, and the reactant was extracted with methylene chloride. The extract was washed with water and with NaCl saturated water, and dried over anhydrous magnesium sulfate. The reactant was concentrated and subjected to separation by silica gel chromatography using ethyl acetate mixed with 0.1% triethylamine as an eluting solvent to thereby obtain 4.7 g of the objective compound (1-5). The $^1$H-NMR spectrum data of the compound (1-5) thus obtained are shown below. Further, the reaction process of this Example as well as those of Examples 6 and 7 to be discussed later are also shown below.

$^1$H-NMR,(CDCl$_3$, δ): 1.00 (t, 3H, J=7.8 Hz) 1.30–1.60 (m, 12H), 1.62–1.90 (m, 10H), 2.80 (t, 2H, J=7.8 Hz), 3.90–4.00 (m, 4H), 4.10–4.21 (m, 4H), 5.78–5.89 (m, 2H), 6.07–6.19 (m, 2H), 6.35–6.45 (m, 2H), 6.80–6.91 (m, 4H), 7.25–7.51 (m, 7H).

The phase sequence of the compound obtained above was evaluated in the same way as in Example 1 to find that the compound was in a nematic phase over as wide a range as 39–82° C., thus being a liquid crystalline compound. Further, the Δn of this compound was determined in the same way as in Example 1 to find that the Δn of the compound was 0.30, which is an extremely large value.

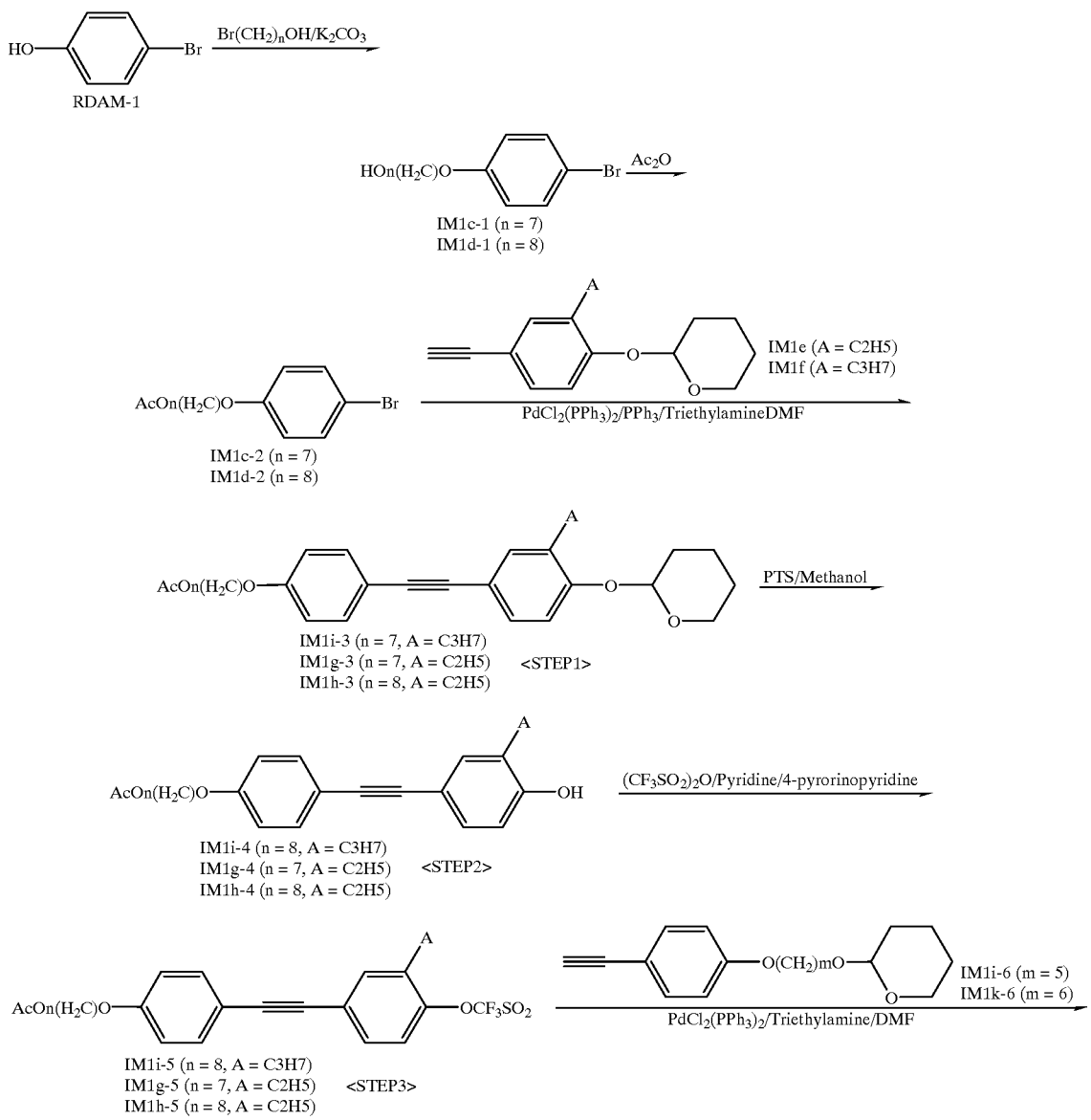

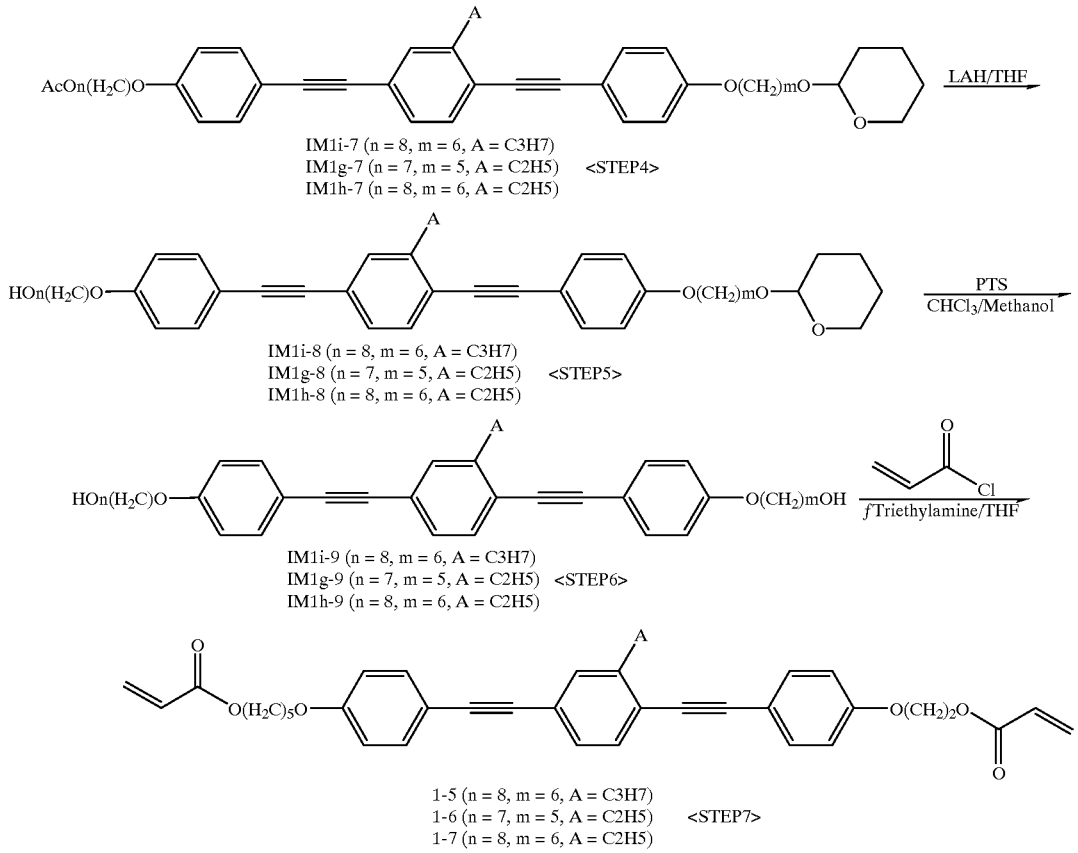

Example 6

Process of Example 5 for synthesizing the compound (1-5) was performed except that the intermediate IM1d-1 was replaced with IM1c-1, IM1d-2 with IM1c-2, IM1f with IM1e, IM1i-3 with IM1g-3, IM1i-4 with IM1g-4, IM1k-6 with IM1j-6, IM1i-5 with IM1g-5, IM1i-7 with IM1g-7, IM1i-8 with IM1g-8, and IM1i-9 with IM1g-9 to thereby obtain compound (1-6). The $^1$H-NMR spectrum data of the compound (1-6) thus obtained are shown below.

$^1$H-NMR (CDCl$_3$, δ): 1.33 (t, 3H, J=7.8 Hz), 1.37–1.63 (m, 8H) 1.65–1.91 (m, 8H), 2.87 (q, 2H, J=7.8 Hz), 3.90–4.05 (m, 4H), 4.10–4.21 (m, 4H), 5.78–5.89 (m, 2H), 6.07–6.19 (m, 2H), 6.37–6.47 (m, 2H), 6.80–6.91 (m, 4H), 7.25–7.51 (m, 7H).

The phase sequence of the compound obtained above was evaluated in the same way as in Example 1 to find that the compound was in a nematic phase over as wide a range as 54–114° C., thus being a liquid crystalline compound. Further, the Δn of this compound was determined in the same way as in Example 1 to find that the Δn of the compound was 0.33, which is an extremely large value.

Example 7

Process of Example 5 for synthesizing the compound (1-5) was performed except that the intermediate IM1f was replaced with IM1e, IM1i-3 with IM1h-3, IM1i-4 with IM1h-4, IM1i-5 with IM1h-5, IM1i-7 with IM1h-7, IM1i-8 with IM1h-8, and IM1i-9 with IM1h-9, to thereby obtain compound (1-7). The $^1$H-NMR spectrum data of the compound (1-7) thus obtained are shown below.

$^1$H-NMR(CDCl$_3$, δ): 1.31 (t, 3H, J=7.8 Hz), 1.25–1.65 (m, 12H), 1.65–1.90 (m, 8H), 2.89 (q, 2H, J=7.8 Hz), 3.90–4.02 (m, 4H), 4.10–4.21 (m, 4H), 5.78–5.89 (m, 2H), 6.07–6.19 (m, 2H), 6.35–6.45 (m, 2H), 6.80–6.91 (m, 4H) 7.25–7.51 (m, 7H).

The phase sequence of the compound obtained above was evaluated in the same way as in Example 1 to find that the compound was in a nematic phase over as wide a range as 38–104° C., thus being a liquid crystalline compound. Further, the Δn of this compound was determined in the same way as in Example 1 to find that the Δn of the compound was 0.30, which is an extremely large value.

Example 8

The compound (1-4) synthesized in Example 4 was mixed with 1 wt % of a photopolymerization initiator "IRGA-CURE 651" manufactured by CIBA GEIGY AG, and the resulting mixture was injected into a transparent glass cell having a cell gap of about 8 μm. The transparent glass cell had been fabricated by applying a polyimide thin film on the surface of two glass substrates, rubbing the surface, and arranging the two substrates with the directions of rubbing being parallel to each other. The glass cell was irradiated with a light from a high-pressure mercury lamp at 1500 mJ/cm$^2$ at 105° C. to polymerize the liquid crystalline material. Through polarization microscopic observation of the cell, it was confirmed that an optically anisotropic product had been obtained wherein the nematic alignment had been uniformly fixed.

Next, the compound (1-1) and the above photopolymerization initiator were injected into a cell composed of two glass substrates that had been treated for alignment in the same manner as above and arranged in the form of a wedge of about 1.6 degree, and polymerized under the same conditions as above. The cell thus fabricated was measured for the refractive index anisotropy using helium-neon laser in accordance with the method described in "*Structures and Properties of Ferroelectric Liquid Crystal* (Kyo-yudensei Ekisho no Kozo to Bussei)" by Atsuo Fukuda and Hideo Takezoe, Corona Publishing Co., Ltd., p316. It was found that the refractive index anisotropy was 0.34 at 20° C., which is an extremely large value.

Example 9

The compound (1-2) synthesized in Example 2, in place of the compound (1-4), was injected into a cell in the same manner as in Example 8, and photopolymerized under the same conditions.

Through polarization microscopic observation of the cell thus fabricated, it was confirmed that an optically anisotropic product has been obtained wherein the nematic alignment had been uniformly fixed.

It was also confirmed that the refractive index anisotropy of the compound was 0.26 at 20° C., which is an extremely large value.

Example 10

The compound (1-4) synthesized in Example 4 and the compound (1-2) were mixed at a ratio of 1:1 by weight, and the resulting liquid crystal composition was observed under a polarization microscope. It was found that the composition was in a nematic phase over as wide a range as 87 to 148° C.

Example 11

The liquid crystal composition prepared in Example 10 was mixed with 1 wt % of a photopolymerization initiator "IRGACURE 651" manufactured by CIBA GEIGY AG, and polymerized under the same conditions as in Example 8 except that the polymerization temperature was 95° C.

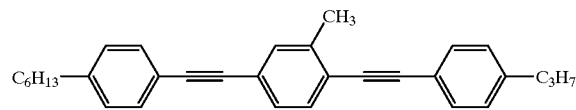

(2-1)

Example 13

The liquid crystal composition prepared in Example 12 was mixed with 1 wt % of a photopolymerization initiator "IRGACURE 651" manufactured by CIBA GEIGY AG, and polymerized under the same conditions as in Example 8 except that the polymerization temperature was 95° C. Through polarization microscopic observation of the cell thus fabricated, it was confirmed that an optically anisotropic product had been obtained wherein the nematic alignment had been uniformly fixed.

Further, the liquid crystal composition containing the photopolymerization initiator was polymerized in a wedge-shaped cell as in Example 8, and measured for the refractive index anisotropy. It was found that the refractive index anisotropy was 0.34 at 60° C., which is an extremely large value.

Example 14

The compound (1-4) synthesized in Example 4 and the compound (5-1) as represented by the formula (β) were mixed at a ratio of 1:1 by weight, and the resulting liquid crystal composition was injected into a cell as in Example 8. Through polarization microscopic observation, it was found that the composition was in a smectic A phase in the range of 64 to 74° C., and in a nematic phase over as wide a range as 73 to 120° C. Further in the same way as in Example 1, the Δn was determined to be 0.27 at 73° C., which is an extremely large value.

Through polarization microscopic observation of the cell thus fabricated, it was confirmed that an optically anisotropic product had been obtained wherein the nematic alignment had been uniformly fixed.

Further, the liquid crystal composition containing the photopolymerization initiator was polymerized in a wedge-shaped cell as in Example 8, and measured for the refractive index anisotropy. It was found that the refractive index anisotropy was 0.28 at 20° C., which is an extremely large value.

Example 12

The compound (1-4) synthesized in Example 4 and the compound (2-1) as represented by the formula (α-1) were mixed at a ratio of 1:1 by weight, and the resulting liquid crystal composition was injected into a cell as in Example 8. Through polarization microscopic observation it was found that the composition was in a nematic phase over as wide a range as 67 to 162° C. Further, in the same way as in Example 1, the Δn was determined to be 0.34 at 70° C., which is an extremely large value.

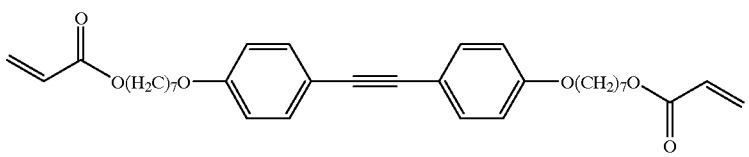

(5-1)

Example 15

The liquid crystal composition prepared in Example 14 was mixed with 1 wt % of a photopolymerization initiator "IRGACURE 651" manufactured by CIBA GEIGY AG, and polymerized under the same conditions as in Example 8. Through polarization microscopic observation of the cell thus fabricated, it was confirmed that an optically anisotropic product had been obtained wherein the nematic alignment had been uniformly fixed.

Further, the liquid crystal composition containing the photopolymerization initiator was polymerized in a wedge-shaped cell as in Example 8, and measured for the refractive index anisotropy. It was found that the refractive index anisotropy was 0.28 at 20° C., which is an extremely large value.

Example 16

The compound (1-5) represented by the formula (1-5) below was mixed with 1 wt % of a photopolymerization initiator "IRGACURE 651" manufactured by CIBA GEIGY AG, and polymerized under the same conditions as in Example 8 except that the polymerization temperature was 40° C.

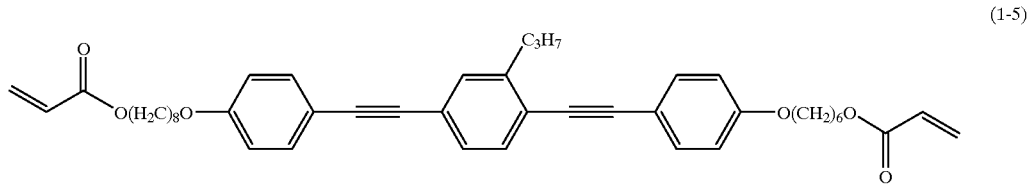

(1-5)

Through polarization microscopic observation of the cell thus fabricated, it was confirmed that an optically anisotropic product had been obtained wherein the nematic alignment had been uniformly fixed.

Further, the liquid crystal composition containing the photopolymerization initiator was polymerized in a wedge-shaped cell as in Example 8, and measured for the refractive index anisotropy. It was found that the refractive index anisotropy was 0.254 at 20° C., which is an extremely large value.

Example 17

The compound (1-6) represented by the formula (1-6) below was mixed with 1 wt % of a photopolymerization initiator "IRGACURE 651" manufactured by CIBA GEIGY AG, and polymerized under the same conditions as in Example 8 except that the polymerization temperature was 60° C.

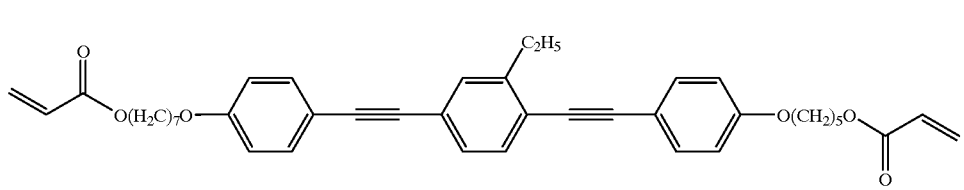

(1-6)

Through polarization microscopic observation of the cell thus fabricated, it was confirmed that an optically anisotropic product had been obtained wherein the nematic alignment had been uniformly fixed.

Further, the liquid crystal composition containing the photopolymerization initiator was polymerized in a wedge-shaped cell as in Example 8, and measured for the refractive index anisotropy. It was found that the refractive index anisotropy was 0.275 at 20° C., which is an extremely large value.

Example 18

The compound (1-7) represented by the formula (1-7) below was mixed with 1 wt % of a photopolymerization initiator "IRGACURE 651" manufactured by CIBA GEIGY AG, and polymerized under the same conditions as in Example 8 except that the polymerization temperature was 60° C.

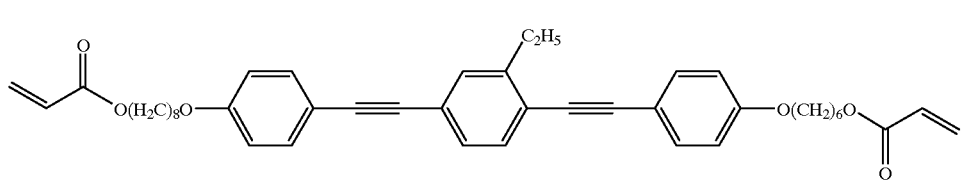

(1-7)

Through polarization microscopic observation of the cell thus fabricated, it was confirmed that an optically anisotropic product had been obtained wherein the nematic alignment had been uniformly fixed.

Further, the liquid crystal composition containing the photopolymerization initiator was polymerized in a wedge-shaped cell as in Example 8, and measured for the refractive index anisotropy. It was found that the refractive index anisotropy was 0.259 at 20° C., which is an extremely large value.

From the results of Examples 8 and 18, it was confirmed that optically anisotropic products having extremely high optical anisotropies may be prepared by the use of the liquid crystalline materials of the present invention.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A phenylacetylene compound represented by the formula (1):

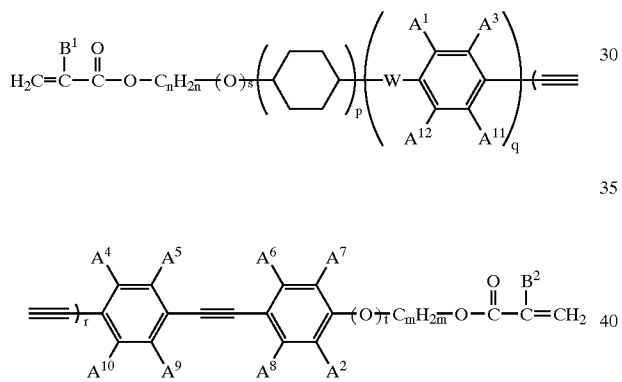

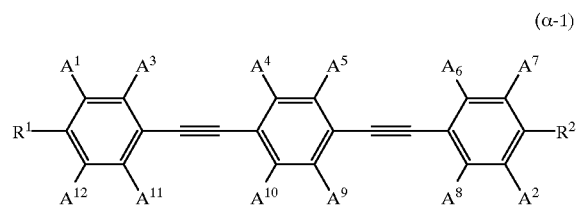

wherein $A^1$ to $A^{12}$ each independently stands for a hydrogen atom, a fluorine atom, or an alkyl or alkoxy group having 1 to 10 carbon atoms optionally substituted with at least one fluorine atom; $B^1$ and $B^2$ each stands for a hydrogen atom or a methyl group; p, q, r, s, and t each denotes 0 or 1, provided that both p and q do not denote 1 at the same time, and that when q is 0, at least one of $A^2$ and $A^4$ to $A^{10}$ stands for an alkyl or alkoxy group having 1 to 10 carbon atoms optionally substituted with at least one fluorine atom; m and n each denotes an integer of 0 to 14, provided that when s is 1, n is not 0, and when t is 1, m is not 0; W stands for a single bond, —$CH_2CH_2$—, or —$C\equiv C$—.

2. The phenylacetylene compound of claim 1, wherein at least one of $A^4$, $A^5$, $A^9$, and $A^{10}$ in the formula (1) stands for an alkyl or alkoxy group having 1 to 10 carbon atoms optionally substituted with at least one fluorine atom.

3. The phenylacetylene compound of claim 1, wherein s and t in the formula (1) both denote 1.

4. A liquid crystal composition comprising a phenylacetylene compound of claim 1.

5. The liquid crystal composition of claim 4, further comprising at least one liquid crystalline compound selected from the group consisting of compounds represented by the formulae (α-1) to (α-3):

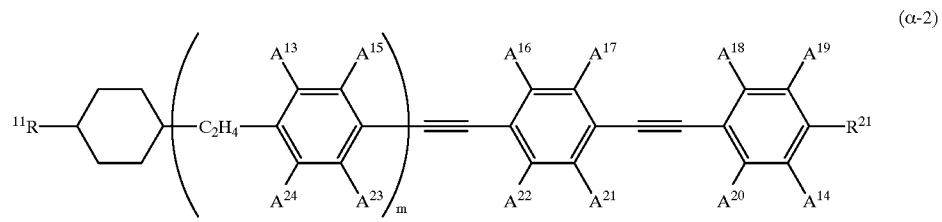

wherein $A^1$ to $A^{12}$ each independently stands for a hydrogen atom, a fluorine atom, an alkyl or alkoxy group having 1 to 10 carbon atoms optionally substituted with at least one fluorine atom; $R^1$ and $R^2$ each independently stands for a hydrogen atom, a fluorine atom, a cyano group, —$SF_5$, —NCS, a 4-$R^3$-(cycloalkyl) group, a 4-$R^3$-(cycloalkenyl) group, or an $R^4$—$(O)q^1$ group, wherein $R^3$ stands for a hydrogen atom or a straight or branched alkyl group having 1 to 12 carbon atoms optionally substituted with at least one fluorine atom, $R^4$ stands for a straight or branched alkyl group having 1 to 12 carbon atoms optionally substituted with at least one fluorine atom, and $q^1$ denotes 0 or 1;

(α-2)

wherein $A^{13}$ to $A^{24}$ each independently stands for a hydrogen atom, a fluorine atom, or an alkyl group having 1 to 10 carbon atoms; m is 0 or 1; $R^{11}$ stands for a hydrogen atom or a straight or branched alkyl group having 1 to 12 carbon atoms optionally substituted with at least one fluorine atom; $R^{21}$ stands for $R^{11}$, a fluorine atom, a cyano group, a 4-$R^{31}$-(cycloalkyl) group, a 4-$R^{31}$-(cycloalkenyl) group, or an $R^{41}$—(O) $q^2$ group, wherein $R^{31}$ stands for a hydrogen atom or a straight or branched alkyl group having 1 to 12 carbon atoms optionally substituted with at least one fluorine atom; $R^{41}$ stands for an alkyl group having 1 to 12 carbon atoms optionally substituted with at least one fluorine atom; $q^2$ is 0 or 1;

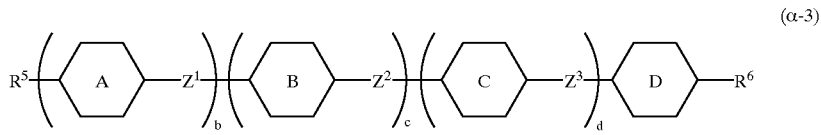

(α-3)

wherein rings A, B, C, and D each independently stands for 1,4-phenylene, 1,4-cyclohexylene, 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl, or 5,2-dioxanediyl, and at least one hydrogen atom on any of the rings A, B, C, and D may be substituted with a fluorine atom; $R^5$ and $R^6$ each independently stands for a hydrogen atom, a fluorine atom, a fluoromethyl group, a difluoromethyl group, a trifluoromethyl group, a fluoromethoxy group, a difluoromethoxy group, a trifluoromethoxy group, a cyano group, an alkyl group having 1 to 12 carbon atoms, an alkenyl group having 2 to 12 carbon atoms, an alkoxy group having 1 to 12 carbon atoms, an alkenyloxy group having 2 to 12 carbon atoms, an alkynyloxy group having 3 to 12 carbon atoms, an alkoxyalkyl group having 2 to 16 carbon atoms, or an alkoxyalkenyl group having 3 to 16 carbon atoms, wherein at least one methylene group of an alkyl, alkenyl, or alkynyl group maybe replaced with an oxygen, sulfur, or silicon atom, and said groups may be straight or branched; $Z^1$, $Z^2$, and $Z^3$ each independently stands for —COO—, —OCO—, —OCH$_2$—, —CH$_2$O—, an alkylene group having 1 to 5 carbon atoms, an alkenylene group having 2 to 5 carbon atoms, an alkynylene group having 2 to 5 carbon atoms, or a single bond; b, c, and d each independently denotes 0 or 1 with b+c+d≧1.

6. The liquid crystal composition of claim 4 further comprising a monomer (A) having at least one kind of polymerizable functional group selected from the group consisting of a methacrylate ester, an acrylate ester, epoxy, and vinyl ether.

7. The liquid crystal composition of claim 6, wherein said monomer (A) includes a compound represented by the formula (β)

wherein rings A, B, C, and D, $Z^1$, $Z^2$, $Z^3$, b, c, and d mean the same as in the formula (α-3); $R^7$ and $R^8$ each independently stands for an alkyl group having 1 to 12 carbon atoms, an alkoxy group having 1 to 12 carbon atoms, or an alkoxyalkyl group having 2 to 16 carbon atoms, wherein at least one methylene group of an alkyl group may be replaced with an oxygen, sulfur, or silicon atom, and said groups may be straight or branched; $P_1$ and $P_2$ each stands for a methacrylate ester, an acrylate ester, epoxy, vinyl ether, a hydrogen atom, a fluorine atom, a fluoromethyl group, a difluoromethyl group, a trifluoromethyl group, a fluoromethoxy group, a difluoromethoxy group, a trifluoromethoxy group, or a cyano group, provided that at least one of $P_1$ and $P_2$ stands for a methacrylate ester, an acrylate ester, epoxy, or vinyl ether; e and f each denotes 0 or 1, provided that not both of e and f denote 0.

8. A polymer obtained by polymerizing a liquid crystal composition of claim 4.

9. An optically anisotropic product produced using a polymer of claim 8.

10. A liquid crystal or optical element containing an optically anisotropic product of claim 9.

11. A liquid crystal or optical element containing a polymer of claim 8.

12. A liquid crystal or optical element containing a liquid crystal composition of claim 4.

13. A liquid crystal or optical element containing a phenylacetylene compound of claim 1.

* * * * *

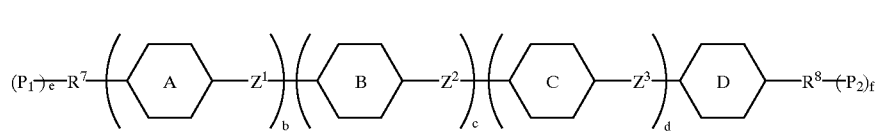

(β)